US012713296B2

(12) United States Patent
Veluchamy et al.

(10) Patent No.: US 12,713,296 B2
(45) Date of Patent: Aug. 18, 2026

(54) OPTIMIZING ANTENNA ARRAY MODEL SELECTION IN A TELECOMMUNICATIONS NETWORK

(71) Applicants: RAKUTEN MOBILE, INC., Tokyo (JP); Rakuten Symphony, Inc., Tokyo (JP)

(72) Inventors: Lingasamy Veluchamy, Karnataka (IN); Awn Muhammad, Tokyo (JP)

(73) Assignees: RAKUTEN MOBILE, INC., Tokyo (JP); RAKUTEN SYMPHONY, INC., Tokyo (JP)

( * ) Notice: Subject to any disclaimer, the term of this patent is extended or adjusted under 35 U.S.C. 154(b) by 180 days.

(21) Appl. No.: 18/712,514

(22) PCT Filed: Dec. 28, 2023

(86) PCT No.: PCT/US2023/086158
§ 371 (c)(1),
(2) Date: May 22, 2024

(87) PCT Pub. No.: WO2024/145428
PCT Pub. Date: Jul. 4, 2024

(65) Prior Publication Data

US 2026/0163619 A1 Jun. 11, 2026

(30) Foreign Application Priority Data

Dec. 28, 2022 (IN) ............................ 202221076397
Feb. 3, 2023 (IN) ............................ 202321007046
(Continued)

(51) Int. Cl.
*H04B 7/06* (2006.01)
*H04B 17/12* (2015.01)
(Continued)

(52) U.S. Cl.
CPC ........... *H04B 7/0608* (2013.01); *H04B 17/12* (2015.01); *H04B 17/221* (2023.05); *H04L 41/08* (2013.01); *H04W 28/18* (2013.01)

(58) Field of Classification Search
CPC .... H04B 7/0608; H04B 17/12; H04B 17/221; H04L 41/08; H04W 28/18
See application file for complete search history.

(56) References Cited

U.S. PATENT DOCUMENTS 10,916,315 B2 2/2021 Yu et al.
11,570,761 B2 1/2023 Ryu et al.
(Continued)

FOREIGN PATENT DOCUMENTS

WO 2024/024423 A1 2/2024
WO 2024/102280 A1 5/2024
WO 2024/1 45340 A1 7/2024

OTHER PUBLICATIONS

Johan Von Perner et al., 'Network energy efficiency', NGMN Alliance, Dec. 7, 2021, V1.1 (56 pages).
(Continued)

*Primary Examiner* — Sung S Ahn
(74) *Attorney, Agent, or Firm* — Sughrue Mion, PLLC

(57) ABSTRACT

A method for optimizing antenna array model selection in a telecommunications network, the method includes sending, by a radio unit (O-RU) to a distribution unit (O-DU), antenna configuration capability information comprising at least one antenna array model parameter via management plane (M-Plane) messaging; receiving, from the O-DU, an antenna array configuration comprising at least one antenna array model parameter supported by the O-RU via control plane (C-Plane) messaging or M-Plane messaging, wherein the supported antenna array configuration is based on the antenna configuration capability information comprising at least one antenna array model parameter of the O-RU and a (Continued)

request to reconfigure the antenna array from a higher-layer network function; and based on the antenna array configuration comprising at least one antenna array model parameter supported by the O-RU, changing, by the O-RU, an antenna array model on top of a baseline antenna array configuration of the O-RU.

10 Claims, 25 Drawing Sheets

(30) Foreign Application Priority Data

Mar. 10, 2023 (IN) ............................ 202321016149
Mar. 31, 2023 (IN) ............................ 202341024486
May 4, 2023 (IN) ............................ 202341031813

(51) Int. Cl.
*H04B 17/21* (2015.01)
*H04L 41/08* (2022.01)
*H04W 28/18* (2009.01)

(56) References Cited

U.S. PATENT DOCUMENTS 11,601,819 B2 3/2023 Chou et al.
11,627,562 B2 4/2023 Ryu et al.
11,917,527 B2 2/2024 Chou
11,985,515 B2 5/2024 Raghavan et al.
12,200,498 B2 1/2025 Chou et al.
12,382,416 B2 8/2025 Song et al.
12,501,417 B2 12/2025 Guchhait et al.
2020/0258583 A1 8/2020 Yu et al.
2020/0329381 A1 10/2020 Chou et al.
2020/0358583 A1 11/2020 Ryu et al.
2021/0120538 A1* 4/2021 Huh ..................... H04L 5/0094
2021/0136598 A1 5/2021 Raghavan et al.
2021/0136788 A1 5/2021 Lim et al.
2021/0195517 A1 6/2021 Yang et al.
2021/0258866 A1 8/2021 Chou
2021/0385686 A1 12/2021 Ahmed et al.
2022/0077587 A1 3/2022 Wu et al.
2022/0159525 A1 5/2022 Chou et al.
2022/0225264 A1 7/2022 Song et al.
2022/0232508 A1 7/2022 Song et al.
2022/0394680 A1 12/2022 Kim et al.
2023/0045847 A1* 2/2023 Wong ................... H04W 72/21
2023/0133083 A1 5/2023 Song et al.
2023/0144337 A1 5/2023 Kumar et al.
2023/0189006 A1 6/2023 Chou et al.
2023/0284048 A1 9/2023 O'Shea et al.
2023/0402766 A1 12/2023 Garyantes et al.
2024/0063851 A1 2/2024 Sachidanand Sinha et al.
2024/0073815 A1 2/2024 Farhoodi et al.
2024/0107443 A1 3/2024 Singh et al.
2024/0129876 A1 4/2024 Sarma et al.
2024/0155393 A1 5/2024 Han et al.
2024/0205690 A1 6/2024 Kurian et al.
2024/0214927 A1 6/2024 Garyantes et al.
2024/0224305 A1 7/2024 Kang et al.
2024/0250904 A1 7/2024 Shete et al.
2024/0259061 A1 8/2024 Abotabl et al.
2024/0276188 A1 8/2024 Shete et al.
2024/0283507 A1 8/2024 Ly et al.
2024/0357479 A1 10/2024 Bhaskaran
2025/0008378 A1 1/2025 Veluchamy et al.
2025/0048251 A1 2/2025 Shete et al.
2025/0184278 A1 6/2025 Nesteroff et al.
2025/0203505 A1 6/2025 Muhammad et al.
2025/0247291 A1 7/2025 Shete et al.

OTHER PUBLICATIONS

O-Ran Alliance, "O-Ran Working Group 4 (Open Fronthaul Interfaces WG) Management Plane Specification", 2022, O-RAN.WG4.MP.0-v10.00, Technical Specification, (260 pages).
O-Ran Alliance, "O-Ran Work Group 1 (Use Cases and Overall Architecture) Network Energy Saving Use Cases Technical Report", 2023, O-RAN.WG1.NESUC-R003-v01.00, Technical Report, (65 pages).
O-Ran Alliance, "O-Ran Working Group 1 Use Cases Analysis Report", 2022, O-RAN.WG1. Use-Cases-Analysis-Report-v09.00, Technical Report, (65 pages).
O-Ran Alliance, "O-Ran Working Group 4 (Open Fronthaul Interfaces WG) Control, User and Synchronization Plane Specification", 2022, O-RAN.WG4.CUS.0-R003-v11.00, Technical Specification, (6 pages).
Lee, et al., "Design of a Management Plane for 5G Open Fronthaul Interface", IEEE, ICTC 2020, pp. 946-948 (3 pages).

* cited by examiner

| st4CmdType 'TRX-CONTROL' | | | | | | | | | |
|---|---|---|---|---|---|---|---|---|---|
| 0 (msb) | 1 | 2 | 3 | 4 | 5 | 6 | 7 (lsb) | # of bytes | |
| transport header, see section 5.1.3 | | | | | | | | 8 | Octet 1 |
| common Section Type 4 header | | | | | | | | 8 | Octet 9 |
| Section Type 4 common part of the command header | | | | | | | | 8 | Octet 17 |
| bothDir | turnOff | sleepDurIndex[3:0] | | | | sleepDepth[1:0] | | 1 | Octet 25 |
| reserved | | | | log2maskbits[3:0] | | | | 1 | Octet 26 |
| antLayerMask[15:0]* - reserved when cmdScope ≠ ARRAY-COMMAND | | | | | | | | 2 | Octet 27 |
| antMask[x:0] - only present when cmdScope = ARRAY-COMMAND | | | | | | | | var | Octet 29 |

FIG. 13

<table>
<tr><td colspan="10">st4CmdType ‘TRX-CONTROL/ADVANCED-SLEEP-MODE’</td></tr>
<tr><td>0 (msb)</td><td>1</td><td>2</td><td>3</td><td>4</td><td>5</td><td>6</td><td>7 (lsb)</td><td># of bytes</td><td></td></tr>
<tr><td colspan="8">transport header</td><td>8</td><td>Octet 1</td></tr>
<tr><td colspan="8">common Section Type 4 header</td><td>8</td><td>Octet 9</td></tr>
<tr><td colspan="8">Section Type 4 common part of the command header</td><td>8</td><td>Octet 17</td></tr>
<tr><td>bothDir</td><td>OnOff</td><td>symbolMask[0:1]</td><td>asmflag[0:1]</td><td colspan="2">eAxCmask[0:15]</td><td colspan="2">sleepDepth[1:0]</td><td>3</td><td>Octet 25</td></tr>
<tr><td colspan="2">extnumslots[0:15]</td><td colspan="2">symbolMask[0:11]</td><td colspan="4">log2maskbits[3:0]</td><td>4</td><td>Octet 28</td></tr>
<tr><td colspan="8">antLayerMask[15:0]* - reserved when cmdScope ≠ ARRAY-COMMAND</td><td>2</td><td>Octet 32</td></tr>
<tr><td colspan="8">antMask[x:0] - only present when cmdScope = ARRAY-COMMAND</td><td>var</td><td>Octet 34</td></tr>
</table>

FIG. 14

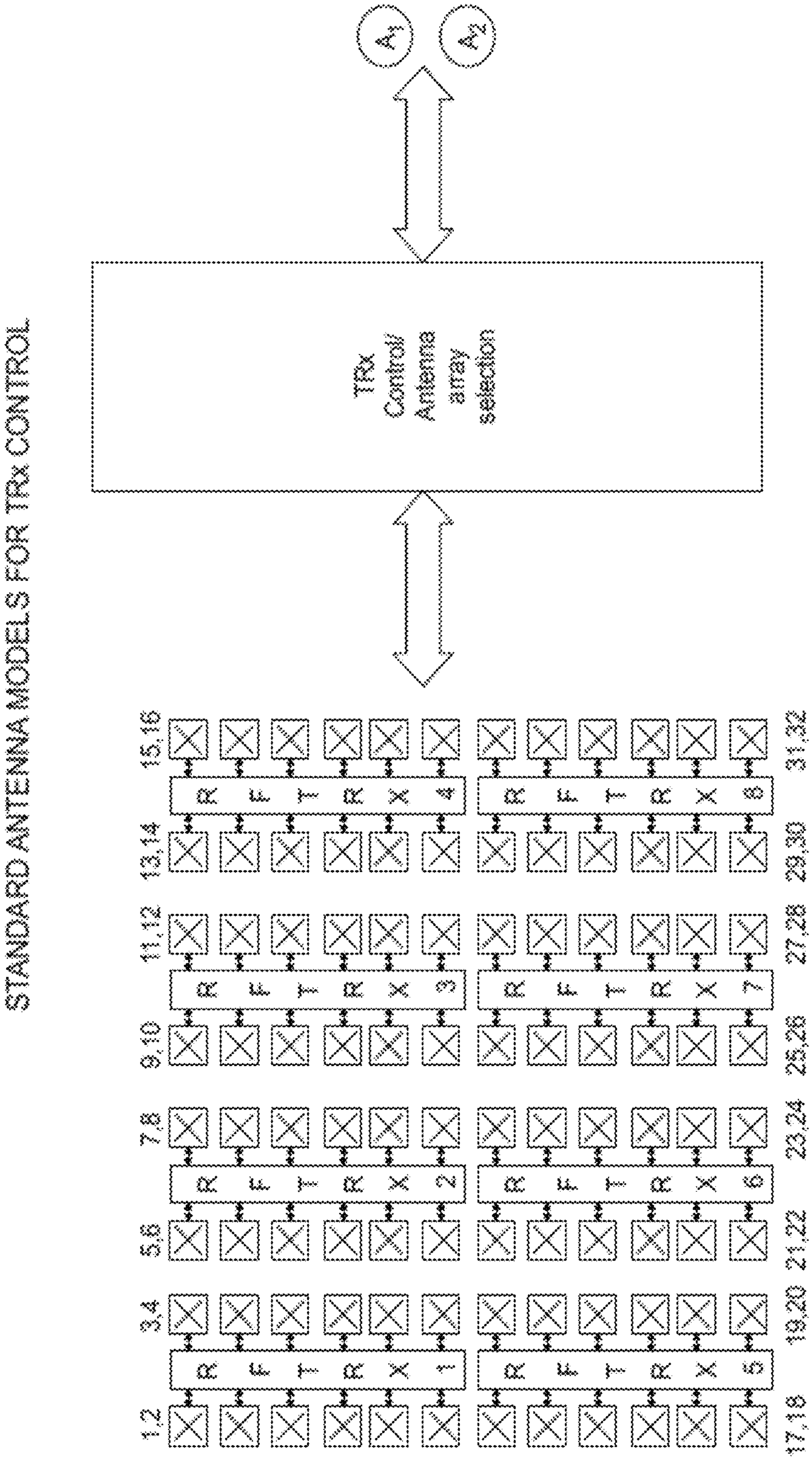
FIG. 15 (Cont...)

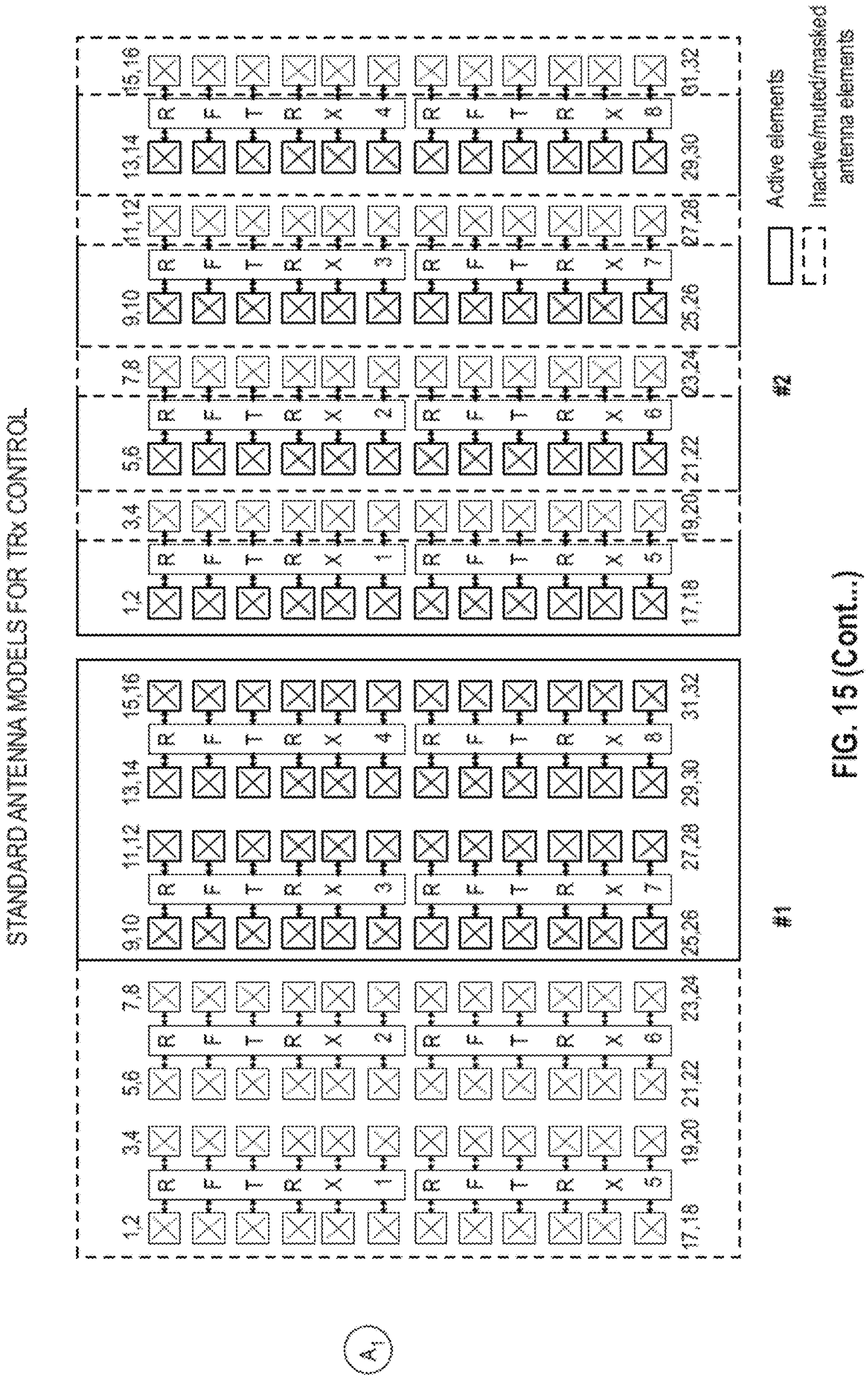
FIG. 15 (Cont...)

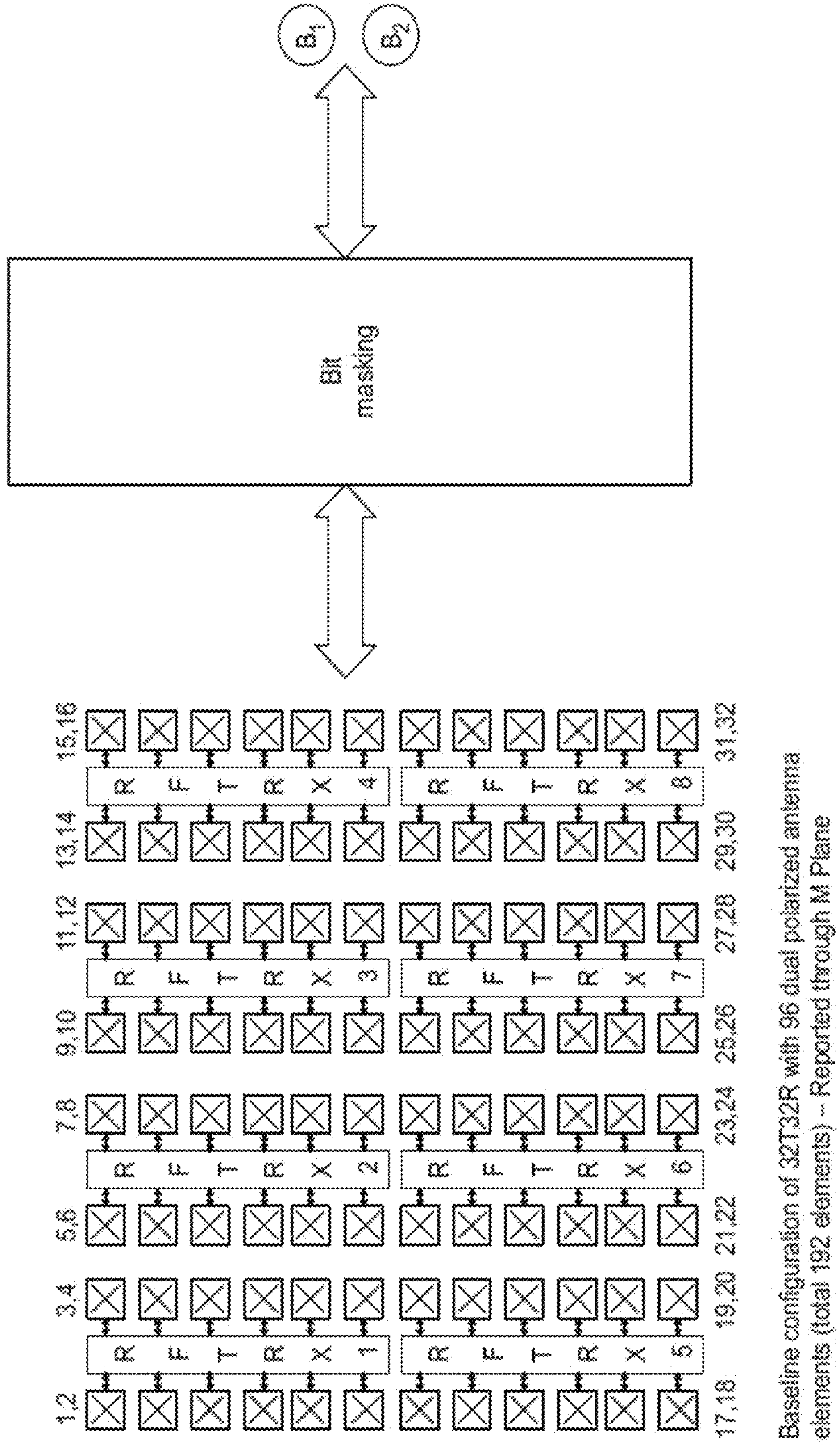
FIG. 17 (Cont...)

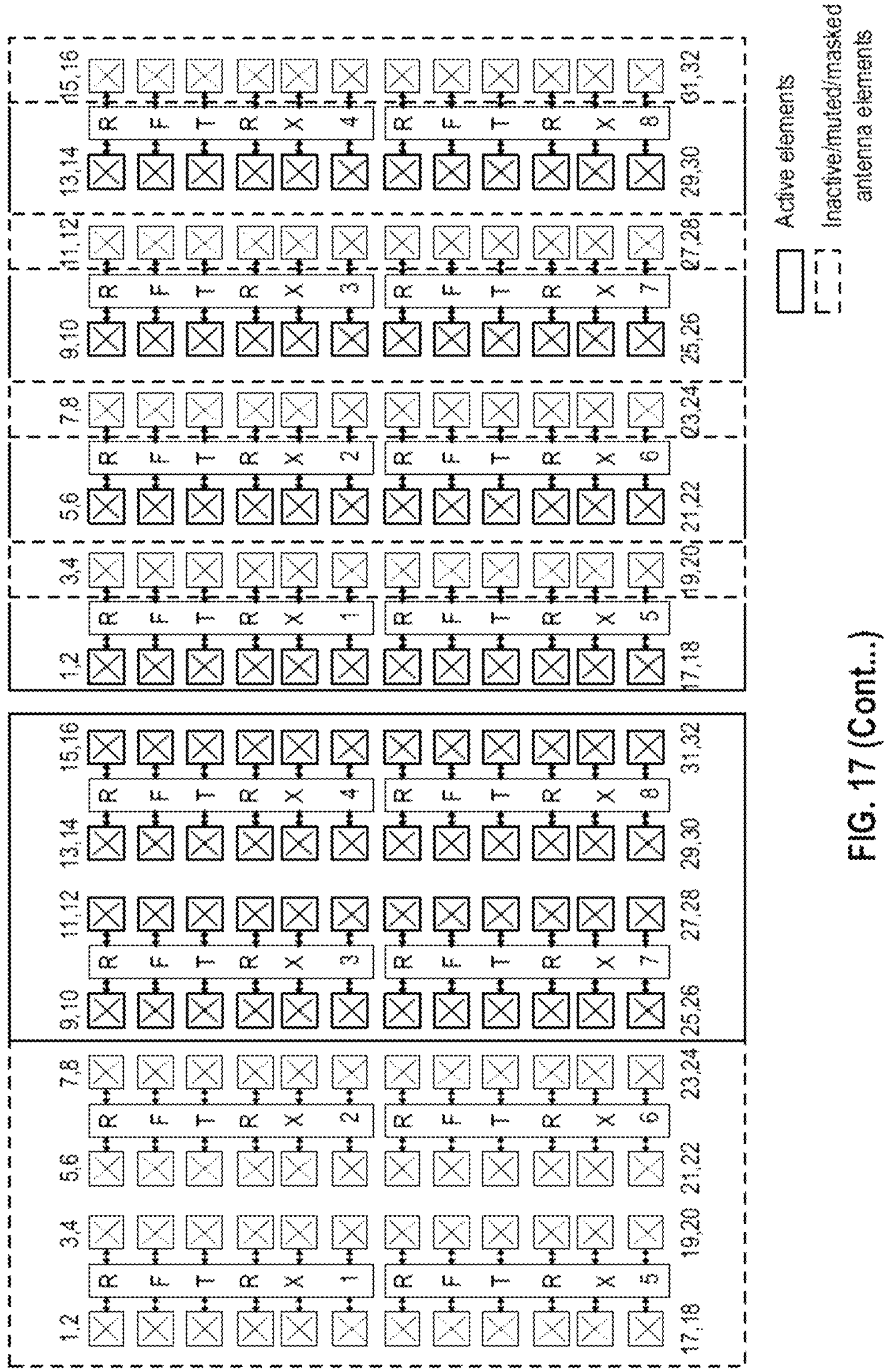
FIG. 17 (Cont...)
B1

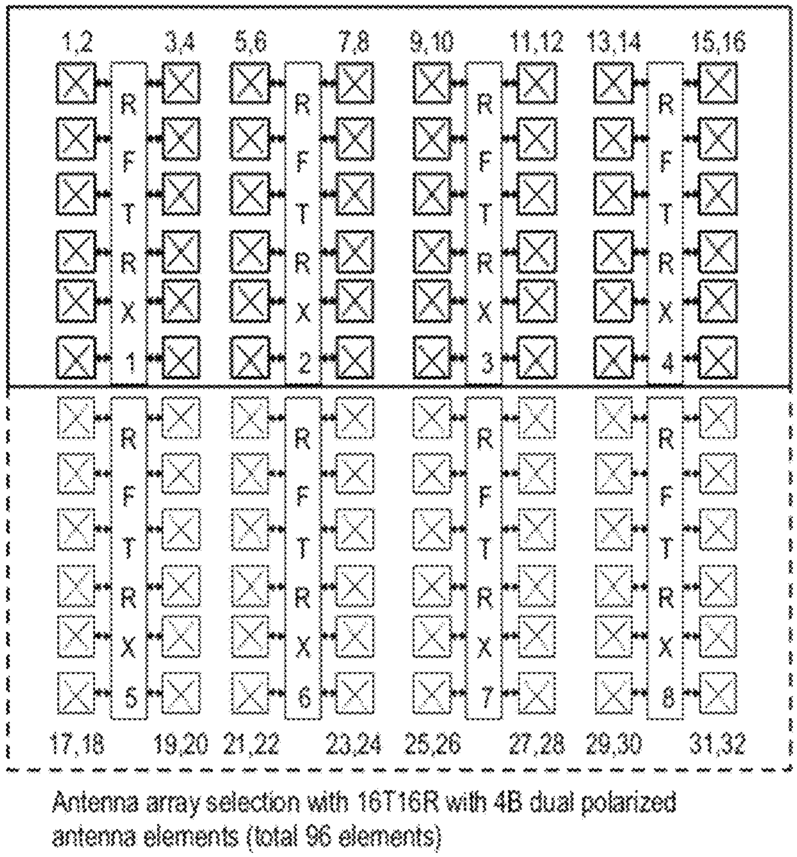
Antenna array selection with 16T16R with 48 dual polarized antenna elements (total 96 elements)
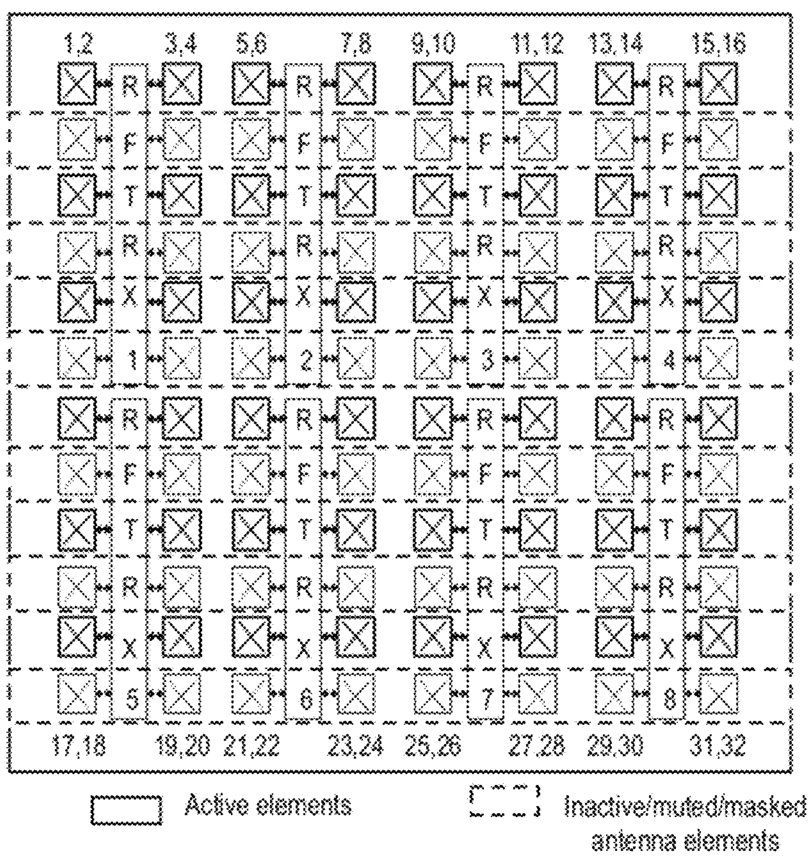
FIG. 18

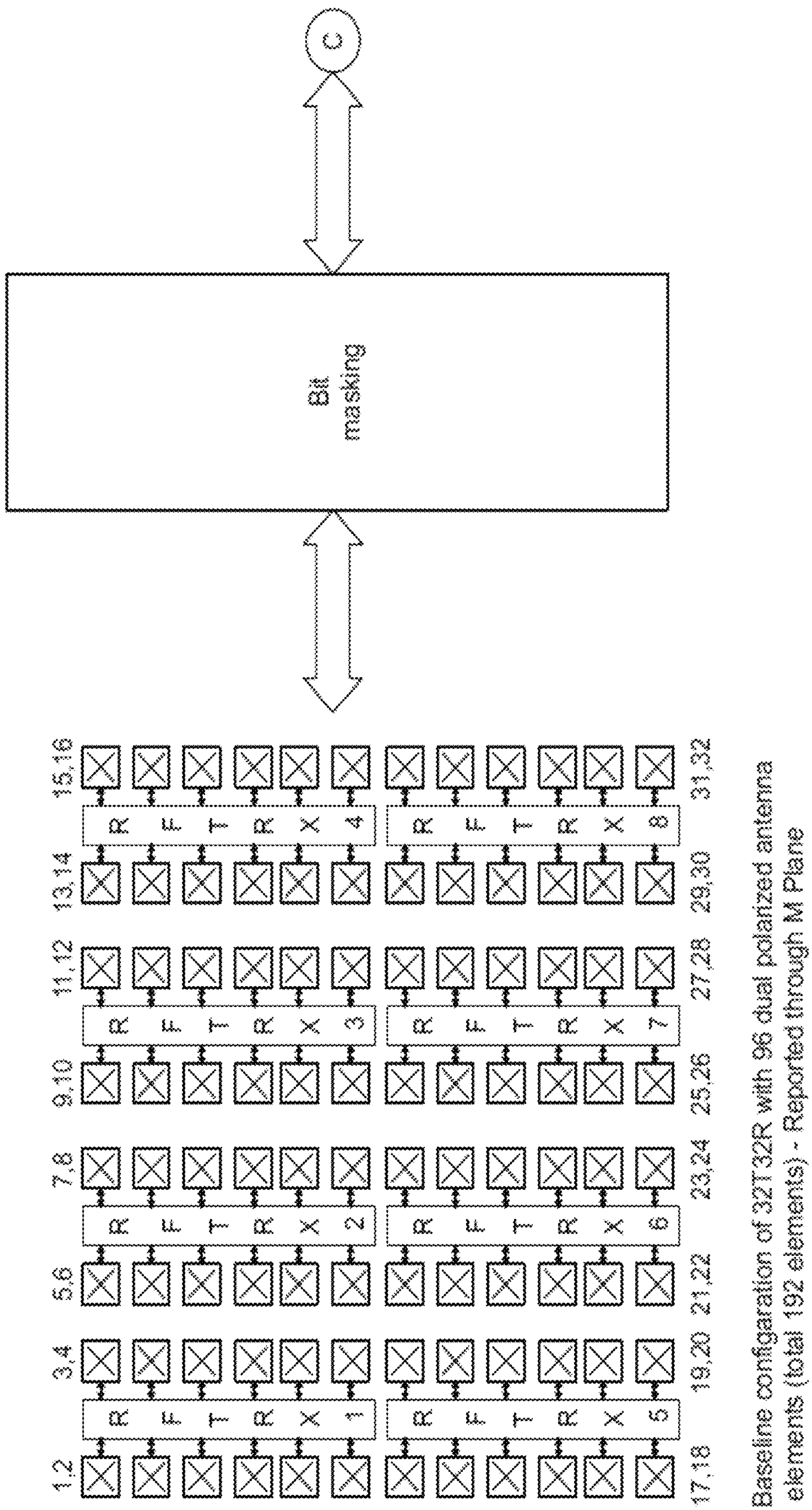
FIG. 18 (Cont...)

| Baseline configuration | Antenna array configuration | No of T/R elements | Total no of elements | No of elements in Row | No of elements in Column | dx | dy | Total energy savings (Ideal case) |
|---|---|---|---|---|---|---|---|---|
| 04T04R | 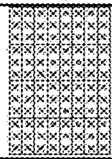 | 64T64R | 192 elements (96 dual polarized elements) | 12 | 8 | $d_R$ | $d_C$ | Baseline configuration (X2 W) |
| | 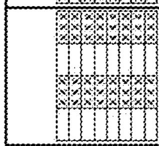 | 32T32R | 96 elements (48 dual polarized elements) | 12 | 4 | $d_R$ | $d_C$ | Configuration #1 (X2/2 W) |
| | 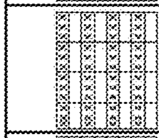 | 32T32R | 96 elements (48 dual polarized elements) | 6 | 4 | $2^*d_R$ | $d_C$ | Configuration #2 (X2/2 W) |
| | 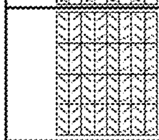 | 32T32R | 96 elements (48 dual polarized elements) | 12 Single polarized | 8 Single polarized | $2^*d_R$ | $d_C$ | Configuration #3 (X2/2 W) |
| | 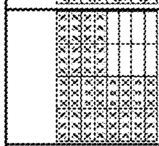 | 48T48R | 72 elements (144 dual polarized elements) | – | – | $d_R$ | $d_C$ | Configuration #4 (3X2/4 W) |
| | 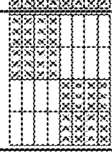 | 32T32R | 96 elements (48 dual polarized elements) | – | – | $d_R$ | $d_C$ | Configuration #5 (X2/2 W) |

FIG. 19

| Baseline configuration | Antenna array configuration | No of T/R Chains | Total no of elements | No of elements in Row | No of elements in Column | dx | dy | Total energy savings (Ideal case) |
|---|---|---|---|---|---|---|---|---|
| 32T32R | 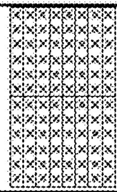 | 32T32R | 192 elements (96 dual polarized elements) | 12 | 8 | $d_R$ | $d_C$ | Baseline configuration (X1 W) |
| | 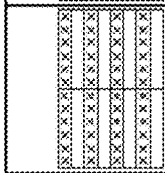 | 16T16R | 96 elements (48 dual polarized elements) | 12 | 4 | $2^*d_R$ | $d_C$ | Configuration #1 (X1/2 W) |
| | 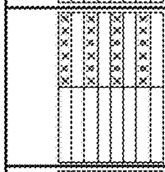 | 8T8R | 48 elements (24 dual polarized elements) | 6 | 4 | $d_R$ | $d_C$ | Configuration #2 (X1/4 W) |
| | 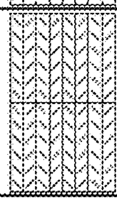 | 16T16R | 96 elements (96 dual polarized elements) | 12 Single polarized | 8 Single polarized | $2^*d_R$ | $d_C$ | Configuration #3 (X1/2 W) |

FIG. 20

OPTIMIZING ANTENNA ARRAY MODEL SELECTION IN A TELECOMMUNICATIONS NETWORK

CROSS-REFERENCE TO RELATED APPLICATION(S)

This application is a National Stage of International Application No. PCT/US2023/086158 filed on Dec. 28, 2023, claiming priorities based on from Indian Provisional Patent Application No. 202221076397 filed on Dec. 28, 2022, Indian Provisional Patent Application No. 202341031813 filed on May 4, 2023, Indian Provisional Patent Application No. 202321007046 filed on Feb. 3, 2023, Indian Provisional Patent Application No. 202321016149 filed on Mar. 10, 2023, and Indian Provisional Patent Application No. 202341024486 filed on Mar. 31, 2023, the disclosures of which are incorporated by reference herein in their entireties.

TECHNICAL FIELD

The present disclosure relates to optimizing antenna array model selection within an open radio access network (O-RAN) to save energy in a telecommunications network.

BACKGROUND

A radio access network (RAN) is an important component in a telecommunications system, as it connects end-user devices (or user equipment) to other parts of the network. The RAN includes a combination of various network elements (NEs) that connect the end-user devices to a core network, Traditionally, the hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the Fronthaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: a non-real-time RIC (NRT-RIC) and a near-real-time RIC (nRT-RIC).

The NRT-RIC is the control point of a non-real-time control loop and operates on a timescale greater than 1 second within the Service Management and Orchestration (SMO) framework. Its functionalities are implemented through modular applications called rApps (rApp 1, . . . , rApp N), and include: providing policy-based guidance and enrichment across the A1 interface, which is the interface that enables the communication between the NRT-RIC and the nRT-RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., nRT-RIC, O-RAN Centralized Unit (O-CU), O-RAN Distributed Unit (O-DU), etc.).

The nRT-RIC operates on a timescale between 10 milliseconds and 1 second and connects to the O-DU, O-CU (disaggregated into the O-CU Control Plane (O-CU-CP) and the O-CU User Plane (O-CU-UP)), and an open evolved NodeB (O-eNB) via the E2 interface. The nRT-RIC uses the E2 interface to control the underlying RAN elements (E2 nodes/network functions (NFs)) over a near-real-time control loop. The nRT-RIC monitors, suspends/stops, overrides, and controls the E2 nodes (O-CU, O-DU, and O-eNB) via policies. For example, the nRT-RIC sets policy parameters on activated functions of the E2 nodes. Further, the nRT-RIC hosts xApps to implement functions such as quality of service (QoS) optimization, mobility optimization, slicing optimization, interference mitigation, load balancing, security, etc. The two types of RICs work together to optimize the O-RAN. For example, the NRT-RIC provides, over the A1 interface, the policies, data, and artificial intelligence/machine learning AI/ML models enforced and used by the nRT-RIC for RAN optimization, and the nRT-RIC returns policy feedback (i.e., how the policy set by the NRT-RIC works).

The SMO framework, within which the NRT-RIC is located, manages and orchestrates RAN elements. Specifically, the SMO manages and orchestrates what is referred to as the O-RAN Cloud (O-Cloud). The O-Cloud is a collection of physical RAN nodes that host the RICs, O-CUs, and O-DUs, the supporting software components (e.g., the operating systems and runtime environments), and the SMO itself.

In other words, the SMO manages the O-Cloud from within. The O2 interface is the interface between the SMO and the O-Cloud it resides in. Through the O2 interface, the SMO provides infrastructure management services (IMS) and deployment management services (DMS).

The O-Cloud, on the other hand, is a cloud computing platform comprising a collection of physical infrastructure nodes that meet O-RAN requirements to host the relevant O-RAN functions (e.g., nRT-RIC, O-CU-CP, O-CU-UP, O-DU, etc.), the supporting software components (such as Operating System, Virtual Machine Monitor, Container Runtime, etc.) and the appropriate management and orchestration functions.

The SMO framework, within which the NRT-RIC is located, manages and orchestrates RAN elements. The SMO performs management and orchestration of RAN elements through four key interfaces: the A1 Interface between the NRT-RIC in the SMO and the nRT-RIC for RAN Optimization; the O1 Interface between the SMO and the O-RAN Network Functions for FCAPS support; in the case of a hybrid model, an Open Fronthaul M-Plane interface between SMO and O-RU for FCAPS support; the O2 Interface between the SMO and the O-Cloud to platform resources and workload management.

In O-RANs according to the related art, massive multiple-input multiple-output (m-MIMO) antennas are used for beamforming techniques (i.e., beam weighting and/or antenna calibration data set) to increase cell capacity and traffic throughput. To realize beamforming, the RUs (i.e., O-RUs) must concentrate power amplifiers at the antenna site by combining radiating elements such as transceiver (TRx) (i.e., Transmitter/Receiver (Tx/Rx)) arrays (i.e., combining radiating elements of the antenna arrays to antenna array models).

In the related art, the O-RU reports a rectangular coordinate system-based standardized antenna array model to the O-DU. The rectangular coordinate system-based standardized antenna array model is hardcoded by the O-RU vendor as a read-only. Moreover, the O-DU may not be aware of the internal architecture of O-RU, i.e., physical antenna element connection with Radio Frequency (RF) transceiver ports.

As a result, in the related art, muting (e.g., turning off) the part of antenna elements along with their respective RF transceiver chains is not possible. The lack of communication between the O-DU and O-RU according to the related art as set forth above has the disadvantage that in case of specific O-RAN conditions predetermined by an operator (e.g., O-RAN loads, when the expected traffic volume or the number of connected users is lower than a configured threshold), the high-power consumption of O-RUs due vendor-centric, proprietary setting of TRx arrays causes an energy ineffective operation of the RUs within the O-RAN.

SUMMARY

According to embodiments, the present disclosure provides an optimization of an antenna array model selection in a telecommunication network. In particular, antenna configuration capability information comprising at least one antenna array model parameter are exchanged between an O-DU and an O-RU via management plane (M-Plane) messaging (i.e., an M-Plane command) and an antenna array configuration comprising at least one antenna array model parameter supported by the O-RU are exchanged between an O-DU and an O-RU via control plane (C-Plane) messaging or M-Plane messaging, wherein the supported antenna array configuration is based on the antenna configuration capability information comprising at least one antenna array model parameter of the O-RU and a request to reconfigure the antenna array from a higher-layer network function.

As a result, when the antenna array model is changed on top of a baseline antenna array configuration of the O-RU based on the antenna array configuration comprising at least one antenna array model parameter supported by the O-RU, the O-DU is aware of the configuration capabilities of the O-RU. This has the advantage that configuration capabilities of the O-RU are defined.

According to the embodiments, an apparatus includes a radio unit (O-RU), the O-RU configured to send, to a distribution unit (O-DU), antenna configuration capability information comprising at least one antenna array model parameter via management plane (M-Plane) messaging. The O-RU receives, from the O-DU, an antenna array configuration comprising at least one antenna array model parameter supported by the O-RU via control plane (C-Plane) messaging or M-Plane messaging. The supported antenna array configuration is based on the antenna configuration capability information comprising at least one antenna array model parameter of the O-RU and a request to reconfigure the antenna array from a higher-layer network function. The O-RU changes an antenna array model on top of a baseline antenna array configuration of the O-RU based on the antenna array configuration comprising at least one antenna array model parameter supported by the O-RU.

According to an embodiment, an apparatus includes a distribution unit (O-DU) configured to receive, from a radio unit (O-RU), antenna configuration capability information comprising at least one antenna array model parameter via management plane (M-Plane) messaging. The O-DU receives, from a higher-layer network function, a request to reconfigure an antenna array; The O-DU determines an antenna array configuration comprising at least one antenna array model parameter supported by the O-RU based on the antenna configuration capability information comprising at least one antenna array model parameter from the O-RU and based on the request to reconfigure the antenna array from the higher-layer network function. The O-DU applies the supported antenna array configuration comprising at least one antenna array model parameter via C-Plane messaging or M-Plane messaging.

According to an embodiment, a method includes sending, by a radio unit (O-RU) to a distribution unit (O-DU), antenna configuration capability information comprising at least one antenna array model parameter via management plane (M-Plane) messaging. The method further includes receiving, from the O-DU, an antenna array configuration comprising at least one antenna array model parameter supported by the O-RU via control plane (C-Plane) messaging or M-Plane messaging. The supported antenna array configuration is based on the antenna configuration capability information comprising at least one antenna array model parameter of the O-RU and a request to reconfigure the antenna array from a higher-layer network function. Furthermore, the method includes changing, by the O-RU, an antenna array model on top of a baseline antenna array configuration of the O-RU based on the antenna array configuration comprising at least one antenna array model parameter supported by the O-RU.

According to an embodiment, a method includes receiving, by a distribution unit (O-DU) from a radio unit (O-RU), antenna configuration capability information comprising at least one antenna array model parameter via management plane (M-Plane) messaging. Moreover, the method includes receiving, from a higher-layer network function, a request to reconfigure an antenna array. The antenna configuration capability information includes at least one antenna array model parameter from the O-RU and based on the request to reconfigure the antenna array from the higher-layer network function. The method includes determining, by the O-DU, an antenna array configuration comprising at least one antenna array model parameter supported by the O-RU. Furthermore, the method includes applying, by the O-DU, the supported antenna array configuration comprising at least one antenna array model parameter via C-Plane messaging or M-Plane messaging.

According to an embodiment, a non-transitory computer-readable recording medium having recorded thereon instructions executable by at least one processor configured to execute instructions to implement a method. The method includes sending, by a radio unit (O-RU) to a distribution unit (O-DU), antenna configuration capability information comprising at least one antenna array model parameter via management plane (M-Plane) messaging. Moreover, the method includes receiving, from the O-DU, an antenna array configuration comprising at least one antenna array model parameter supported by the O-RU via control plane (C-Plane) messaging or M-Plane messaging. The supported antenna array configuration is based on the antenna configuration capability information comprising at least one antenna array model parameter of the O-RU and a request to reconfigure the antenna array from a higher-layer network function. Moreover, the method includes changing, by the O-RU, an antenna array model on top of a baseline antenna array configuration of the O-RU based on the antenna array configuration comprising at least one antenna array model parameter supported by the O-RU.

According to the embodiment, a non-transitory computer-readable recording medium having recorded thereon instructions executable by at least one processor configured to execute instructions to implement a method. The method includes receiving, by a distribution unit (O-DU) from a radio unit (O-RU), antenna configuration capability information comprising at least one antenna array model parameter via management plane (M-Plane) messaging. Moreover, the method includes receiving, from a higher-layer network function, a request to reconfigure an antenna array. The antenna configuration capability information includes at least one antenna array model parameter from the O-RU and based on the request to reconfigure the antenna array from the higher-layer network function. The method includes determining, by the O-DU, an antenna array configuration comprising at least one antenna array model parameter supported by the O-RU. Furthermore, the method includes applying, by the O-DU, the supported antenna array configuration comprising at least one antenna array model parameter via C-Plane messaging or M-Plane messaging.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 13 illustrates an embodiment for TRx control and sleep modes according to a Section Type 4 command type (ST4CmdType) TRx control;

FIG. 14 illustrates another embodiment for TRx control and sleep modes according to a Section Type 4 command type (ST4CmdType) TRx control/advanced sleep modes;

FIG. 18 illustrates an antenna array selection based on a bit masking method according to another embodiment;

FIG. 19 illustrates 64T64R antenna array models to be selected by utilizing the offset method according to an embodiment;

FIG. 20 illustrates 32T32R antenna array models to be selected by utilizing the offset method according to an embodiment;

DETAILED DESCRIPTION

The following detailed description of example embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that apparatuses and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 2:
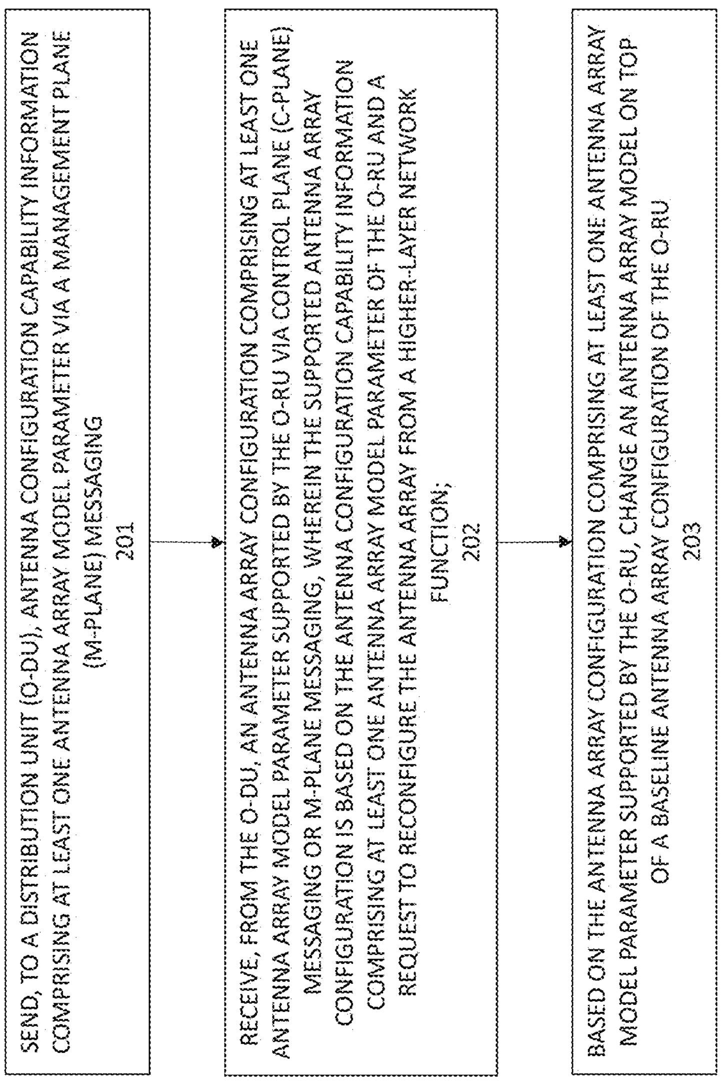
FIG. 2 illustrates a method for optimizing antenna array model selection in an O-RAN from the perspective of an O-RU according to an embodiment.

FIG. 2 illustrates a method for optimizing antenna array model selection in an O-RAN from the perspective or an O-RU. Referring to FIG. 2 the O-RU communicates (e.g., sends upon initialization and/or during operation) its configuration capability information required to perform an antenna array reconfiguration via the M-Plane to the O-DU, receives (from the O-DU) an antenna array configuration supported by the O-RU via control plane (C-Plane) messaging and/or management plane (M-Plane) messaging and reconfigures the antenna array antenna model based on the supported antenna array configuration for the O-RU.

In step 201, the O-RU sends its antenna configuration capability information comprising at least one antenna array model parameter via management plane (M-Plane) messaging (i.e., an M-Plane command). According to an example embodiment, in step 201, upon powering up, the O-RU communicates (e.g., sends) its antenna configuration capability information comprising at least one antenna array model parameter (i.e., Yang model data parameter comprised by a Yang model) required to perform an antenna array reconfiguration via the M-Plane to the O-DU. In an example embodiment, the O-RU, during start-up, exposes (reports) its capability data (including the antenna configuration capability information) to the O-DU via the Fronthaul (FH) interface to support various ES methods (e.g., TRx control methods such as, for example, the RF channel reconfiguration, antenna array selection, etc. and sleep modes such as, for example, advance sleep mode, etc.). In another example embodiment, the O-RU communicates (e.g., sends) a plurality of supported antenna models (e.g., antenna models defined by antenna array model parameter)/configurations (i.e., antenna configuration capability information) through the M-Plane to the O-DU.

In another example embodiment, the O-RU, during operation, communicates (e.g., sends) its configuration capability information required to perform an antenna array reconfiguration via the M-Plane to the O-DU. For example, the higher-layer network function may perform a rollback of an ES method from an energy saving network state to an original network state (e.g., it turns on an O-RU or parts of the O-RU). In another case the higher-layer network function may perform a rollback of an ES method from an energy saving network state or an original state to a high-performance network state (e.g., it switches on an idling O-RU or parts of idling O-RU to maximum performance).

According to an example embodiment, the antenna configuration capability information (O-RU antenna configuration capability information) may be hardcoded by the vendor during production along with at least one of the following parameters, a unique name, index, reference, etc. to identify the antenna array configuration capability (e.g., the technical specification of the antenna array), the number of spatial streams/layers supported against each configuration of the antenna array, the antenna calibration data to be applied by O-RU during the configuration change, a value referring to the achievable energy savings against each configuration, associated beam weights (pre-defined beam weights), etc. In an example embodiment, when O-RU is powered on (is initialized), the O-RU starts reporting supported energy saving modes (i.e., antenna array configuration capability information) and the hardcoded antenna array models along with the other initialization parameters to the O-DU using M-Plane yang models (e.g., an urn:o-ran:module-cap:1.0 and an urn:o-ran:hardware:1.0).

According to an embodiment, in line with the O-RAN Open Fronthaul M-Plane Specification, which defines the Management Plane of the Open Fronthaul Interface as well as associated YANG models, the O-RU may indicate the supported energy-saving features in associated YANG models a Yang Features such as, for example, o-ran-wg4-features.yang, to a lower order network function other than O-RU and/or higher order network function (i.e., an O-RU controller such as the O-DU and/or the SMO, SMO framework, etc.).

To this end, the O-DU may identify O-RU-supported feature capabilities using YANG Feature Name Tags such for example, TRX-CONTROL/TRX-ON-OFF, ADVANCED-SLEEP-MODE/SLEEP-MODE, LIGHT-HIBERNATE-SLEEP, DEEP-HIBERNATE-SLEEP/DEEP-SLEEP, etc.

The YANG Feature Name Tags TRX-CONTROL or TRX-ON-OFF may describe the turning on/off RF channels or Tx/Rx array elements (i.e., of RF channels or Tx/Rx array elements switch on or off), whereas an M-Plane activation as an optional feature control may be not available.

The YANG Feature Name Tags ADVANCED-SLEEP-MODE or SLEEP-MODE may describe turning off carriers and associated O-RU circuit(s) and/or O-RU component(s) (i.e., muting and/switching on/off physical and functional components of the O-RU) based on the respective activated sleep mode, whereas an M-Plane activation as optional feature control may be not available.

The YANG Feature Name Tag HIBERNATE-SLEEP may describe an O-RU Energy saving by turning off carriers and associated O-RU circuits/components for a longer duration, wherein the longer duration in comparison to other sleep modes allows an optional feature control to be implemented hardware/component/energy-saving-enabled as an M-Plane based sleep mode.

The YANG Feature Name Tag LIGHT-HIBERNATE-SLEEP may describe O-RU Energy saving by turning off carriers and associated O-RU circuits/components for a longer duration without turning off synchronization, wherein the longer duration in comparison to other sleep modes allows an optional feature control to be implemented hardware/component/energy-saving-enabled as an M-Plane based sleep mode.

The YANG Feature Name Tag DEEP-HIBERNATE-SLEEP (i.e., Deep Sleep) may describe O-RU Energy saving by turning off carriers and associated O-RU circuits/components for a longer duration by turning off synchronization, wherein the longer duration in comparison to other sleep modes allows an optional feature control to be implemented hardware/component/energy-saving-enabled as an M-Plane based sleep mode.

According to an example embodiment, referring to the YANG Feature Name Tags ADVANCED-SLEEP-MODE or SLEEP-MODE may define various short duration (C Plane based) sleep modes, for example, the advanced sleep mode may be for shorter sleep duration like milliseconds, seconds, or minutes and activated, for example, with ST4 C Plane message by control plane (C-Plane) messaging.

According to an example embodiment, referring to the YANG Feature Name Tag HIBERNATE-SLEEP for the longer duration a hibernate-sleep mode may be activated by employing M-Plane, for example, by setting the parameter+--rw energy-saving-enabled? boolean {ENERGYSAVING}? in the respective o-ran-hardware.yang module to "True" or "Yes".

According to an example embodiment, referring to the YANG Feature Name Tags LIGHT-HIBERNATE-SLEEP and DEEP-HIBERNATE-SLEEP in order to differentiate the longer sleep with and without turning off synchronization plane circuit, light-hibernate-sleep mode with synchronization and deep-hibernate-sleep mode without synchronization may be implemented in a same way as that of hibernate-sleep by employing the M-Plane, for example, by setting the parameter+--rw energy-saving-enabled? boolean {ENERGYSAVING}? in the respective o-ran-hardware.yang module to "True" or "Yes".

Referring to the O-RU reporting to the O-DU and/or SMO based on yang modules such as, for example, as specified in the o-ran module.cap.yang, Advanced Sleep Modes (ASM) may support sleep modes having a short duration (C-Plane based) sleep modes (e.g., a plurality of sleep modes (SM) such as, for example, SM #0, SM #1, SM #2, SM #3, etc., wherein the time duration of SM #0<SM #1<SM #2<SM #3) with different wake-up times or if the wake-up times is too short a defined go-to-sleep time (e.g., wake up time duration/time). Moreover, the Advanced Sleep Modes (ASM) may support sleep modes having a long duration (M-Plane based) sleep modes (e.g., the hibernate sleep (i.e., deep sleep) that does not involve any synchronization or the hibernate sleep (i.e., deep sleep) modes with or without synchronization, whereas the light hibernate sleep (i.e., deep sleep) refers to an M-Plane based sleep mode with synchronization and the deep hibernate sleep refers to an M-Plane based sleep mode without synchronization.

According to an embodiment, the Advanced Sleep Modes (ASM) have a wake-up time (minimum or guaranteed) per sleep mode. The shortest of the C-Plane-based sleep modes (e.g., SM #0) may be not defined by a minimum or guaranteed wake-up time but by go-to-sleep time.

The O-RU reporting to the O-DU and/or SMO based on yang modules such as, for example, as specified in the o-ran module.cap.yang, may also support of C-Plane messages such as Section Type 8 (ST8) "ready" message and C-Plane messages including a command scape (e.g., CARRIER-COMMAND, ARRAY-COMMAND, O-RU-COMMAND) such as, for example, a Section Type 4 (ST4) message.

The O-RU reporting to the O-DU and/or SMO based on yang modules such as, for example, as specified in the o-ran module.cap.yang, may also support sleep duration extension and emergency wake-up by M-Plane and/or C Plane messaging.

Moreover, the O-RU reporting to the O-DU and/or SMO based on yang modules such as, for example, as specified in the o-ran module.cap.yang may also provide information such as the percentage of achievable energy savings.

Furthermore, the O-RU reporting to the O-DU and/or SMO based on yang modules such as, for example, as specified in the o-ran module.cap.yang, may also support a notification messaging for CU plane active or inactive state, such as, for example, support a notification that may be required to ensure the CU plane become active after sleep duration expires (i.e., a CU plane circuit may be turned off in the case of defined, undefined, and/or longer sleep duration). To this end, the O-RU reporting to the O-DU and/or SMO supports notifications from O-RU to O-DU about CU plane status in case it is turned off during any of the sleep mode activations.

To this end, in the O-RU, similar to existing M-Plane models (e.g., similar to energy-saving by transmission blanks parameter that the O-RU may send to the O-DU) a modified set of parameters may be defined to enable the O-RU report energy savings parameters e.g., energy-saving-by-rf-channel-reconfiguration, energy-saving-by-advanced-sleep-modes, energy-saving-by-modify-number-of-spatial-streams, energy-saving-by-modifying-number-of-data-layers, etc. in order to report the supported energy saving modes (i.e., antenna array configuration capability information) and the hardcoded antenna array models along with the other initialization parameters to the O-DU.

Moreover, in an example embodiment, to ensure backward compatibility, the O-RU may mark an above-mentioned energy saving mode flag in the M-Plane yang models (e.g., an urn:o-ran:module-cap:1.0 and an urn:o-ran:hardware:1.0). to false, if O-RU does not support custom configurations or RF channel reconfigurations/antenna array selection approach for ES according to its hardcoded configuration vendor as set forth above.

According to an example embodiment, the TRx control methods to reconfigure the antenna array may include TRx control configurations that are identified by a respective unique configuration identity or name. The antenna array model of said TRx control configurations includes at least one antenna mask (antMask), wherein the antenna mask bits combination may be limited only to the supported TRx control configurations, wherein the antenna mask bits identify a '0' for antenna elements to be turned off and '1' for active elements of the antenna array. Moreover, TRx control configurations include in addition to the mask bits for at least one antenna mask (antMask), antenna layer mask bits for creating at least one antenna layer mask (antLayerMask).

According to an example embodiment, the supported TRx control configurations may comprise a transition time (i.e., different from a wake-up time of the ASMs) that defines a minimum or guaranteed time required to switch from baseline configuration to specific configuration (i.e., switch a baseline 64TRx antenna array to another antenna mask configuration such as, for example, a 32TRx antenna array model). The transition time associated with each configuration change for the supported TRx control configurations and as a function of sub-carrier spacing may be, for example, for 15 KHz, one slot is 1 millisecond, for 30 KHz, one slot is 0.5 millisecond or 500 microseconds, etc.
The term transition time is interchangeable with the term wake-up time and defines a time duration for a transition from one antenna array configuration to another antenna array configuration and vice versa. According to an example embodiment, the transition time/wake-up time may refer to the time duration for a transition from one antenna array model to another antenna array model and vice versa.

According to an example embodiment, the TRx control methods may include control to turn on/off entire RF Transceiver chains and/or Radio Frequency Front End (RFFE) of Radio Frequency (RF) processing unit pertaining to some of the RF channels/antenna elements.

Moreover, according to another example embodiment, the TRx control methods may include control to turn on/off Components, Circuits, IPs, Cores, Computing engines of the digital baseband and O-RAN Fronthaul processing units (i.e., physical components of the O-RU).

According to embodiments of the Advanced Sleep Modes (ASM) having short duration (C-Plane based) sleep modes and sleep modes having a long duration (M-Plane based) sleep modes the wake-up latency (i.e., the wake-up time or the go-to-sleep time) for said ASM and the wake-up latency of the TRx control methods may be different and not interfere with (e.g., hinder) each other.

In step 202, the O-RU receives an antenna array configuration comprising at least one antenna array model parameter that are supported by the O-RU via control plane (C-Plane) messaging or management plane (M-Plane) messaging. The supported antenna array configuration comprising at least one antenna array model parameter is based on the configuration capability information comprising the at least one antenna array model parameter of the O-RU and a request to reconfigure an antenna array from a higher-layer network function.

To this end, in step 202 the received antenna array configuration comprising at least one antenna array model parameter that are supported by the O-RU refer to the antenna array configuration comprising at least one antenna array model parameter that the O-DU applies via control plane (C-Plane) messaging or management plane (M-Plane) messaging (i.e., a C-Plane messaging or an M-Plane messaging for activating (i.e., applying) the change of an antenna array model on top of a baseline antenna array configuration of the O-RU.

According to the example embodiments as set forth in step 202 sleep modes may be control plane (C-Plane) and/or management plane (M-Plane) compatible depending on the sleep duration.

According to an example embodiments of the Advanced Sleep Modes (ASM) having short duration (C-Plane based) sleep modes and sleep modes having a long duration (M-Plane based) sleep modes the wake-up latency (i.e., the wake-up time or the go-to-sleep time) for said ASM and the wake-up latency of the TRx control methods (e.g., during a transition from one antenna array model to another antenna array model considering the transition time i.e., wake-up latency of the antenna configuration change) may be different and not interfere with (e.g., hinder) each other.

The term transition time is interchangeable with the term wake-up time and defines a time duration for a transition from one antenna array configuration to another antenna array configuration and vice versa. According to an example embodiment, the transition time/wake-up time may refer to the time duration for a transition from one antenna array model to another antenna array model and vice versa.

According to embodiments of the TRx control methods (e.g., the change an antenna array model on top of a baseline antenna array configuration of the O-RU based on the antenna array configuration comprising at least one antenna array model parameter supported by the O-RU), the antenna array configuration maybe activated via control plane (C-Plane) messaging and/or via management plane (M-Plane) messaging (i.e., an M-Plane command).

In step 203, the O-RU changes (i.e., reconfigures) an antenna array model on top of a baseline antenna array configuration of the O-RU (i.e., based on the received antenna array configuration comprising at least one antenna array model parameter that are supported by the O-RU, the O-RU changes (i.e., reconfigures) an antenna array model on top of a baseline antenna array configuration).

Alternatively, in a further step, according to an example embodiment, the O-RU sends a response to the antenna array configuration change (i.e., the antenna array model change) to the supported antenna array model via C-Plane messaging or M-Plane messaging to the O-DU.

In an example embodiment, the C-Plane messaging may be an acknowledgment message of the antenna array configuration change (i.e., the antenna array model change) to the supported antenna array configuration. In another example embodiment, the M-Plane messaging may be a notification of the antenna array configuration change to the supported antenna array configuration.

For example, the O-RU may notify a configuration change (i.e., the antenna array model change) during the transition from an antenna array configuration (e.g., a first antenna array configuration) to another antenna array configuration (e.g., a second antenna array configuration) considering the transition time (i.e., wake-up time). The notification may be to the O-DU via the hierarchical architecture of the O-RAN or to the higher-layer network functions (e.g., the SMO, RICs, etc.) via the hybrid architecture of the O-RAN.

According to an example embodiment, the O-RU may notify an antenna array configuration change (e.g., a back configuration to a baseline antenna array configuration) during the transition from the second antenna array configuration to the first antenna array configuration considering the transition time (i.e., wake-up time). For example, the O-RU notifies the rollback configuration change during the transition from an energy savings mode (i.e., the second antenna array configuration) to the baseline configuration (i.e., the first antenna array configuration) considering the transition time (i.e., wake-up time).

Figure 3:
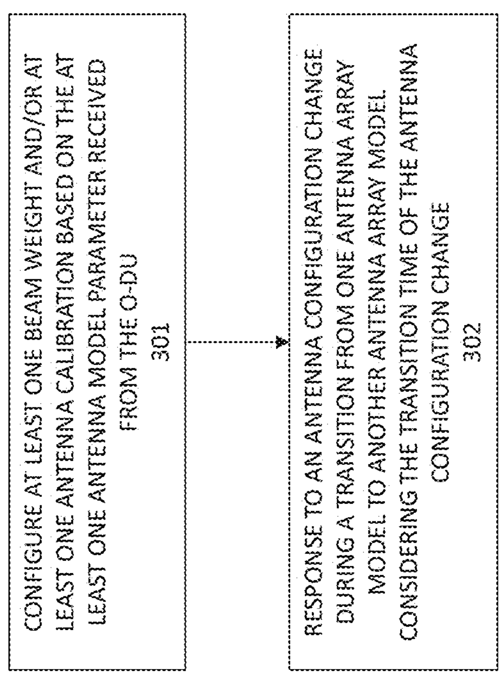
FIG. 3 illustrates a method for changing an antenna array model on top of the baseline antenna array according to an embodiment.

FIG. 3 illustrates a method for changing an antenna array model on top of the baseline antenna array. Referring to FIG. 3, in step 301, the O-RU configures at least one beam weight and/or at least one antenna calibration data set based on the at least one antenna model parameter received from the O-DU (i.e., the O-RU configures at least one beam weight and/or at least one antenna calibration data set that are predefined or generated beam weights that were applied by O-DU to O-RU for the respective antenna model to be activated. The predefined or generated beam weights that were applied by O-DU to O-RU are either based on the antenna configuration capability information comprising at least one antenna array model parameter or based on the antenna array configuration comprising at least one antenna array model parameter supported by the O-RU.

In step 302, the O-RU responses to an antenna configuration change during a transition from one antenna array model to another antenna array model considering the transition time of the antenna configuration change. Not limiting to the method in step 301, step 302 may be commenced independently from step 301 for example, to respond to an antenna configuration change during a transition from one antenna array model to another antenna array model considering the transition time of the antenna configuration change for at least one network energy saving (NES) method such as, for example, a TRx control process, sleep modes, etc.).

According to FIG. 3, in particular step 302 has the advantage, that NES embodiments such as, for example, the Advanced Sleep Modes (ASM) having short duration (C-Plane based) sleep modes, the sleep modes having a long duration (M-Plane based) sleep modes the wake-up latency (i.e., the wake-up time or the go-to-sleep time) for said ASM and the wake-up latency of the TRx control processes (i.e., methods) do not interfere with (e.g., hinder) each by considering the transition time (i.e., the wake-up time, the go-to-sleep, wake-up latency, etc. of the antenna configuration change.

The term transition time is interchangeable with the term wake-up time and defines a time duration for a transition from one antenna array configuration to another antenna array configuration and vice versa. According to an example embodiment, the transition time/wake-up time may refer to the time duration for a transition from one antenna array model to another antenna array model and vice versa.

Figure 4:
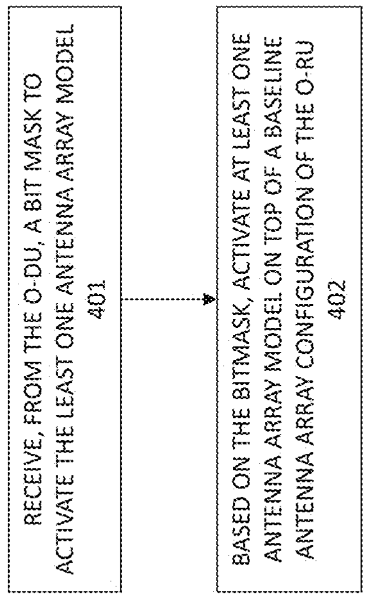
FIG. 4 illustrates a method for changing an antenna array model on top of the baseline antenna array according to another embodiment.

FIG. 4 illustrates a method for changing an antenna array model on top of the baseline antenna array. Referring to FIG. 4, the antenna configuration capability information comprises at least one antenna array model parameter to define at least one antenna array model among a plurality of predefined antenna array models that the O-RU is capable of activating. In step 401, the O-RU receives a bitmask to activate the least one antenna array model from the O-DU. In step 402, the O-RU activates at least one antenna array model on top of a baseline antenna array configuration of the O-RU based on the bitmask received from the O-DU.

According to FIG. 4, the method allows for a dynamic changing of antenna array configurations such as, for example, switching between one antenna array model to another antenna array model (i.e., muting (e.g., turning off) parts of an antenna array (i.e., antenna elements) along with their respective RF transceiver chains). This has the advantage that ES (i.e., NES) methods can be implemented with maximum efficiency due to the exchange of knowledge of the proprietary internal architectures (e.g., the O-RUs read-only (proprietary) parameters) with the O-DU.

The methods according to FIGS. 2 to 4 may be implemented in at least one apparatus comprising a memory to store instructions and at least one processor configured to execute instructions to implement the methods of FIGS. 2 to 4.

Referring to the method and apparatus according to the FIGS. 2 to 4 dynamical antenna array reconfiguration, e.g., a dynamic changing of antenna array configurations such as, for example, switching between one antenna array model to another antenna array model (i.e., muting (e.g., turning off) parts of an antenna array (i.e., antenna elements) along with their respective RF transceiver chains) has the advantage that ES methods can be implemented with maximum efficiency due to exchange of knowledge of the proprietary internal architectures (e.g., the O-RUs read-only (proprietary) parameters).

Figure 5:
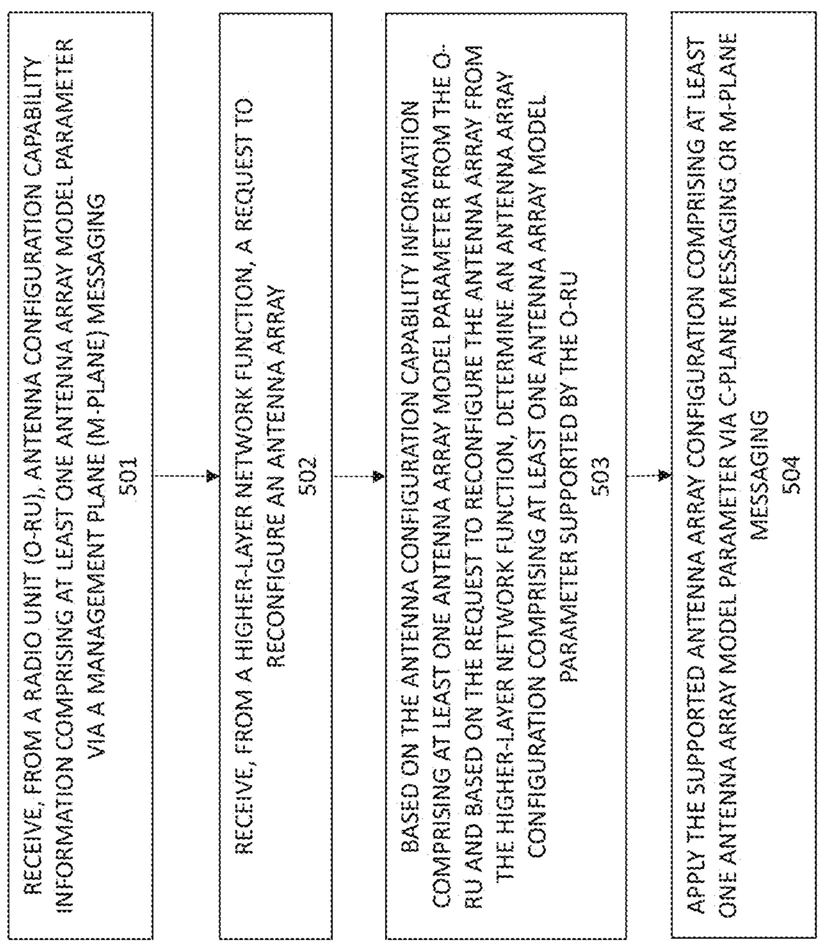
FIG. 5 illustrates a method for optimizing antenna array model selection in an O-RAN from the perspective or an O-DU according to an embodiment.

FIG. 5 illustrates a method for optimizing antenna array model selection in an O-RAN from the perspective or an O-DU. Referring to FIG. 5, in step 501, the O-DU receives, from a radio unit (O-RU), antenna configuration capability information comprising at least one antenna array model parameter via management plane (M-Plane) messaging (i.e., an M-Plane command). For example, the O-RU reports configuration capability information such as for example supported network energy saving (i.e., ES or NES) modes by O-RU-urn:o-ran:module-cap:1.0.

For example, the antenna configuration capability information may be hardcoded by the vendor during production along with at least one of the following parameters, a unique name, index, reference, etc. to identify the antenna array configuration capability (e.g., the technical specification of the antenna array), the number of spatial streams/layers supported against each configuration of the antenna array, the antenna calibration data to be applied by O-RU during the configuration change, a value referring to the achievable energy savings against each configuration, associated beam weights (pre-defined beam weights), etc. In an example embodiment, when O-RU is powered on (is initialized), the O-RU starts reporting supported energy saving modes (i.e., antenna array configuration capability information) and the hardcoded antenna array models along with the other initialization parameters to the O-DU using M-Plane yang models (e.g., an urn:o-ran:module-cap:1.0 and an urn:o-ran:hardware:1.0).

In an example embodiment, energy-saving-by-transmission-blanks parameter may be used for sending configuration capability information from the O-RU to the O-DU. This allows to the use of existing M-Plane models, to provide (i.e., define) new parameters to enable the O-RU to report new energy-saving parameters (e.g., energy-saving-by-rf-channel-reconfiguration, energy-saving-by-advanced-sleep-modes, energy-saving-by-modify-no-of-spatial-streams, etc.).

Regarding existing M-Plane yang models, to ensure backward compatibility, the O-RU may flag the above-mentioned energy saving mode to false, if the O-RU does not support custom configurations or RF channel reconfigurations/antenna array selection approach for ES.

In another example embodiment, O-RU configuration capability information may comprise supported features such as, for example, supported energy saving features in o-ran-wg4-features.yang. The O-RU may indicate the supported energy saving features in the o-ran-wg4-features.yang to O-RU controller (i.e., the O-DU or the higher-layer network functions (e.g., the SMO)).

According to an embodiment, in line with the O-RAN Open Fronthaul M-Plane Specification, which defines the Management Plane of the Open Fronthaul Interface as well as associated YANG models, the O-RU may indicate the supported energy-saving features in associated YANG models a Yang Features such as, for example, o-ran-wg4-features.yang, to an O-RU controller such as the O-DU and/or higher order network function (i.e., the SMO, etc.).

To this end, the O-RU configuration capability information may comprise O-RU-supported feature capabilities using YANG Feature Name Tags such as, for example, TRX-CONTROL, TRX-ON-OFF, ADVANCED-SLEEP-MODE, SLEEP-MODE, LIGHT-HIBERNATE-SLEEP, DEEP-HIBERNATE-SLEEP (i.e., DEEP SLEEP), etc.

The YANG Feature Name Tags TRX-CONTROL or TRX-ON-OFF may describe the turning on/off RF channels or Tx/Rx array elements (i.e., of RF channels or Tx/Rx array elements switch on or off), whereas an M-Plane activation as optional feature control may be not available.

The YANG Feature Name Tags ADVANCED-SLEEP-MODE or SLEEP-MODE may describe turning off carriers and associated O-RU circuit(s) and/or O-RU component(s) (i.e., muting and/switching on/off physical and functional components of the O-RU) based on the respective activated sleep mode, whereas an M-Plane activation as optional feature control may be not available.

The YANG Feature Name Tag HIBERNATE-SLEEP may describe an O-RU Energy saving by turning off carriers and associated O-RU circuits/components for a longer duration, wherein the longer duration in comparison to other sleep modes allows an optional feature control to be implemented hardware/component/energy-saving-enabled as an M-Plane based sleep mode.

The YANG Feature Name Tag LIGHT-HIBERNATE-SLEEP may describe O-RU Energy saving by turning off carriers and associated O-RU circuits/components for a longer duration without turning off synchronization, wherein the longer duration in comparison to other sleep modes allows an optional feature control to be implemented hardware/component/energy-saving-enabled as an M-Plane based sleep mode.

The YANG Feature Name Tag DEEP-HIBERNATE-SLEEP (i.e., DEEP SLEEP) may describe O-RU Energy saving by turning off carriers and associated O-RU circuits/components for a longer duration by turning off synchronization, wherein the longer duration in comparison to other sleep modes allows an optional feature control to be implemented hardware/component/energy-saving-enabled as an M-Plane based sleep mode.

According to an example embodiment, referring to the YANG Feature Name Tags ADVANCED-SLEEP-MODE or SLEEP-MODE may define various short duration (C Plane based) sleep modes, for example, the advanced sleep mode may be for shorter sleep duration like milliseconds, seconds, or minutes and activated, for example, with ST4 C Plane message by Control Plane (C-Plane) messaging.

According to an example embodiment, referring to the YANG Feature Name Tag HIBERNATE-SLEEP for longer duration a hibernate-sleep mode may be activated by employing M-Plane, for example, by setting the parameter+--rw energy-saving-enabled? boolean {ENERGYSAVING}? in the respective o-ran-hardware.yang module to "True" or "Yes".

According to an example embodiment, referring to the YANG Feature Name Tags LIGHT-HIBERNATE-SLEEP and DEEP-HIBERNATE-SLEEP in order to differentiate the longer sleep with and without turning off synchronization plane circuit, light-hibernate-sleep mode with synchronization and deep-hibernate-sleep mode without synchronization may be implemented in a same way as that of hibernate-sleep by employing the M-Plane, for example, by setting the parameter+--rw energy-saving-enabled? boolean {ENERGYSAVING}? in the respective o-ran-hardware.yang module to "True" or "Yes".

Referring to the O-RU reporting to the O-DU (i.e., the receiving of O-RU configuration capability information by the O-DU) based on yang modules such as, for example, as specified in the o-ran module.cap.yang, Advanced Sleep Modes (ASM) may support sleep modes (SM) having a short duration (C-Plane based) sleep modes (e.g., a plurality of Sleep modes such as, for example, SM #0, SM #1, SM #2, SM #3, etc., wherein the time duration of SM #0<SM #1<SM #2<SM #3) with different wake-up times or if the wake-up times is too short a defined go-to-sleep time. Moreover, the Advanced Sleep Modes (ASM) may support sleep modes having a long duration (M-Plane based) sleep modes (e.g., the hibernate sleep (i.e., deep sleep) that does not involve any synchronization or hibernate sleep (i.e., deep sleep) modes with or without synchronization, whereas the light hibernate sleep refers to an M-Plane based sleep mode with synchronization and the deep hibernate sleep refers to an M-Plane based sleep mode without synchronization.

According to an embodiment, the Advanced Sleep Modes (ASM) have a wake-up time (minimum or guaranteed) per sleep mode. The shortest of the C-Plane-based sleep modes (e.g., SM #0) may be not defined by a minimum or guaranteed wake-up time but by go-to-sleep time.

The O-RU reporting to the O-DU and/or SMO based on yang modules such as, for example, as specified in the o-ran module.cap.yang, may also support of C-Plane messages such as Section Type 8 (ST8) "ready" message and C-Plane messages including a command scape (e.g., CARRIER-COMMAND, ARRAY-COMMAND, O-RU-COMMAND) such as, for example, a Section Type 4 (ST4) message.

According to an example embodiment, the TRx control methods to reconfigure the antenna array may include TRx control configurations that are identified by a respective unique configuration identity or name. The antenna array model of said TRx control configurations includes at least one antenna mask (antMask), wherein the antenna mask bits combination may be limited only to the supported TRx control configurations, wherein the antenna mask bits identify a '0' for antenna elements to be turned off and '1' for active elements of the antenna array. Moreover, TRx control configurations include in addition to the mask bits for at least one antenna mask (antMask), antenna layer mask bits for creating at least one antenna layer mask (antLayerMask).

To this end, the O-RU may report its capabilities via Yang model o-ran-module-cap.yang for TRx control and data layer control. The Yang model o-ran-module-cap.yang may include the parameter following the summary.

```
+--rw module-capability
   +--ro ru-capabilities
//TRx control-Capability reporting
|+--ro trx-control-capability {or-feat: TRX-CONTROL}?
||  +--ro  number-of-supported-trx-control-configuration?
    Uint8//number of supported TRx control configuration.
   || +--ro supported-trx-control-configuration* [name]
|| | +--ro configuration-name
    string //unique name of each TRx control configuration
|| | +--ro antenna-mask?
    binary or bits //antMask list-antenna mask per TRx
       control config for all
|| | +--ro antenna-layer-mask?
    binary or bits //antLayerMask list-antenna layer mask
       per TRx control config for all
|| | +--ro transition-time or wake-up-time uint32
    //transition time (list) associated with each configura-
       tion change for the supported TRx control configu-
       rations and as a function of sub carrier spacing. Since
       for 15 KHz, 1 slot is 1 milli second, and for 30 KHz,
       1 slot is 0.5 milli second or 500 micro-seconds
|| | +--ro energy-saving-ratio
    uint8 //percentage of energy saving per TRx control
       configuration
//data-layer/spatial streams control—Capability reporting
|  +--ro data-layer-control-supported? boolean for-feat:
    TRX-CONTROL)? //Data layer control/limiting no of
    spatial streams supported by O-RU or not?
```

According to an example embodiment, the supported TRx control configurations may comprise a transition time (i.e., different from a wake-up time of the ASMs) that defines a minimum or guaranteed time required to switch from baseline configuration to specific configuration (i.e., switch a baseline 64TRx antenna array to another antenna mask configuration such as, for example, a 32TRx antenna array model or a 64TRx antenna array model). The transition time (i.e., wake-up time) associated with each configuration change for the supported TRx control configurations and as a function of sub-carrier spacing may be, for example, for 15 KHz, one slot is 1 millisecond, for 30 KHz, one slot is 0.5 millisecond or 500 microseconds, etc.

According to an example embodiment, the O-Ru may report data layer control capability or the capability of limiting of number of spatial streams by a Yang model o-ran-module-cap.yang as set forth above for at least one supported (i.e., given) antenna configuration.

In an example embodiment, the TRx of an antenna array (e.g., a 64T64R antenna array) may be kept active, whereas the gain (i.e., energy saving gain) may be realized from the turning off O-RU processing equipment by changing number of data layers/spatial streams. According to an example embodiment, the TRx control methods may include control to turn on/off entire RF Transceiver chains and/or Radio Frequency Front End (RFFE) of Radio Frequency (RF) processing unit pertaining to some of the RF channels/antenna elements.

Moreover, according to another example embodiment, the TRx control methods may include control to turn on/off Components, Circuits, IPs, Cores, Computing engines of the digital baseband and O-RAN Fronthaul processing units (i.e., physical components of the O-RU).

According to embodiments of the Advanced Sleep Modes (ASM) having short duration (C-Plane based) sleep modes and sleep modes having long duration (M-Plane based) sleep modes the wake-up latency (i.e., the wake-up time or the go-to-sleep time) for said ASM and the wake-up latency of the TRx control may be different and not interfere with (e.g., hinder) each other.

The O-RU reporting to the O-DU and/or SMO based on yang modules such as, for example, as specified in the o-ran module.cap.yang, may also support sleep duration extension and emergency wake-up by M-Plane and/or C Plane messaging.

Moreover, the O-RU reporting to the O-DU and/or SMO based on yang modules such as, for example, as specified in the o-ran module.cap.yang may also provide information such as the percentage of achievable energy savings.

Furthermore, the O-RU reporting to the O-DU and/or SMO based on yang modules such as, for example, as specified in the o-ran module.cap.yang, may also support a notification messaging for CU plane active or inactive state, such as, for example, support a notification that may be required to ensure the CU plane become active after sleep duration expires (i.e., a CU plane circuit may be turned off in the case of defined, undefined, and/or longer sleep duration). To this end, the O-RU reporting to the O-DU and/or SMO supports notifications from O-RU to O-DU about CU plane status in case it is turned off during any of the sleep mode activations.

In general, the o-ran-module-cap.yang relates to common O-RU capabilities (i.e., O-RU configuration capability information for sleep modes (e.g., advanced sleep modes), CU-Plane status reporting to implement the sleep modes (e.g., advanced sleep modes) and TRx control methods.

To this end, the o-ran-module-cap.yang among other YANG models may comprise all necessary information to implement an antenna array configuration support by the O-RU (i.e., based on said O-RU configuration capability information).

According to an example embodiment, the o-ran-module-cap.yang among other YANG models for TRx control methods to reconfigure the antenna array may include TRx control configurations that are identified by a respective unique configuration identity or name. The antenna array model of said TRx control configurations includes at least one antenna mask (antMask), wherein the antenna mask bits combination may be limited only to the supported TRx control configurations, wherein the antenna mask bits identify a '0' for antenna elements to be turned off and '1' for active elements of the antenna array. Moreover, TRx control configurations include in addition to the mask bits for at least one antenna mask (antMask), antenna layer mask bits for creating at least one antenna layer mask (antLayerMask).

The Yang model o-ran-module-cap.yang may include the parameters according to the following summary.

```
o-ran-module-cap.yang-Advanced sleep mode
+--rw module-capability
  +--ro ru-capabilities
|+--ro max-num-component-carriers? uint8
|x--ro max-num-bands? uint16
```

```
//Advanced sleep mode-Capability reporting
| +--ro advanced-sleep-mode-capability? enumeration
  for-feat: ADVANCED-SLEEP-MODE??
|| +--ro supported-sleep-modes* [name] //list of supported
  sleep modes like sleep mode 0, 1, 2, and 3 (SM #0-3)
|| | +--ro sleep-mode-name
  string //sleepMode0 (SM #1), sleepMode1 (SM #2),
    sleep Mode2 (SM #2), and sleep Mode3
(SM #3)
|| | +--ro wake-up-time
  uint32 //wake-up time list (minimum or guaranteed)
    associated with each sleep mode and represented in
    slots as a function of Sub carrier spacing. For e.g.,
    SM #1—L slots, SM #2—M slots, and SM #3—N
    slots. The wake-up time in slots are listed for all
    supported sub carrier spacing by O-RU. Since for 15
    KHz, 1 slot is 1 milli second, and for 30 KHz, 1 slot
    is 0.5 milli second or 500 micro-seconds.
|| | +--ro energy-saving-ratio
  uint8 //percentage of energy saving per sleep mode
| +--ro hibernate-sleep-capability {or-feat: HIBERNATE-
  SLEEP}? //option #1: longer sleep duration
|| +--ro hibernate-wake-up-time or wake-up-time-hiber-
  nate uint32 //wake-up time in milli seconds for hiber-
  nate sleep
| +--ro light-hibernate-sleep-capability {or-feat: LIGHT-
  HIBERNATE-SLEEP}? //option #2a: longer sleep
  duration with synchronization
|| +--ro lh-wake-up-time or wake-up-time-lh uint32//
  wake-up time in milli seconds for light hibernate sleep
| +--ro deep-hibernate-sleep-capability {or-feat: DEEP-
  HIBERNATE-SLEEP}? //option #2b: longer sleep
  duration without synchronization
|| +--ro dh-wake-up-time or wake-up-time-dh uint32
//wake-up time in milli seconds for deep hibernate sleep
|| +--ro supported-command-scape* enumeration//sup-
  ported ST4 command scape such as "CARRIER-COM-
  MAND, ARRAY-COMMAND, O-RU-COMMAND"
  to be reported by O-RU. For e.g., one or two or all three
|| +--ro st8-ready-msg-supported? boolean//O-RU already
  reports the support of Section Type (ST) 8 message in
  supported-section-types, hence in NES perspective
  support of "ready" command in ST8 message to
  reported by O-RU as a capability
|| +--to sleep-duration-extension-supported? boolean //in
  defined sleep, if O-DU wants to extend the ongoing
  sleep it can issue sleep extension C Plane command
  (short sleep duration) and M-Plane command (long
  sleep duration). The supported of this could be adver-
  tised by O-RU as an optional.
|| +--ro emergency-wake-up-by-cplane-command-sup-
  ported? boolean //(in defined (not guaranteed) or unde-
  fined sleep duration, O-DU could any time interrupt the
  sleep by issuing emergency wake-up C Plane com-
  mand, provided CU plane remain active or CU plane
  circuit ON. This support could be advertised by O-RU
  as an optional.
|| +--ro emergency-wake-up-by-mplane-command-sup-
  ported? boolean //(in defined (not guaranteed) or unde-
  fined sleep duration, O-DU could any time interrupt the
  sleep by issuing emergency wake-up command via an
  M-Plane as CU plane is turned off. This support could
  be advertised by O-RU as an optional.
```

Referring the summary above to the Common O-RU capabilities may be for both TRx control and Advanced sleep mode.

According to an example embodiment, the supported TRx control configurations may comprise a transition time (i.e., different from a wake-up time of the ASMs) that defines a minimum or guaranteed time required to switch from baseline configuration to specific configuration (i.e., switch a baseline 64TRx antenna array to another antenna mask configuration such as, for example, a 32TRx_antenna array model). The transition time (i.e., wake-up time) associated with each configuration change for the supported TRx control configurations and as a function of sub-carrier spacing may be, for example, for 15 KHz, one slot is 1 millisecond, for 30 KHz, one slot is 0.5 millisecond or 500 microseconds, etc.

The term transition time is interchangeable with the term wake-up time and defines a time duration for a transition from one antenna array configuration to another antenna array configuration and vice versa. According to an example embodiment, the transition time/wake-up time may refer to the time duration for a transition from one antenna array model to another antenna array model and vice versa.

According to an example embodiment, the TRx control methods may include control to turn on/off entire RF Transceiver chains and/or Radio Frequency Front End (RFFE) of Radio Frequency (RF) processing unit pertaining to some of the RF channels/antenna elements.

Moreover, according to another example embodiment, the TRx control methods may include control to turn on/off Components, Circuits, IPs, Cores, Computing engines of the digital baseband and O-RAN Fronthaul processing units (i.e., physical components of the O-RU).

According to embodiments of the Advanced Sleep Modes (ASM) having short duration (C-Plane based) sleep modes and sleep modes having long duration (M-Plane based) sleep modes the wake-up latency (i.e., the wake-up time or the go-to-sleep time) for said ASM and the wake-up latency of the TRx control methods may be different and not interfere with (e.g., hinder) each other.

Moreover, regarding common capability parameters to be reported by O-RU configuration capability information to the O-DU via an M-Plane for both TRx control methods and sleep modes (e.g., advanced sleep modes) may include C-Plane ST8 "ready" messages and sleep duration extension (e.g., in case of defined sleep, if the O-DU needs to extend a sleep mode it send a sleep extension command just before the start of wake-up time). In case the CU-Plane remains active, the extension command may be C-Plane-based for short sleep durations. In case the CU-Plane is turned off the extension command may be M-Plane based for long sleep durations.

Furthermore, common capability parameters are to be reported by O-RU configuration capability information to the O-DU via an M-Plane for both TRx control methods and sleep modes (e.g., advanced sleep modes) may include an emergency wake-up of O-RU from sleep. This capability may be reported by O-RU via an M-Plane. For example, in case of sleep mode interruption, if the O-DU needs to interrupt a sleep mode it sends a sleep mode interruption command. In case the CU-Plane remains active, the emergency wake-up command may be C-Plane-based for short sleep durations (defined or undefined). In case the CU-Plane is turned off the emergency wake-up command may be M-Plane-based for long sleep durations (defined or undefined).

According to an example embodiment, the o-ran-module-cap.yang among other YANG models for CU-Plane status reporting (e.g., to implement O-RU capabilities for defined and undefined sleep modes). The o-ran-module-cap.yang comprises information to enable a CU Plane circuit to be turned off to attain additional energy saving. The information may include a name identifier and a status identifier of the Rx-array-carriers as well as a name identifier, action identifier and state for the cu-plane in order to report the user plane configuration. Based on the above information, the O-DU may turn on or wake-up CU-Plane circuit through the M-Plane. According to an example embodiment, a notification is needed to indicate if CU-Plane become active or not (wake-up from sleep), the same may be defined in the o-ran-uplane.yang, respectively.

The Yang model o-ran-uplane.yang may include the parameter according to the following summary.

+--ro rx-array-carriers* [name]

+--ro name→/user-plane-configuration/rx-array-carriers/name

+--ro state?→>/user-plane-configuration/rx-array-carriers/state

+---n cu-plane-state-change

+--ro cu-plane [name]

+--ro active?→/user-plane-configuration/cu-plane/active; Active/Inactive

+--ro state?→/user-plane-configuration/cu-plane/state: Enabled/Disabled

According to an example embodiment for the use case RF Channel Reconfiguration (i.e., RF Channel Switch Off/On) a sub use case may be defined as TRx Control (i.e., a Tx array control and Rx array control may be claimed separately since antenna masks may be defined per array level. For this sub use case, the O-RU may include at least one of the following capability reporting (i.e., configuration capability information). The configuration capability information may include among other capability reporting at least the reporting of support of a C-Plane and an M-Plane based TRx control activation/deactivation, the reporting of a list of supported antenna array configuration/TRx control configurations (e.g., valid antenna mask values (per antenna array configuration values) along with unique name, the reporting of wake-up time/duration as a function of SCS (Sub-carrier spacing) (i.e., this wake-up may be different from the wake-up time/duration reported for Advanced sleep mode), the reporting of the support of TRx control sleep modes, the reporting of the amount of achievable energy saving/power saving/energy saving ratio per antenna array configuration (Tx array and/or Rx array) or TRx control (Tx control and/or Rx control), the reporting of the support of defined and undefined duration sleep, ST8 ready message, sleep duration extension, and emergency wake-up and the reporting of the O-RU internal architecture (functional blocks) using valid yang data model parameters to attain maximum energy savings (i.e., exposing the O-RU internal architecture).

According to another example embodiment for the use case RF Channel Reconfiguration (i.e., RF Channel Switch Off/On) a sub use case may be defined as Data layer Control. For this sub use case, the capability reporting (i.e., configuration capability information) may include a list of maximum supported spatial streams/data layers per antenna array (TRx Control) configuration.

According to another example embodiment a use case may be defined as Advanced Sleep Mode. For this sub use case, the O-RU may include at least one of the following capability reporting (i.e., configuration capability information). The configuration capability information may include among other capability reporting at least the reporting of a wake-up duration associated with each sleep mode as a function of the SCS, the reporting of the amount of achievable energy saving per sleep mode type, the reporting of the support of defined and undefined duration sleep, ST8 ready message, sleep duration extension, and emergency wake-up.

According to another example embodiment for the use case RF Channel Reconfiguration (i.e., RF Channel Switch Off/On) a sub use case may be defined as Hibernate sleep. For this sub use case, the O-RU may include at least one of the following capability reporting (i.e., configuration capability information). The configuration capability information may include among other capability reporting at least the reporting of support of Hibernate sleep (i.e., deep sleep) such as long duration sleep (light/deep sleep), the reporting of support of removal/de-configuring the carriers by the O-RU during long sleep, the reporting of support of turning off the C-Plane, U-Plane, S-Plane, and M-Plane processing units (i.e., the support of an O-DU request (e.g., by sending appropriate RPC(s)) or by the O-RU's internal logic)).

In step 502, the O-DU receives the request to reconfigure an antenna array from the higher-layer network function. The request to reconfigure an antenna array is based on monitored network parameter satisfying a predetermined condition. In example embodiment, the higher-layer network function may determine whether a current network parameter (e.g., a current network parameter reflected by the O1-related KPIs such as, for example, throughput, number of users in a cell, user statistics, etc.) is satisfying a predetermined condition (i.e., a predetermined threshold that relates to O-RAN network condition), The predetermined network parameter may be based on Rank Indicator (RI) value shared by a UE, traffic scenarios, etc. that can be derived by said O1 interface related KPIs such as, for example, throughput, number of users in a cell, user statistics, etc.).

In step 503, the O-DU determines an antenna array configuration comprising at least one antenna array model parameter supported by the O-RU. The determined antenna array configuration is based on the antenna configuration capability information comprising at least one antenna array model parameter from the O-RU and based on the request to reconfigure the antenna array from the higher-layer network function as set forth above.

In FIGS. 2 and 5, the antenna configuration capability information comprising at least one antenna array model parameter from the O-RU and information based on the request to reconfigure the antenna array from the higher-layer network function may be similar and interchangeable.

In step 504, the O-DU applies the supported antenna array configuration comprising at least one antenna array model parameter via C-Plane messaging or M-Plane messaging (i.e., via C-Plane messaging or an M-Plane messaging for activating (i.e., applying) an antenna array model change on top of a baseline antenna array configuration of the O-RU based on to the supported antenna array configuration).

According to the example embodiments as set forth in step 501, sleep modes may be a control plane (C-Plane) or management plane (M-Plane) compatible depending on the sleep duration.

According to an example embodiments of the Advanced Sleep Modes (ASM) having short duration (C-Plane based) sleep modes and sleep modes having a long duration (M-Plane based) sleep modes the wake-up latency (i.e., the wake-up time or the go-to-sleep time) for said ASM and the wake-up latency of the TRx control methods may be different and not interfere with (e.g., hinder) each other.

Alternatively in further step (i.e., as set forth in FIG. 3), the O-DU receives, via response C-Plane messaging or response M-Plane messaging (i.e., a via C-Plane messaging or M-Plane messaging that is different from a C-Plane messaging or an M-Plane messaging for activating (i.e., applying) an antenna array model change based on to the supported antenna array configuration comprising the at least one antenna array model parameters) from the O-RU.

The C-Plane messaging or M-Plane messaging is a response to an antenna array configuration change to the supported antenna array configuration. In an example embodiment, the C-Plane messaging may be an acknowledgement message of the antenna array configuration change to the supported antenna array configuration. In another example embodiment, the M-Plane messaging may be a notification of the antenna array configuration change to the supported antenna array configuration.

Figure 6:
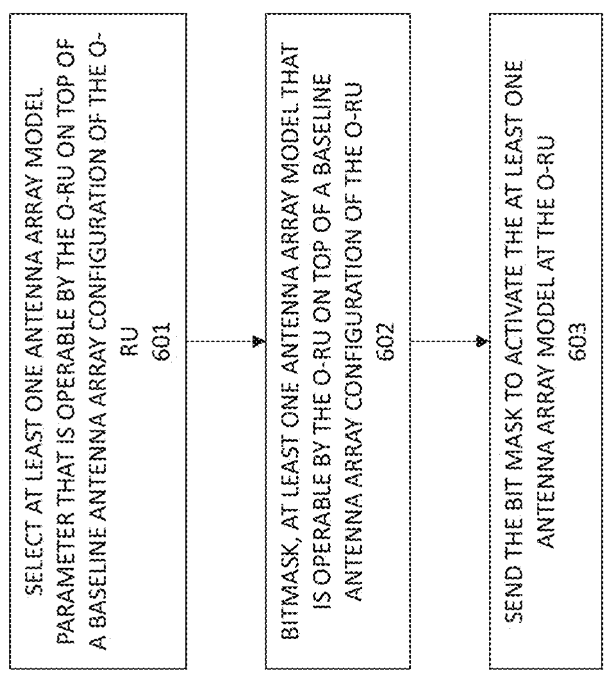
FIG. 6 illustrates a method for selecting at least one antenna array model parameter that is operable by the O-RU according to an embodiment.

FIG. 6 illustrates a method for selecting at least one antenna array model parameter that is operable by the O-RU. Referring to FIG. 6, in step 601, the O-DU selects (e.g., generates, determines, etc.) at least one antenna array model parameter that is operable by the O-RU on top of a baseline antenna array configuration of the O-RU. According to an embodiment, the O-DU determines at least antenna array model parameter supported by the O-RU based on the antenna configuration capability information comprising at least one antenna array model parameter from the O-RU and based on the request to reconfigure the antenna array from the higher-layer network function. According to an example embodiment, the at least antenna array model parameter allows to, for example, to generate, select, determine etc. a bitmask at least one antenna array model that is operable by the O-DU on top of a baseline antenna array configuration of the O-DU.

In step 602, the O-DU bitmasks, at least one antenna array model that is operable by the O-RU on top of a baseline antenna array configuration of the O-RU based on the selected at least one antenna array model parameter. In step 603, the O-DU sends the bitmask to activate the at least one antenna array model at the O-RU. In an example embodiment, the bitmasking in step 602, may refer to indexing an antenna array model and step 603 refers to sending to at least one index of an antenna array model as at least one antenna array model parameter (e.g., at one least one offset parameter).

According to FIG. 6, the method allows for a dynamic changing of antenna array configurations such as, for example, switching between one antenna array model to another antenna array model (i.e., muting (e.g., turning off) parts of an antenna array (i.e., antenna elements) along with their respective RF transceiver chains). This has the advantage that ES (i.e., NES) methods can be implemented with maximum efficiency due to exchange of knowledge of the proprietary internal architectures (e.g., the O-RUs read-only (proprietary) parameters) with the O-DU.

The methods according to FIG. 5 and FIG. 6 may be implemented in at least one apparatus comprising a memory to store instructions and at least one processor configured to execute instructions to implement the method of FIGS. 5 and 6.

Referring to the method and apparatus according to the FIG. 5 and FIG. 6 dynamical antenna array reconfiguration, e.g., a dynamic changing of antenna array configurations such as, for example, switching between one antenna array model to another antenna array model (i.e., muting (e.g., turning off) parts of an antenna array (i.e., antenna elements) along with their respective RF transceiver chains) has the advantage that ES methods can be implemented with maximum efficiency due to exchange of knowledge of the proprietary internal architectures (e.g., the O-RUs read-only (proprietary) parameters).

Figure 7:
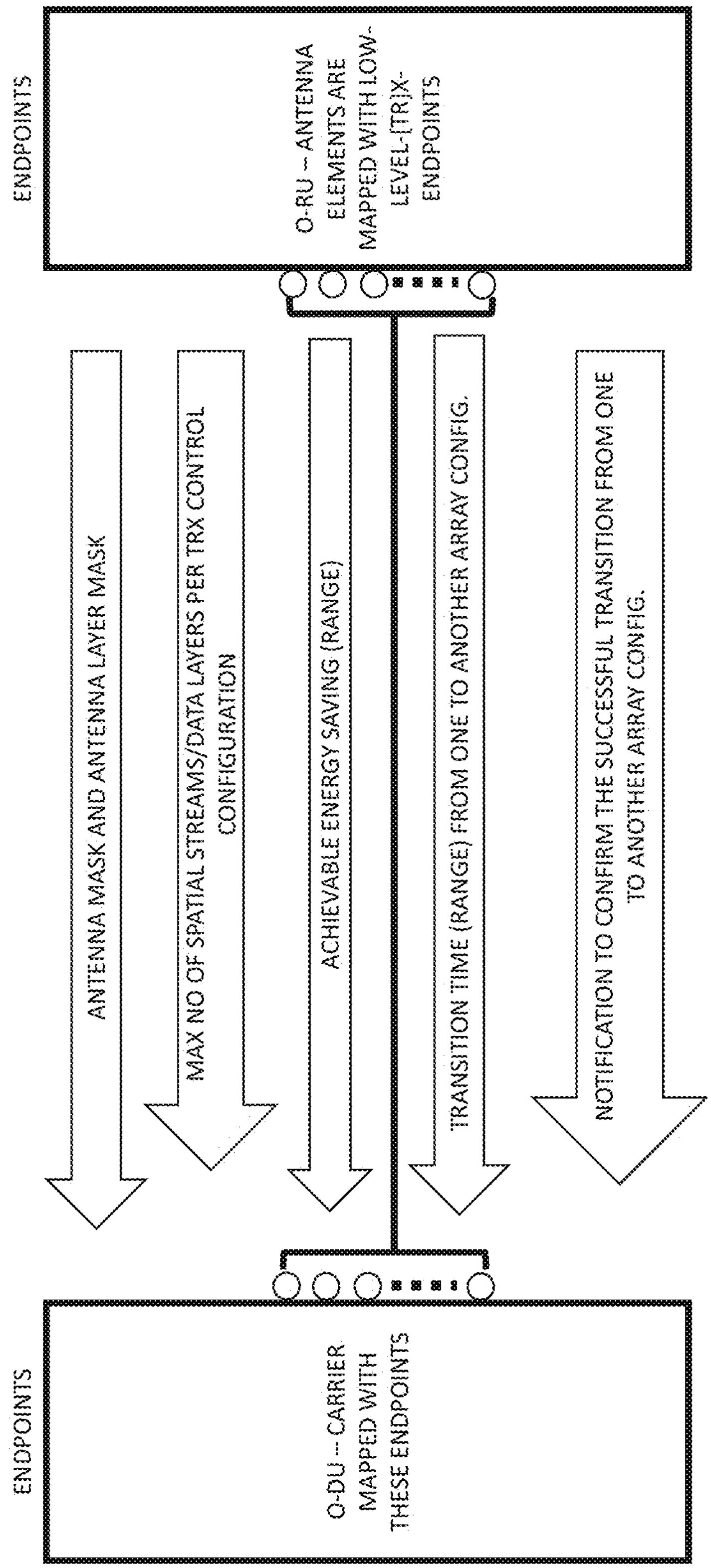
FIG. 7 illustrates a method of M-Plane messaging comprising a Yang model for capability reporting of TRx control parameters along with a Yang model for capability reporting of data layer control parameters according to an embodiment.

FIG. 7 illustrates a method of M-Plane messaging comprising a Yang model for capability reporting of TRx control parameters along with a Yang model for capability reporting of data layer control parameter.

Referring to FIG. 7, the O-RU reports its capability information to implement TRx control based on the Yang model for capability reporting of TRx control methods to O-DU. Based on the TRx control parameters and requirements to the O-RU differ. The O-DU uses the capability information to apply a supported antenna array configuration (i.e., applying a supported antenna array configuration for the respective TRx control method (i.e., TRx control process).

In an example embodiment, the antenna configuration capability information of the O-RU may comprise at least one antenna array model parameter (i.e., data defining at least one antenna array model) according to the O-RU's specific antenna array configuration (i.e., the O-RU internal architecture), wherein, while applying the TRx control process to reconfigure the antenna array, the O-DU may select (e.g., determine or generate) at least one antenna array model that is operable by the O-RU on top of a baseline antenna array configuration. For example, the O-DU may bitmask at least one (selected) antenna array model based on antenna configuration capability information of the O-RU (i.e., the antenna array model based that is operable by the O-RU on top of a baseline antenna array configuration of the O-RU). In this case, the O-DU may send the bitmask to be activated the least one antenna array model to the O-RU.

In another example embodiment, the antenna configuration capability information of the O-RU may comprise at least one antenna array model parameter (i.e., data defining at least one antenna array model) according to the O-RU's specific antenna array configuration (i.e., the O-RU internal architecture), wherein, while applying the TRx control process to reconfigure the antenna array, the O-DU may select (i.e., determine, generate, etc.) at least one antenna array model that is operable by the O-RU on top of a baseline antenna array configuration, wherein the (selected) antenna array model is defined by an offset parameter which, for example, may be reported by the O-RU to the O-DU (i.e., the antenna array model is operable by the O-RU on top of a baseline antenna array configuration of the O-RU). In this case, the O-DU may send the offset parameter referring to the (selected) antenna array model to be activated to the O-RU.

The offset parameter comprises a first offset value in a horizontal direction (x-direction) and a second offset value in a vertical direction (y-direction) of the antenna array, wherein the first offset value denotes an inter-element spacing (dx) from a left bottom side of the antenna array that defines at least one column of antenna elements to be muted with the antenna array in x-direction towards a right bottom side of the antenna array and wherein the second offset value denotes an inter-element spacing (dy) from the left bottom side of the antenna array that defines at least one row of antenna elements to be muted with the antenna array in y-direction to a left upper side of the antenna array.

In general, the o-ran-module-cap.yang relates to common O-RU capabilities (i.e., O-RU configuration capability information for sleep modes (e.g., advanced sleep modes), CU-Plane status reporting to implement the sleep modes (e.g., advanced sleep modes) and TRx control methods.

To this end, the o-ran-module-cap.yang among other YANG models may comprise all necessary information to implement an antenna array configuration support by the O-RU (i.e., based on said O-RU configuration capability information).

According to an example embodiment, the o-ran-module-cap.yang among other YANG models for TRx control methods to reconfigure the antenna array may include TRx control configurations that are identified by a respective unique configuration identity or name. The antenna array model of said TRx control configurations includes at least one antenna mask (antMask), wherein the antenna mask bits combination may be limited only to the supported TRx control configurations, wherein the antenna mask bits identify a '0' for antenna elements to be turned off and '1' for active elements of the antenna array. Moreover, TRx control configurations include in addition to the mask bits for at least one antenna mask (antMask), antenna layer mask bits for creating at least one antenna layer mask (antLayerMask).

According to an example embodiment, the TRx control methods may include control to turn on/off entire RF Transceiver chains and/or Radio Frequency Front End (RFFE) of Radio Frequency (RF) processing unit pertaining to some of the RF channels/antenna elements.

Moreover, according to another example embodiment, the TRx control methods may include control to turn on/off Components, Circuits, IPs, Cores, Computing engines of the digital baseband and O-RAN Fronthaul processing units (i.e., physical components of the O-RU).

According to an example embodiment for the use case RF Channel Reconfiguration (i.e., RF Channel Switch Off/On) a sub use case may be defined as TRx Control (i.e., a Tx array control and Rx array control may be claimed separately since antenna masks may be defined per array level. For this sub use case, the O-RU may include at least one of the following capability reporting (i.e., configuration capability information). The configuration capability information may include among other capability reporting at least the reporting of support of a C-Plane and an M-Plane based TRx control activation/deactivation, the reporting of a list of supported antenna array configuration/TRx control configurations (e.g., valid Antenna mask values (per antenna array configuration values) along with an index and/or an unique name, the reporting of wake-up time/duration as a function of SCS (Sub-carrier spacing) (i.e., this wake-up may be different from the wake-up time/duration reported for Advanced sleep mode), the reporting of the support of TRx control sleep modes, the reporting of the amount of achievable energy saving/power saving/energy saving ratio per antenna array configuration (Tx array and/or Rx array) or TRx control (Tx control and/or Rx control), the reporting of the support of defined and undefined duration sleep, ST8 ready message, sleep duration extension, and emergency wake-up and the reporting of the O-RU internal architecture (functional blocks) using valid yang data model parameters to attain maximum energy savings (i.e., exposing the O-RU internal architecture).

The reporting of energy saving by TRx control may be reported by parameters of a Yang model o-ran-module-cap.yang according to the following summary:

The format for the module capabilities module is provided as follows;

| +--ro energy-saving-by-transmission-blanks boolean
| +--ro energy-saving-by-trx-control boolean //TRx control—various antenna configuration for energy savings
| +--ro energy-saving-by-advanced-sleep-modes boolean
|| +--ro advanced-sleep-modes enum

|| +--ro micro-sleep-mode-supported? Boolean //O-DU read this response (either 'Yes' or 'No') and get to know whether O-RU supports micro sleep or not-Option #1

|| + ---micro-sleep-mode-supported/Notification to indicate whether micro-sleep mode supported or not-Option #2

| +--ro CU-plane-active-state enum //this capability to indicate CU plane circuit is awake and active to receive messages from O-DU. For e.g., during sleep mode, CU plane circuit turned off sometime and wake-up. With the current notification framework, only carrier active state is being reported by O-RU to O-DU. It is required to notify O-DU that CU plane is waked up from sleep and active before hand, so that O-DU can start scheduling CU plane packets.

|+--ro eaxcid-grouping-capabilities {o-ran-module-cap: EAXC-ID-GROUP-SUPPORTED}?

According to another example embodiment for the use case RF Channel Reconfiguration (i.e., RF Channel Switch Off/On) a sub use case may be include the capability reporting (i.e., configuration capability information) of the O-RU that supports a list of maximum supported spatial streams/data layers per antenna array (TRx Control) configuration. For example, this a sub use case may be defined as Data Layer Control.

According to another example embodiment for the use case of Advanced Sleep Modes, the O-RU may include at least one of the following capability reporting (i.e., configuration capability information). The configuration capability information may include among other capability reporting at least the reporting of a wake-up duration associated with each sleep mode as a function of the SCS, the reporting of the amount of achievable energy saving per sleep mode type, the reporting of the support of defined and undefined duration sleep, ST8 ready message, sleep duration extension, and emergency wake-up.

According to an example embodiment, the supported TRx control configurations may comprise a transition time (i.e., different from a wake-up time of the ASMs) that defines a minimum or guaranteed time required to switch from baseline configuration to specific configuration (i.e., switch a baseline 64TRx antenna array to another antenna mask configuration such as, for example, a 32TRx_antenna array model). The transition time (i.e., wake-up time) associated with each configuration change for the supported TRx control configurations and as a function of sub-carrier spacing may be, for example, for 15 KHz, one slot is 1 millisecond, for 30 KHz, one slot is 0.5 millisecond or 500 microseconds, etc.

The Yang model o-ran-module-cap.yang may include the parameters according to the following summary.

TRx control configurations and associated parameter reporting—o-ran-uplane-conf.yang

| +--rw name string

| +--rw sro-id?→/or-user:users/user/sro-id {feat: SHARED-ORU-MULTI-OPERATOR}?

| +--rw processing-element ~>/o-ran-pe: processing-elements/ru-elements/name

|+--rw transport-session-type? enumeration {feat: MULTIPLE-TRANSPORT-SESSION-TYPE}?

| +--rw transport-qualified-processing-element?→/o-ran-pe: processing-elements/additional-transport-session-type-elements [o-ran-pe:transport-session-type=current ( )/ . . . /transport-session-type]/ru-elements/name {feat: MULTIPLE-TRANSPORT-SESSION-TYPE}?

+--rw tx-array-carrier→/user-plane-configuration/tx-array-carriers/name

//trx control

| +--ro trx-control-configurations

//antenna mask and no of antenna layers reporting

|| +--ro antLayerMaskunint16//no of antenna layers to be reported by O-RU vendor

|| +--ro antMask unint32//all supported configurations have antenna mask lists consists of [0, 1, . . . x] matrix→this will be mapped with 1s (for antenna elements to be turned off) and 0s (For active antenna elements)); If antMask bits beyond total no of antenna elements, the remaining bits to be set as zero so that O-DU ignore those additional bits

|||+--ro x decimal64// no of TRx

//reporting of achievable energy saving against each trx control antenna configuration //Option #1

|| +--ro achievable-energy-saving-range decimal64 //list that contains the energy saving values calculated (based on power consumption against each configuration) for all TRx control configurations under different environmental conditions; these informations to be shared by O-RU vendor as it is design specific //Option #2

|| +--ro achievable-energy-saving-trx-control decimal64 //list that contains best possible energy saving achievable for all supported configurations //reporting of transition time against each trx control antenna configuration

|| +--ro transition-time decimal64 //list that contains transition time achievable for all supported configurations depending on the environmental condition and based on no of trx channel On/Off; in terms of symbols, slots, ms, sec, mins, hours //notification to ensure the transition from one trx control antenna configuration to another

|| +===n trx-control-configuration-state-change//Notification to confirm the successful transition (Active state-change by O-RU) from one configuration to another or baseline so that O-DU can schedule data according to the present configuration.

//data-layer/spatial streams control

| +--ro max-no-of-spatial-streams-per-trx-control-configuration unint32 //limiting the no of spatial streams/data layers per TRx control configurations

Figure 8:
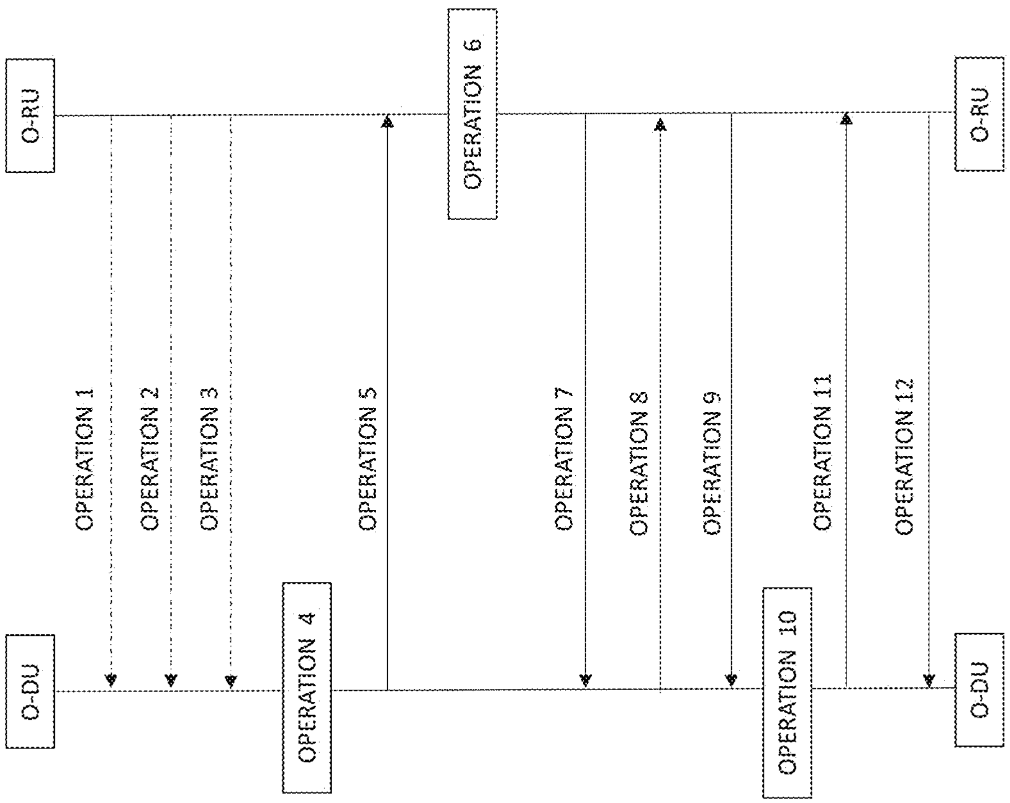
FIG. 8 illustrates a flowchart for M-Plane/C-Plane messaging between an O-RU and an O-DU for the use case of TRx control.

|| +--ro achievable-energy-saving-spatial-streams-control decimal64 //energy saving by data layers/spatial streams control on top of TRx control configurations FIG. 8 illustrates a flowchart for M-Plane/C-Plane messaging between an O-RU and an O-DU for the use case of TRx control. Referring to FIG. 8, in operation 1, the O-RU provides the O-DU with M-Plane messaging parameter (i.e., Yang model parameters) "antMask" and "antLayerMask" based on the TRx control configurations and/or antenna models supported by the O-RU (i.e., configuration capability information may comprise TRx control configurations and/or antenna models).

In operation 2, the O-RU provides the O-DU with achievable energy savings per configuration (i.e., array configuration such as TRx control configurations, antenna models, etc.).

In operation 3, the O-RU provides the O-DU with the transition time for switching from one configuration (i.e., array configuration such as TRx control configurations, antenna models, etc.) to another or rolling back to a baseline configuration.

In general, operations 1 to 3 as set forth above refer to the O-RU capability reporting to the O-DU (i.e., to the receiving of configuration capability information of the O-RU by the O-DU).

In operation 4, O-DU updates the number of bits (x) to represent the parameter "antMask" (e.g., if the O-RU reports 64TRx (baseline configuration) the parameter antMask has the value [5:0]. Moreover, the O-DU stores the number of TRx configurations supported by the O-RU, the transition time thereof, and the approximate energy saving per configuration as reported by the O-Ru in operations 1 to 3. In an example embodiment, referring to bit masking of the antenna array the total number of TRxs (antennas) may refer to a parameter having a value [0, 1, 2, 3, 4, 5, 6, 7, . . . x]. A parameter referring to a baseline antenna configuration may have the value [0, 0, 0, 0, 0, . . . x], wherein "0" value denotes an active element and "1" value denotes a deactivated element (i.e., an element to be turned off). Moreover, a parameter referring to a TRx control configuration may have a value of [1, 1, 1, 1, 1, 0, 0, 0, 0, 0, . . . x], wherein "0" value denotes an active element and "1" value denotes a deactivated element (i.e., an element to be turned off).

In operation 5, based on a higher-layer network function request, the O-DU activates the specific antenna configuration for a definite or undefined time duration.

In operation 6, the O-RU configures the TRx corresponding to antMask bits. To this end, TRx elements assigned to '0' to turn off/keep inactive/put to sleep and '1' for turn on/keep active with associated circuits or components (e.g., RF components such as RF Transceiver and RF channels (PA/LNA, etc., digital components, base band components, etc.). Furthermore, according to an example embodiment, the O-RU may wait for message and/or commands via the C-Plane or the M-Plane for further action.

In operation 7, the O-RU provides the O-DU with O-RU sends the notification conform the successful/failure of a transition from one TRx control configuration to another TRx control configuration or a rollback to a baseline configuration (i.e., a report of a change of array configuration from a first array configuration to a second array configuration or vice versa.

In operation 8, in case a failure occurs during configuration change, the O-DU either retry or rolls back to a working configuration (i.e., the current configuration) or takes appropriate action (e.g., report to higher-layer network functions and/or commence fail-safe procedures).

In operation 9, the O-RU reports the power consumption using the performance counter "epe-stats", In operation 10, O-DU monitors the power consumption for both baseline configuration and TRx control antenna configuration. Moreover, the O-DU either forwards the power consumption data to a higher-layer network function or calculates the energy savings per configuration for future reference.

In operation 11, once network usage becomes normal, the O-DU sends an ST4 message, wherein the antMask with all zeros brings back the baseline antenna configuration.

In operation 12, the O-RU sends the notification to confirm the successful transition to baseline antenna configuration.

According to FIG. 7 and FIG. 8. a dynamical antenna array reconfiguration, (e.g., a dynamic changing of antenna array configurations such as, for example, switching between one antenna array model to another antenna array model (i.e., muting (e.g., turning off) parts of an antenna array (i.e., antenna elements) along with their respective RF transceiver chains) has the advantage that ES methods can be implemented with maximum efficiency due to exchange of knowledge of the proprietary internal architectures (e.g., the O-RUs read-only (proprietary) parameters based on the antenna array capability information as set forth above.

Figure 9:
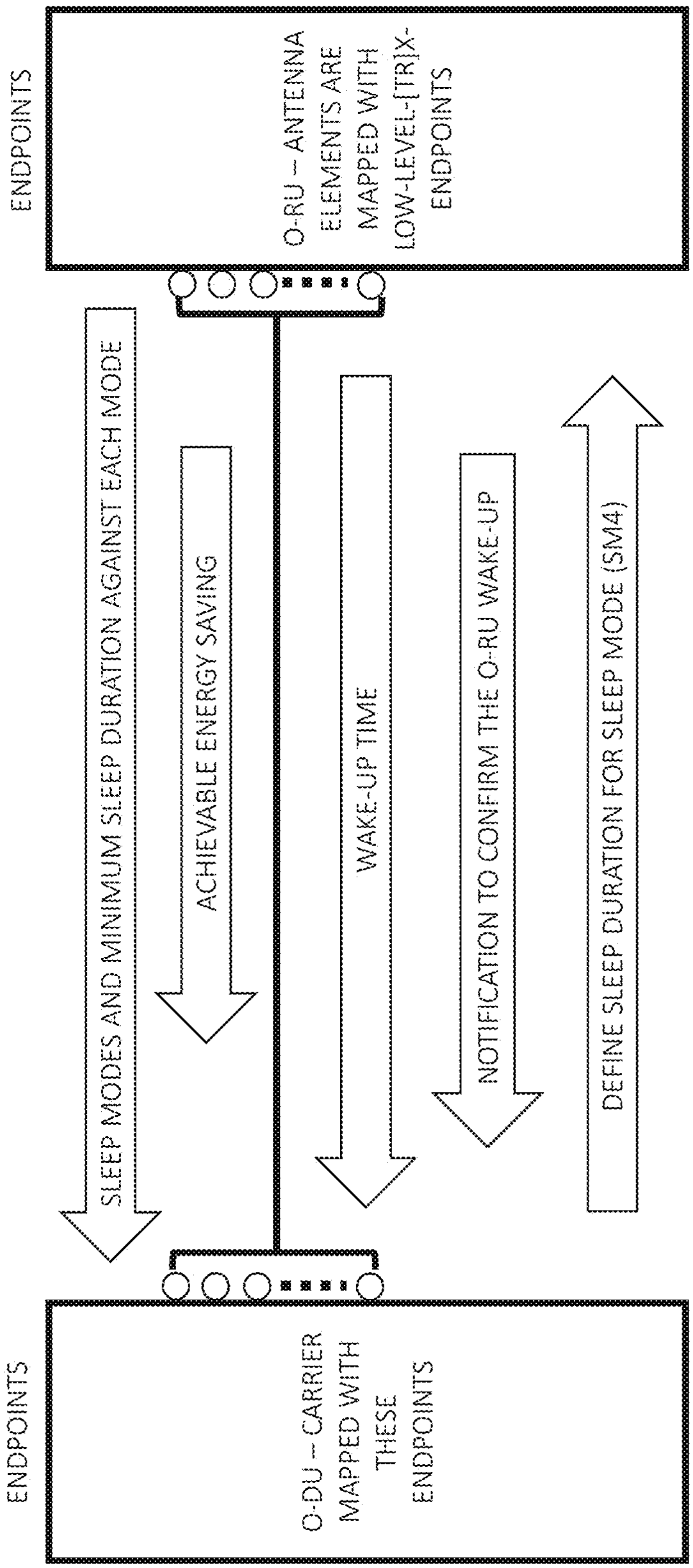
FIG. 9 illustrates a method of M-Plane messaging comprising a Yang model for capability reporting of sleep modes and associated parameters according to an embodiment.

FIG. 9 illustrates a method of M-Plane messaging comprising at least one Yang model for capability reporting of sleep modes (e.g., advanced sleep modes) and associated parameters according to an embodiment. Referring to FIG. 9, the O-RU reports its capability information to implement sleep modes based on the Yang model for capability reporting of sleep modes to O-DU. Based on the sleep mode the parameters and requirements to the O-RU differ. The O-DU uses the capability information to apply a supported antenna array configuration (i.e., applying a supported antenna array configuration for the respective sleep mode).

The sleep modes may be defined as summarized in the table below.

| Sleep Mode | Time Duration (Minimum Sleep Duration) | Minimum No of Slots O-RU-X | O-RU-Y |
|---|---|---|---|
| Sleep Mode #0 (SM0) | Symbol to Slot | — | Not supported |
| Sleep Mode #1 (SM1) | L Slots (1 Slot) | 1 slot | 5 slots |
| Sleep Mode #2 (SM2) | M Slots (Radio Frame (10 ms)) | 10 slots | 15 slots |
| Sleep Mode #3 (SM3) | N Slots (100 ms) | 100 slots | 2000 slots |
| Sleep Mode #4 (SM4) | Undefined time (1 min) | 60000 slots | 70000 slots |

Referring to above Table, 15 KHz SCS is considered for number of slots calculation.

Regarding the sleep modes (e.g., the advanced sleep modes), advanced sleep modes with minimum sleep duration may be activated and deactivated and minimum duration of against each sleep mode may be exchanged between the O-RU and the O-DU.

Regarding sleep modes, the achievable energy savings is either reported by O-RU or monitored by O-DU.

Moreover, for the sleep mode with undefined sleep (SM4) wake-up time is provided by the O-RU. Sleep mode #4 (SM4) (undefined time) is accomplished by setting "numSlots" and "sleepDepth" to zero and O-DU define the sleep time duration.

Furthermore, regarding the sleep mode with undefined sleep (SM4) a notification for confirming the wake-up may be sent by the O-RU.

The O-DU, based on the wake-up time as informed and/or confirmed by the O-RU, the O-DU defines the wake-up time for the sleep mode with undefined sleep (SM4).

In addition, for the sleep mode with undefined sleep (SM4) a notification for CU Plane active or inactive state may be provided by the O-DU to ensure the CU plane is active after sleep duration expires.

According to another example embodiment for the use case RF Channel Reconfiguration (i.e., RF Channel Switch Off/On) a sub use case may be defined as Hibernate sleep. For this sub use case, the O-RU receives an antenna array configuration supported by the O-RU from the O-Du via the management plane (M-Plane) messaging, wherein the supported antenna array configuration may include among other commands to activate and deactivate the O-RU at least one of a command that the O-DU sets energy-saving enabled to "True" using "o-ran.hardware.yang" module, a command that the O-DU sends the <rpc><edit-config>< [tr]x-array-carrier:: ACTIVE> with the value "SLEEP" or "INAC- TIVE" to O-RU to put to sleep or deactivate the carrier. Then O-RU change the [tr] x-array-carrier:: STATE to DISABLED through BUSY, a command that the O-DU uses appropriate RPCs (i.e., <edit-config> and <delete-config> to deconfigure or remove the carrier(s) in O-RU or that the O-RU may perform this operation by itself with its internal logic during the long sleep (e.g., this command may provision more energy saving as the associated circuits could be turned off), a command to turn off the C-Plane, U-Plane, S-Plane, and M-Plane circuits if all carriers are removed/de-configured during hibernate (long/deep) sleep, and command that the O-DU may turn off the C-Plane, U-Plane, S-Plane, and M-Plane circuits by sending appropriate commands/rpes, a command that the O-RU itself with its internal logic may turn off the C-Plane, U-Plane, S-Plane, and M-Plane circuits, a command to turn off M-Plane (Netconf Supervision monitoring) and CU-Plane monitoring circuits (e.g., the turning off command for monitoring circuits may be applied on top of both TRx control and Advanced sleep mode-based energy saving use cases in case of long duration energy saving), a command that the O-RU sends a RPC reply to O-DU to indicate the correction reception of the above RPC by sending "ok".

In an example embodiment, a Yang model for capability reporting the CU plane circuit active state (awake from sleep) may have an o-ran-module-cap.yang structure that comprises the parameter according to the following summary.

| +--ro energy-saving-by-transmission-blanks boolean
| +--ro energy-saving-by-trx-control boolean//TRx control-various antenna configuration for energy savings
| +--ro energy-saving-by-advanced-sleep-modes boolean
|| +--ro advanced-sleep-modes enum
|| +--ro micro-sleep-mode-supported? Boolean //O-DU read this response (either 'Yes' or 'No') and get to know whether O-RU supports micro sleep or not-Option #1
|| +---n micro-sleep-mode-supported //Notification to indicate whether micro-sleep mode supported or not—Option #2
| +--ro CU-plane-active-state enum/this capability to indicate CU plane circuit is awake and active to receive messages from O-DU. For e.g., during sleep mode, CU plane circuit turned off sometime and wake-up. With the current notification framework, only carrier active state is being reported by O-RU to O-DU. It is required to notify O-DU that CU plane is waked up from sleep and active before hand, so that O-DU can start scheduling CU plane packets.
| +--ro eaxcid-grouping-capabilities {o-ran-module-cap: EAXC-ID-GROUP-SUPPORTED}?

In an example embodiment, a Yang model for capability reporting the supported advanced sleep modes and associated parameter (e.g., advanced sleep modes) may have o-ran-uplane-conf.yang structure that comprises the parameter according to the following summary. o-ran-uplane-conf.yang module The format for the user plane configuration module is provided below

|+--rw tx-array-carrier→/user-plane-configuration/tx-array-carriers/name //advanced sleep modes
+--ro advanced-sleep-modes-types
| +--ro sleep-mode #0: SMO string
|| +--ro sleep-duration:tsleep decimal64/uint16//Sleep duration range (Tsleep)=symbol to Tslot, where Tslot is slot time in microseconds
||| +--ro minimum-sleep-duration decimal/uint16//symbol time
|| +--ro achievable-energy-saving decimal64//achievable energy savings based on O-RU design, sleep mode, and environmental condition
| +--ro sleep-mode #1: SM1 string
|| +--ro sleep-duration:tsleep decimal/uint16//Sleep duration range (Tsleep)=Tslot to 10 ms
||| +--ro minimum-sleep-duration decimal/uint 16 //Tslot-slot time in microseconds
|| +--ro achievable-energy-saving decimal64//achievable energy savings based on O-RU design, sleep mode, and environmental condition
| +--ro sleep-mode #2: SM2 string
|| +--ro sleep-duration:tsleep decimal/uint16//Sleep duration range (Tsleep)=10 ms to 100 ms
||| +--ro minimum-sleep-duration decimal/uint16/1 Radio frame (10 ms)
|| +--ro achievable-energy-saving decimal64//achievable energy savings based on O-RU design, sleep mode, and environmental condition
| +--ro sleep-mode #3: SM3 string
|| +--ro sleep-duration:tsleep decimal/uint16//Sleep duration range (Tsleep)=100 ms to 1 min
||| +--ro minimum-sleep-duration decimal/uint16 //100 ms
|| +--ro achievable-energy-saving decimal64//achievable energy savings based on O-RU design, sleep mode, and environmental condition
| +--ro sleep-mode #4: SM4 string
|| +--ro sleep-duration:tsleep decimal/uint16//Sleep duration range (Tsleep)=undefined time (to be defined by O-DU)
||| +--ro minimum-sleep-duration decimal/uint16 //1 minute
||| +--ro wake-up-timedecimal64//wakeup time range based on O-RU design, sleep mode duration, and environmental condition
|| +--ro achievable-energy-saving decimal64//achievable energy savings based on O-RU design, sleep mode, and environmental condition
|+--rw low-level-tx-endpoint→/user-plane-configuration/low-level-tx-endpoints/name According to embodiments of the Advanced Sleep Modes (ASM) having short duration (C-Plane based) sleep modes and sleep modes having long duration (M-Plane based) sleep modes the wake-up latency (i.e., the wake-up time or the go-to-sleep time) for said ASM and the wake-up latency of the TRx control methods may be different and not interfere with (e.g., hinder) each other.

Moreover, regarding common capability parameters to be reported by O-RU configuration capability information to the O-DU via an M-Plane for both TRx control methods and sleep modes (e.g., advanced sleep modes) may include C-Plane ST8 "ready" messages and sleep duration extension (e.g., in case of defined sleep, if the O-DU needs to extend a sleep mode it send a sleep extension command just before the start of wake-up time). In case the CU-Plane remains active, the extension command may be C-Plane-based for short sleep durations. In case the CU-Plane is turned off the extension command may be M-Plane based for long sleep durations.

Furthermore, common capability parameters are to be reported by O-RU configuration capability information to the O-DU via an M-Plane for both TRx control methods and sleep modes (e.g., advanced sleep modes) may include an emergency wake-up of O-RU from sleep. This capability may be reported by O-RU via an M-Plane. For example, in case of sleep mode interruption, if the O-DU needs to interrupt a sleep mode it sends a sleep mode interruption command. In case the CU-Plane remains active, the emergency wake-up command may be C-Plane based for short sleep durations (defined or undefined). In case the CU-Plane is turned off the emergency wake-up command may be M-Plane based for long sleep durations (defined or undefined).

According to an example embodiment, the o-ran-module-cap.yang among other YANG models for CU-Plane status reporting (e.g., to implement O-RU capabilities for defined and undefined sleep modes). The o-ran-module-cap.yang comprises information to enable a CU Plane circuit to be turned off to attain additional energy saving. The information may include a name identifier and a status identifier of the rx-array-carriers as well as a name identifier, action identifier and state for the cu-plane in order to report the user plane configuration. Based on the above information, the O-DU may turn on or wake-up CU-Plane circuit through the M-Plane. According to an example embodiment, a notification is needed to indicate if CU-Plane become active or not (wake-up from sleep), the same may be defined in the o-ran-uplane.yang, respectively.

In an example embodiment, a Yang model for capability reporting the notification to indicate the CU plane is active from sleep may have an o-ran-uplane-conf.yang structure that comprises the parameter according to the following summary.

The format for the user plane configuration module is provided below

```
+---n rx-array-carriers-state-change
+--ro rx-array-carriers* [name]
+--ro name→/user-plane-configuration/rx-array-carriers/
  name
+--ro state?→/user-plane-configuration/rx-array-carriers/
  state
+---n cu-plane-state-change
+--ro cu-plane [name]
+--ro    state?→/user-plane-configuration/cu-plane/state;
```

The state can be active, sleep, and inactive/disabled

Figure 10:
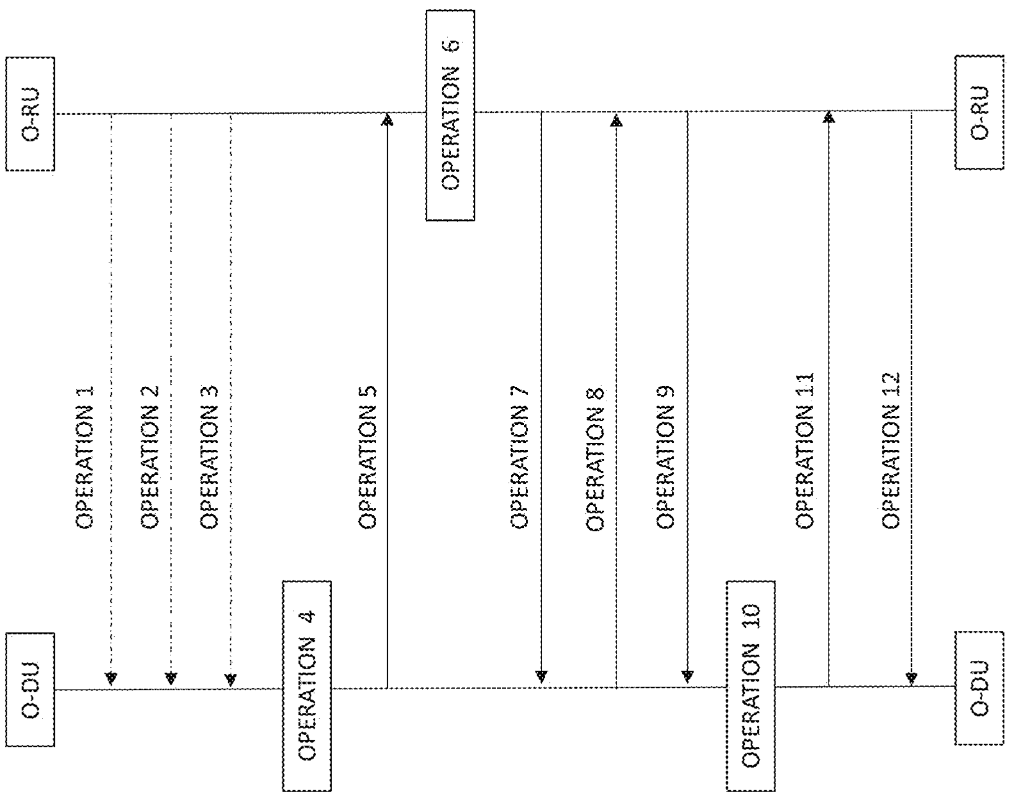
FIG. 10 illustrates a flowchart for M-Plane/C-Plane messaging between an O-RU and an O-DU for the use case of sleep modes.

FIG. 10 illustrates a flowchart for M-Plane/C-Plane messaging between an O-RU and an O-DU for the use case of sleep modes. Referring to FIG. 10, in operation 1, the O-RU provides the O-DU with a list of supported sleep modes (e.g., Advanced Sleep Modes) along with minimum sleep duration thereof (i.e., configuration capability information reported by the O-RU to the O-RU via an M-Plane messaging may comprise list of supported sleep modes (e.g., Advanced Sleep Modes) along with minimum sleep duration.

In operation 2, the O-RU provides the O-DU with the achievable energy savings for each sleep mode (e.g., each sleep mode provided in operation 1 may refer to an array configuration).

In operation 3, for the case of a sleep mode with undefined sleep (i.e., for SM4), the O-RU provides the O-DU with a wake-up time from a sleep state to an active state for the undefined sleep (i.e., for the sleep mode SM4).

In general, operations 1 to 3 as set forth above refer to the O-RU capability reporting to the O-DU (i.e., to the receiving of configuration capability information of the O-RU by the O-DU).

In operation 4, the O-DU maps the reported Sleep Modes mapped to C-Plane parameter "sleepMode". Moreover, the O-DU maps the reported sleep duration and sleep mode (i.e., except indefinite/undefined sleep mode) to C-Plane parameters "sleepDur" and "Mul", respectively. The parameter "Mul" is employed to have flexibility in sleep duration within the range of a particular sleep mode supported by O-RU. The C-Plane parameter "sleepMode", "sleepDur" and "Mul" may be defined in fields in a ST4 CMD TYPE message referring to Advanced Sleep Modes.

In operation 5, the O-DU sends an ST4 message ("sleepMode" and "Tsleep") to O-RU and activates the sleep with a specific time duration (based on the adopted sleep mode). The dispatch of the ST4 message ("sleepMode" and "Tsleep") is based on a higher-layer network function request or the O-DU itself decides to activate sleep mode.

In operation 6, the O-RU receives the sleep command through an ST4 message with a definite duration and processes it. In an example embodiment, for a sleep mode with an indefinite sleep, the O-DU may send a sleep mode activation request to O-RU through the ST4 (C Plane) message or via an M-Plane messaging (i.e., carrier deactivation).

In operation 7, the O-RU provides the O-DU with O-RU sends a notification to confirm the successful/failure of sleep mode activation to the O-DU.

In operation 8, in case a failure occurred during sleep mode activation, the O-DU either retry sleep mode activation or take appropriate action (e.g., reports to higher-layer network functions, commence a fail-safe procedure, etc.). In an example embodiment, according to action of O-DU in case of a failure, the O-RU may respond to the actions requested by O-DU in operation 8.

In operation 9, the O-RU provides the O-DU with O-RU reports the power consumption using the performance counter "epe-stats" via an M-Plane based on the O-DU subscribing to O-RU for this "epe-stats" counter, In operation 10, O-DU monitors the power consumption during each sleep mode/sleep duration. Moreover, the O-DU either forwards the power consumption data to higher-layers or calculates the energy savings per sleep mode for future reference.

In operation 11, O-DU sends wake-up command to O-RU to deactivate the sleep mode.

In operation 12, the O-RU sends a notification to confirm the successful deactivation of sleep mode and becomes active. In general, this notification refers to a notification for reporting the change of an array configuration change from a first array configuration to a second array configuration or vice-versa.

Figure 11:
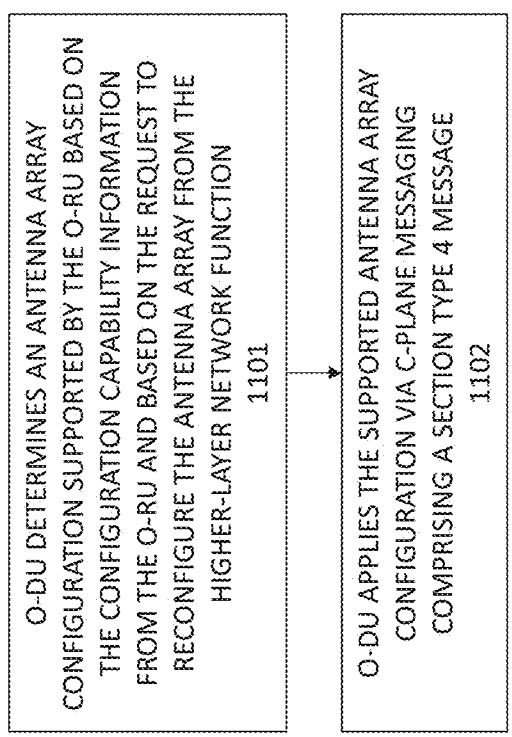
FIG. 11 illustrates an embodiment for TRx control according to a Section Type 4 TRx control.

FIG. 11 illustrates a method implementing a TRx control process via at least one Section Type 4 message in the C-Plane according to an embodiment.

Referring to FIG. 11, in step 1101, the O-DU determines an antenna array configuration supported by the O-RU based on the configuration capability information from the O-RU and based on the request to reconfigure the antenna array from the higher-layer network function.

In step 1102, the O-DU applies the supported antenna array configuration via C-Plane messaging comprising a Section Type 4 message.

For example, the O-DU indicates to the O-RU that certain resource blocks or symbols are not to be used (e.g., the O-DU may create idle periods, guard periods, etc.) in said C-Plane Section Type messages (e.g., ST 0 or ST 4 messages). Moreover, the O-DU, may utilize non-associated (i.e., reserved or not yet defined) U-Plane messages containing IQ samples (data) for the Section Types (ST 0, ST 4) as set forth above (i.e., at least one of a C-Plane Section Type 0 or Section Type 4 together with at least one of a Section Extensions 10, 11, 16,19, etc. messages).

In any case, the purpose of using existing but unused resource blocks or symbols of C-Plane Section Type messages is to inform (apply to) the O-RU through the O-DU that RF signal transmissions (e.g., the radiation of RF signals) may be halted during specified idle intervals (e.g., to conserve power due to halt of transmission during specified idle intervals or to provide said idle intervals for calibration).

To this end, the O-DU sends, via the C-Plane, at least one message that includes at least one Section Type 0 message together with a Section Extension (SE) 7 message and/or a Section Type (ST) 4 message together with at least one of a SE 10, 11, 16,19, etc. message.

In an example embodiment according to the C-Plane messaging between the O-DU and the O-RU, while the O-RU may report the supported antenna array models to O-DU by using M-Plane as set forth in step 402 of FIG. 4, the O-DU applies a (new) antenna array model to be implemented by the O-RU. To this end the O-DU uses existing specifications (messaging protocols) of the CUS Plane as set forth in step 405 of FIG. 4. In this case, the O-DU may apply the a (new) antenna array model to be implemented by the O-RU by using a Section Extension (SE) 7 messages along with a Section Type (ST) 0 messages for the deactivating (e.g., masking, blanking, muting, etc.) of antenna elements (e.g., the O-DU may mask an extended Antenna-Carrier (eAxC) using the SE 7 message, where the mask may be of the part of a eAXC identifier (ID) designated by ST 0 messages) in accordance with the existing specification (messaging protocol) of CUS Plane messaging. For example, the eAxC may include data for a single antenna (or spatial stream) for a single carrier in a single sector.

In another example embodiment, the O-DU may use a C-Plane ST 4 message together with at least one of a SE 10, 11, 16, and 19 message wherever required (e.g., during run time) in order to apply the a (new) antenna array model to the O-RU. In particular, the O-DU may use ST 4 command type (ST4CmdType) to apply configuration sets (i.e., a particular antenna model/configuration).

In an example embodiment, according to the C-Plane ST 4 message, the of C-Plane ST 4 message the O-DU uses the specified slot level configuration to apply single/multiple endpoints by employing a common Section Type 4 header followed by single/multiple Section Type 4 command(s) (e.g., ST4CmdType(s)), whereas each of the Section Type 4 commands is used to specify a configuration command that applies to a particular slot.

In another example embodiment, according to the C-Plane ST 4 message together with a Section Extension (SE) 10, the O-DU uses Section Extension 10 to apply Section Types 1, 3 and 5. To this end, the O-DU utilizes the C-Plane section information for the multiple ports (i.e., layers or Tx/Rx paths) that may be similar except for the beam Identifications (IDs) or User Entity (UE) IDs. As a result, when multiple ports share common section information within the O-RU, the O-DU sends C-Plane sections via corresponding ports (RU_ports) that are merged into one C-Plane section via a representative port using Section Extension 10. On the side (the O-RU via) the M-Plane pre-configures said representative ports by grouping the ports to be merged to represent said ports. For example, in the case of a C-Plane messaging using a ST4, Section Extension (SE) 10, the O-DU may use a unique eAxC IDs to address each layer or spatial stream when sending C-Plane and U-Plane messages to the O-RU. Moreover, the SE 10 may be used along with a 'representative eAxC_ID' (configured via an M-Plane) to reduce C-Plane overhead of sending multiple messages by sending one single C-Plane message.

In yet another example embodiment, according to the C-Plane ST 4 message together with a Section Extension (SE) 11, the O-DU uses the Section Extension (SE) 11 to apply flexible beamforming weights to the O-RU. The SE 11 enables the O-DU to provide different beamforming weights for different Physical Resource Blocks (PRBs) within one section to facilitate (e.g., zero-forcing precoding). To this end, the O-DU provides the Number of bundled PRBs per beamforming weights (numBundPrb) parameter that informs the O-RU how many PRBs are bundled together and shares the according beamforming weights.

For example, in order to enable the O-DU to make use of SE 11 as set forth above, the optional "little endian byte order" may be applied to beamforming. weight. in-phase. value/beamforming. weight. q-phase. value (bfw/bfwQ) fields (i.e., I/Q beamforming weights fields) if chosen via an M-Plane. In this case, C-Plane ST 4 message together with Section Extension 11 only applies to C-Plane Section Types 1 and 3, respectively.

In yet another example embodiment, according to a C-Plane ST 4 message together with a Section Extension (SE) 16, the O-DU applies antenna mapping in UE channel information-based UL beamforming to the O-RU. Section Extension (SE) 16 may also applies to C-Plane ST 5 messages. The Section Extension (SE) 16 includes bitmask per RX endpoint to indicate the antennas to be pre-combined into the RX endpoint (i.e., eAxC_ID). According to this example embodiment, O-DU may use Section Extension (SE) 16 together with Section Extension 10. In this case, Section Extension (SE) 16 includes a list of the bitmasks to indicate the number of RX endpoints used in Section Extension 10.

In yet another example embodiment, according to a C-Plane ST 4 message together with a Section Extension (SE) 19, the O-DU applies compact beamforming information for multiple antenna ports (i.e., 'port' in context of this Section Extension 19 refers to logical antenna port) to control the TRx. Section Extension 19 may also apply to C-Plane Section Types (ST) 1 and 3. According to this example embodiment, the O-DU uses the SE 19 for sending compact beamforming information for multiple antenna ports. For example, "little endian byte order" may applied to bfwI/bfwQ fields in SE 19. As result, considering a large number of Channel State Information Reference Signal (CSI-RS) ports and multiple Channel State Information (CSI) resource sets the use of SE 19 has benefits for the Channel State Information Reference Signal (CSI-RS) channel messaging.

Furthermore, in an alternative example embodiment, according to a C-Plane ST 4 message, the O-DU may achieve a sustaining antenna array configuration application may be implemented by numslots commands for long-time energy savings. According to this embodiment, the O-DU, C-Plane ST 4 messages, applies commands to multiple endpoints/eAXC IDs (i.e., array for TD beamforming). To this end, the numslots command is used in C-Plane ST4 messages to specify the number of slots for which an operation (i.e., power save mode) is to be performed.

Figure 12:
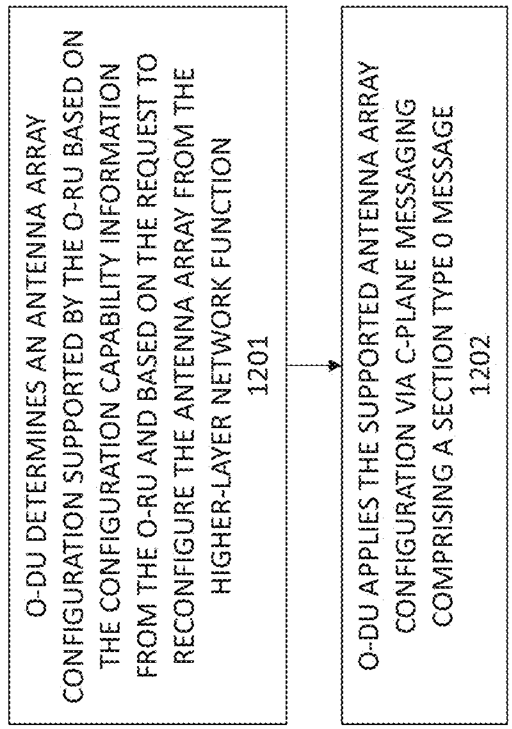
FIG. 12 illustrates another embodiment for TRx control according to a Section Type 0 TRx control.

FIG. 12 illustrates a method implementing a TRx control process via Section Type 0 Message in the C-Plane according to an embodiment.

Referring to FIG. 12, in step 1201, the O-DU determines an antenna array configuration supported by the O-RU based on the configuration capability information from the O-RU and based on the request to reconfigure the antenna array from the higher-layer network function.

In step 1202, the O-DU applies the supported antenna array configuration via C-Plane messaging comprising at least one of a Section Type (ST) 0 message together with a Section Extension (SE) 7 message (e.g., a command field in a SE 10 together with an ST 0 message specifying the Transceiver (TRx) control parameters to reconfigure the antenna array and an energy-saving duration to be applied to the O-RU via the C-Plane.

According to an example embodiment, the O-DU may utilize C Plane ST 0 messages to specify a set of antenna elements to be muted (i.e., to apply a (new) antenna array model to be implemented by the O-RU). To this end, unused Blocks or Symbols of the existing Uplink (UL) and Downlink (DL) C-Plane ST 0 messages may be utilized by the O-DU to communicate (apply) (new) antenna array model(s) to be implemented by the O-RU (e.g., to specify the set of antenna elements to be muted). The utilization of C-Plane ST 0 messages has the advantage that the antenna elements of an antenna array may be muted for a longer duration in comparison to other C-Plane messages such as, for example, ST 4 together with at least one of a SE 10, 11, 16, and 19 message because the C-Plane ST 0 messages can be used to dynamically update the antenna array configuration (i.e., dynamically update/generate at least one antenna model comprising the beam weight(s) and/or the necessary antenna calibration data set of said at least one antenna model)

As a result, a set of specified antenna elements can be muted for a longer time to achieve maximum energy savings by employing the C-Plane ST 0 messages.

In an example embodiment the O-DU may indicate to the O-RU that certain resource blocks or symbols are not to be used (e.g., the O-DU may create idle periods, guard periods, etc.) in said C-Plane Section Type messages (e.g., a ST 0 or ST 4 messages). Moreover, the O-DU may utilize non-associated (i.e., reserved or not yet defined) U-Plane messages containing IQ samples (data) for the Section Types (ST 0, ST 4) as set forth above (i.e., at least one of a C-Plane Section Type 0 or Section Type 4 together with at least one of a Section Extensions 10, 11, 16,19, etc. messages).

In any case, the purpose of using existing, but unused resource blocks or symbols of C-Plane Section Type messages is to inform (apply to) the O-RU that RF signal transmissions (e.g., the radiation of RF signals by certain antenna elements in an antenna array) may be halted during the specified idle interval (e.g., to conserve power or to provide an interval for calibration).

To this end, according to the example embodiment, the O-DU may send, via the C-Plane, at least one message that includes at least one Section Type 0 message together with a Section Extension (SE) 7, 10, 11, 16,19, etc. message.

In an example embodiment, the O-DU may apply a new (selected, generated, etc.) antenna array model by using Section Extension (SE) 7, messages along with Section type 0 messages, where it is used for the masking/blanking/muting of antenna elements with existing spec (For e.g., SE7, mask the part of eAXC ID designated by the ST 0 messages) in existing specification.

Moreover, in another example embodiment, in order to mute the antenna elements for longer duration, C Plane Section type 0 messages can be used to specify set of elements are muted for a longer duration. Section type 0 messages are used to specify unused Blocks or Symbols in UL and DL.

The O-DU may indicate to the O-RU that certain Resource Blocks or symbols will not be used (idle periods, guard periods). Likewise, there are no associated U-Plane messages containing IQ data for this Section Type. The purpose is to inform the O-RU that transmissions may be halted during the specified idle interval (e.g., power-savings or to provide an interval for calibration). To this end, C-Plane messaging may specify antenna elements to be muted for longer time to save the energy by employing section type 0 messages.

According to an example embodiment, an antenna element may be masked or muted by not assigning beam weights or beam '0' to the respective antenna elements by respective C-Plane messages. Such C-Plane messaging is possible by a symbol by symbol or slot by slot or PRB by PRB (i.e., for shorter duration energy saving mode as done TDD mode, where Tx chains switched off during UL).

In addition, by sharing the duration along with C-Plane messaging, the masking or muting by C Plane messaging may be extended to longer duration energy saving mode as well.

In an example embodiment, the O-DU may apply an antenna array configuration for example, for TRx control methods or sleep modes by using an existing specification (messaging protocol) of the CUS Plane.

Moreover, the C-Plane ST 0 message together with SE 7 may be used by the O-DU to modify (apply) the number of spatial streams while activating the respective antenna model/TRx configuration with eAXC (Identification) ID Mask. To this end, eAxC_ID subfields include one eAxC identifier (eAxC_ID) that comprises a band and sector identifier (BandSector_ID), a component-carrier identifier (CC_ID)) a spatial stream identifier (RU_Port_ID) and a Distributed Unit identifier (DU_Port_ID), wherein the RU_Port_ID designates logical flows such as data layers or spatial streams, and logical flows such as separate numerologies (e.g. PRACH) or signaling channels requiring special antenna assignments such as a Sounding Reference Signal (SRS).

FIG. 13 illustrates an embodiment of sleep modes according to a Section Type 4 command type (ST4CmdType) TRX CONTROL. Referring to FIG. 13, sleep modes have different sleep depths.

Referring to FIG. 13, TRX CONTROL command type is in line with the Section Type 4 command type (ST4CmdType), wherein the Command Common Header Format comprises 8-bit fields (i.e., octet fields). The Command Common Header Format comprises various headers, each header comprising one or more header fields (i.e., header octets).

According to the TRX CONTROL command type configuration, a first header field is occupied by a transport header. The transport header refers to an 8-byte sequence of a first Octet (i.e., #of bytes is 8 from Octet 1 to Octet 8).

A second header field is occupied by a common Section Type 4 header. The common Section Type 4 header refers to an 8-byte sequence of a 9th Octet (i.e., #of bytes is 8 from Octet 9 to Octet 16).

A third header field is occupied by a Section Type 4 common part of the command header. The Section Type 4 common part of the command header refers to an 8-byte sequence of a 17th Octet (i.e., #of bytes is 8 from Octet 17 to Octet 24).

A fourth header field is occupied by a multiple command Section Type 4 header that refers to a one-byte sequence of a 25th Octet (i.e., #of bytes is 1 of an Octet 25).

The multiple command Section Type 4 header comprises a direction identifier bothDir at the most significant msb 0-bit position, a turnoff field at a 1-bit position. Moreover, the 2-bit position to the 5-bit position of the multiple command Section Type 4 header refers to an identifier of the sleep mode types sleepDurIndex field (i.e., [sleepDurIndex3:0]). The 6-bit position and the least significant bit, the 7-bit position, refer to the sleep depth of advanced sleep modes (i.e., sleepDepth [1:0]) of a 25th Octet (i.e., #of bytes is 1 of an Octet 25).

A fifth header field may comprise of a reserved field and a one-byte sequence of a 26th Octet (i.e., #of bytes is 1 of an Octet 26), The one-byte sequence of a 26th Octet in the fifth header field may be occupied by a log 2maskbits header (i.e., log 2maskbits [3:0]). The log 2maskbits header command header refers to a one-byte sequence of a 26th Octet (i.e., #of bytes is 1 of an Octet 26).

A sixth header field is occupied by the Antenna Layer Mask antLayerMask command header (i.e., antLayerMask [15:0]*—reserved when cmdScape≠ARRAY-COMMAND). The antLayerMask header refers to a 2-byte (16-bit) sequence of a 27th Octet (i.e., #of bytes is 1 of Octet 27).

A seventh header field is occupied by the Antenna Mask antMask command header (i.e., antMask[x:0]—only present when cmdScape=ARRAY-COMMAND). The antMask header refers to an 8-byte (64-bit) sequence of a 29th Octet (i.e., #of bytes are variable (e.g., a 2-byte field from Octet 28 to Octet 29).

According to an example embodiment, the TRx control process to reconfigure the antenna array may include TRx control configurations that are identified by a respective unique configuration identity or name. The antenna array model of said TRx control configuration includes at least one antenna mask (antMask), wherein the antenna mask bits combination may be limited only to the supported TRx control configurations, wherein the antenna mask bits identify a '0' for antenna elements to be turned off and '1' for active elements of the antenna array. Moreover, TRx control configurations include in addition to the mask bits for at least one antenna mask (antMask), antenna layer mask bits for creating at least one antenna layer mask (antLayerMask).

According to an example embodiment, the supported TRx control configurations may comprise a transition time (i.e., different from a wake-up time of the ASMs) that defines a minimum or guaranteed time required to switch from baseline configuration to specific configuration (i.e., switch a baseline 64TRx antenna array to another antenna mask configuration such as, for example, a 32TRx_antenna array model). The transition time associated with each configuration change for the supported TRx control configurations and as a function of sub-carrier spacing may be, for example, for 15 KHz, one slot is 1 millisecond, for 30 KHz, one slot is 0.5 millisecond or 500 microseconds, etc.

According to an example embodiment, the TRx control process may include control to turn on/off entire RF Transceiver chains and/or Radio Frequency Front End (RFFE) of Radio Frequency (RF) processing unit pertaining to some of the RF channels/antenna elements.

Moreover, according to another example embodiment, the TRx control process may include control to turn on/off Components, Circuits, IPs, Cores, Computing engines of the digital baseband and O-RAN Fronthaul processing units (i.e., physical components of the O-RU).

According to embodiments of the Advanced Sleep Modes (ASM) having short duration (C-Plane based) sleep modes and sleep modes having long duration (M-Plane based) sleep modes the wake-up latency (i.e., the wake-up time or the go-to-sleep time) for said ASM and the wake-up latency of the TRx control may be different and not interfere with (e.g., hinder) each other.

FIG. 14 illustrates an embodiment of sleep modes according to a Section Type 4 command type (ST4CmdType) st4CmdType 'TRX-CONTROL/ADVANCED-SLEEP-MODE', Referring to FIG. 14, the st4CmdType 'TRX-CONTROL/ADVANCED-SLEEP-MODE' according to the TRX CONTROL command type configuration, a first header field is occupied by a transport header. The transport header refers to an 8-byte sequence of a first Octet (i.e., #of bytes is 8 from Octet 1 to Octet 8).

A second header field is occupied by a common Section Type 4 header. The common Section Type 4 header refers to an 8-byte sequence of a 9th Octet (i.e., #of bytes is 8 of from Octet 9 to Octet 16).

A third header field is occupied by a Section Type 4 common part of the command header. The Section Type 4 common part of the command header refers to an 8-byte sequence of a 17th Octet (i.e., #of bytes is 8 from Octet 17 to Octet 25).

A fourth header field is occupied by a multiple command Section Type 4 header that refers to a 3-byte sequence of a 25th Octet (i.e., #of bytes is 3 from Octet 25 to Octet 27).

The multiple command Section Type 4 header comprises a direction identifier bothDir at the most significant msb 0-bit position, followed by an OnOff field, a one-bit symbolMask[0:1] field, a one-bit advances sleep mode flag asmflag[0:1], a 16-bit eAxCmask[0:15] field and a one-byte sleepDepth[1:0] of a 25th Octet (i.e., #of bytes is 3 from Octet 25 to Octet 27).

A fifth header field is occupied by a multiple command Section Type 4 header that refers to a 4-byte sequence of a 28th Octet (i.e., #of bytes is 4 from Octet 28 to Octet 31), The multiple command Section Type 4 header comprises a extnumslots[0:15] field, a symbolMask[0:11] field and a log 2maskbits [3:0] field of a 28th Octet (i.e., #of bytes is 3 from Octet 28 to Octet 31).

A sixth header field is occupied by the Antenna Layer Mask antLayerMask command header (i.e., antLayerMask [15:0]*—reserved when cmdScape #ARRAY-COMMAND). The antLayerMask header refers to a 2-byte (16-bit) sequence of a 27th Octet (i.e., #of bytes is 2 from Octet 32 to Octet 34).

A seventh header field is occupied by the Antenna Mask antMask command header (i.e., antMask[x:0]—only present when cmdScape=ARRAY-COMMAND). The antMask header refers to an 8-byte (64-bit) sequence of a 29th Octet (i.e., #of bytes are variable from Octet 32 onwards).

According to the st4CmdType 'TRX-CONTROL/ADVANCED-SLEEP-MODE' in FIG. 14, the use of TRX-CONTROL command (undefined sleep duration) may include an operation wherein the O-DU reads the O-RU sleep capabilities including L, M, and N values for the supported sleep levels. To this end, when the O-DU determines to deactivate antenna elements/layers, the O-DU may issues TRX-CONTROL commands. The first TRX-CONTROL command comprises field values numSlots=0, sleepDurIndex=0xF, sleepDepth=0. Though there is no guaranteed sleep duration, antenna elements may be activated in any future slot with no minimum sleep duration. The second TRX-CONTROL command comprises field values numslots=0, sleepDurIndex=0xF, sleepDepth≠0. In this case the O-RU may enter the commanded sleep mode and the O-DU may not activate antenna elements/layers (as specified by the new masks) earlier than L or M or N slots later. To this end, when a new (i.e., a change in) TRX-CONTROL command is received by the O-RU it may activate the new mask exactly L or M or N slots after receiving the command. This rule holds even if the new mask uses fewer antenna elements than the previous mask. Referring to FIG. 3, This rule enables that the response to an antenna configuration change during a transition from one antenna array model to another antenna array model considers the transition time of the antenna configuration change.

To this end, L, M, and N slots are defined as wake-up latency (i.e., transition time) only for the sleep modes 1, 2, and 3, respectively. However, for undefined sleep, wake-up latency may not be defined.

Referring to FIG. 14, if TRx control and advanced sleep modes simultaneously carried out, there is need to consider the transition latency wake-up latency (i.e., transition time) that occurs while changing from one TRx control configuration to another TRx control configuration (i.e., an antenna configuration change during a transition from one antenna array model to another antenna array model).

The wake-up latency (i.e., transition time) definitions may be used for applying the sleep modes on top of TRx control, otherwise, L, M, and N need to be explicitly defined with two values corresponding to TRx control and Sleep mode.

Moreover, the Sleep mode definitions may be used to execute the TRx control for both defined and undefined durations.

Furthermore, in advanced sleep mode, some of the components are turned off depending on the sleep duration, however, in TRx control entire baseband and RF processing chains pertain to some of the antenna elements are turned off. Hence, wake-up latency (ASM) and transition time (TRx control) may be different.

Figure 15:
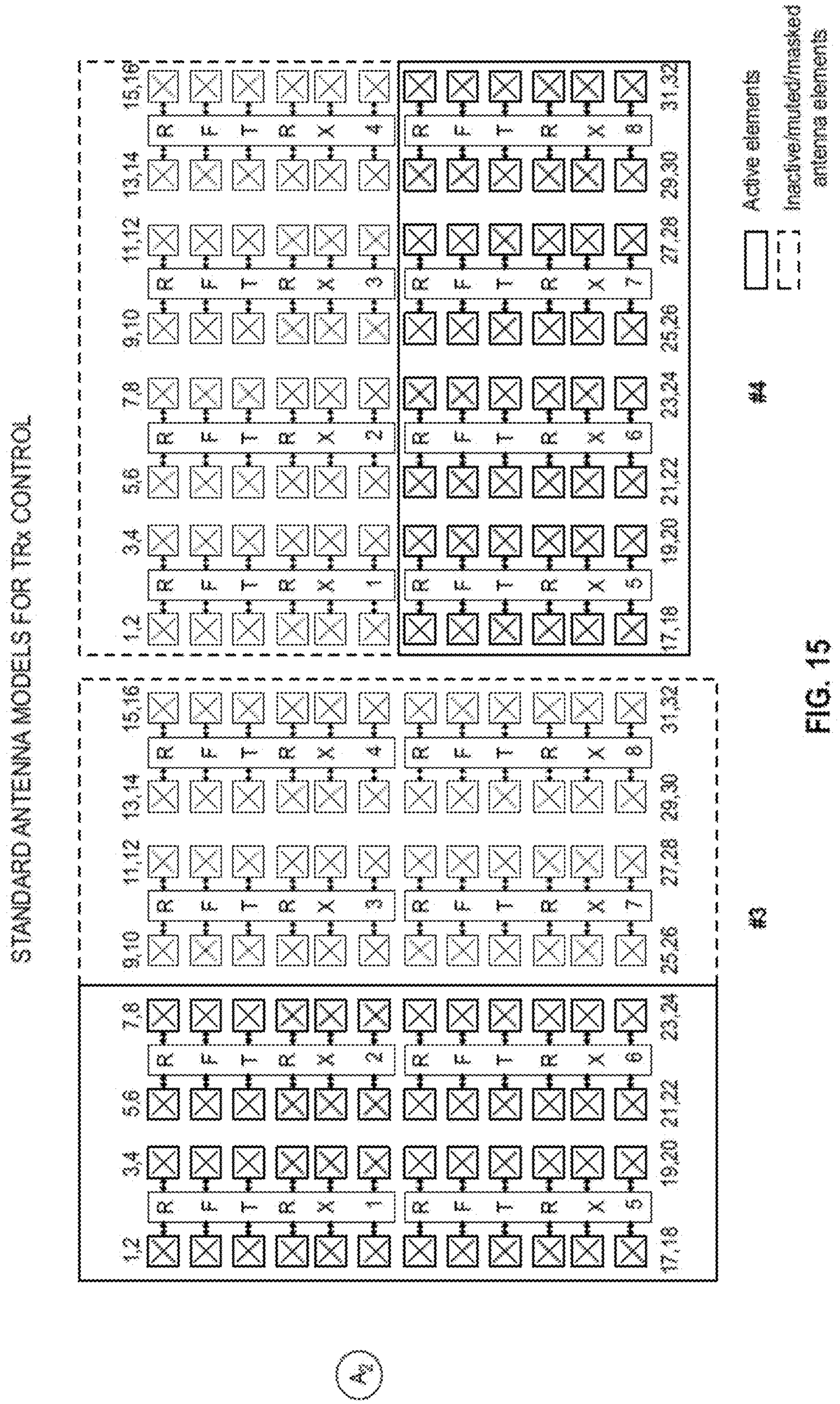
FIG. 15 illustrates an antenna array selection based on antenna array models according to an embodiment.

FIG. 15 illustrates an antenna array selection based on standard antenna array models according to an embodiment. Referring to FIG. 15, a baseline 32T32R standard antenna array includes 8 rows and 12 columns of antenna elements in 8 RF Transceiver (RF TRx) of the 32T32R standard antenna array. Each of the 8 TRxs (i.e., 8 RF TRxs) comprises (maps) antenna elements to sub arrays.

To this end, each of the RF Transceivers (TRx 1 to TRx 8) may be activated or deactivated (i.e., turned off, muted, deactivated, masked, etc.). Referring to FIG. 15, for example, the O-DU applies antenna array model parameters (i.e., implement an RF channel reconfiguration/antenna array selection) according to a first (standard) pattern within the 32T32R antenna array.

In FIG. 15, four patterns are shown in a continued manner, wherein the first and second pattern refer to a continuation A1 and the third and fourth pattern refer to continuation A2.

The first pattern (i.e., the first standard pattern) comprises 8 TRxs that vertically divide the 32T32R antenna array in 4 active TRx(s) and 4 non-active TRx(s) in a so-called half-right active configuration.

The second pattern (i.e., the second standard pattern) comprises 8 TRx configured in vertical half-load configuration, wherein the & TRxs form a vertical striped pattern of active antenna elements and non-active antenna elements within the 32T32R antenna array in a so-called left column active configuration.

The third pattern (i.e., the third standard pattern) may be similar to the first pattern, with 4 active TRx(s). The 4 active TRx(s) divide the 32T32R antenna array vertically and in reverse sequence of the 4 active TRx(s) and the 4 non-active TRx(s) in a so-called half left active configuration. Thus, the active and non-active TRx(s) sequence may be reversed.

The fourth pattern (i.e., the fourth standard pattern) with 4 active TRx(s) divides the 32T32R antenna array horizontally into the 4 active TRx(s) and 4 non-active TRx(s) in a so-called upper half active configuration. The active non-active TRx(s) sequence may be reversed to a so-called lower half active configuration.

Figure 16:
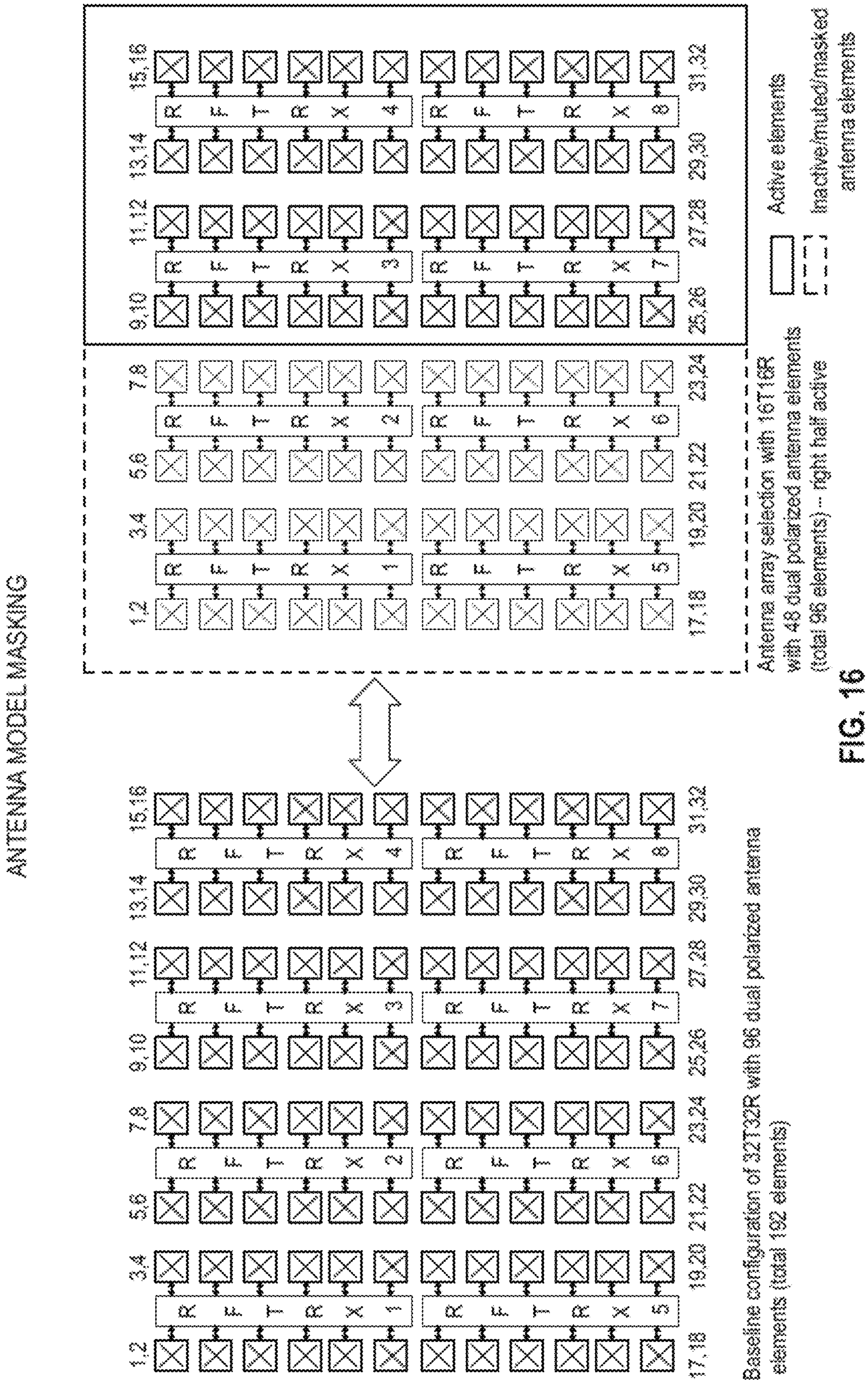
FIG. 16 illustrates a method for masking an antenna array based on antenna array models according to an embodiment.

The first to fourth standard patterns as set forth, among a plurality of predefined antenna array models, refer to antenna array models that the O-RU can activate. The first to fourth standard patterns may be reported upon initializing the O-RU (i.e., the antenna configuration capability information comprising antenna array model parameters FIG. 16 illustrates a method for masking an antenna array based on antenna array models according to an embodiment. Referring to FIG. 16, when an O-RU is powered on (is initialized), the O-RU starts reporting supported energy savings modes and the hardcoded antenna array models (e.g., a plurality of predefined antenna array models antenna array configuration capability information that may include the standard pattern of FIG. 9) along with other initialization parameters to the O-DU using M-Plane yang models (e.g., an urn:o-ran:module-cap:1.0 and an urn:o-ran:hardware:1.0).

For example, the standard antenna array configurations (i.e., the antenna pattern as set forth in FIG. 16) may be identified by the total number of antenna elements according to the respective antenna array configurations (i.e., antenna array models) together with the number of elements in rows and columns of the respective antenna array and the possible energy saving against the respective energy savings that are reported by the O-DU through M-Plane message in predefined/supported antenna array configuration to the O-DU using M-Plane yang models (e.g., an urn:o-ran:module-cap:1.0 and an urn:o-ran:hardware:1.0).

According to the example embodiment in FIG. 16, for example, in accordance with the antenna array configuration as depicted on the right side, in the first row, 1 to 8 elements are masked (muted). In this case, the number of active elements is 48 dual-polarized elements with 4 TRx(s) of a total 96 elements in the right half active configuration (i.e., a first standard pattern).

To this end, according to the 16T16R array, elements connected to Transceivers TRx 3, 4, 7, and 8 are active (i.e., TRx chains/RF channels 9 to 16 and 25 to 32 are active) and the elements connected to Transceivers TRx 1, 2, 5, and 6 are muted/inactive (i.e., TRx chains/RF channels 1 to 8 and 17 to 24 are turned off).

Figure 17:
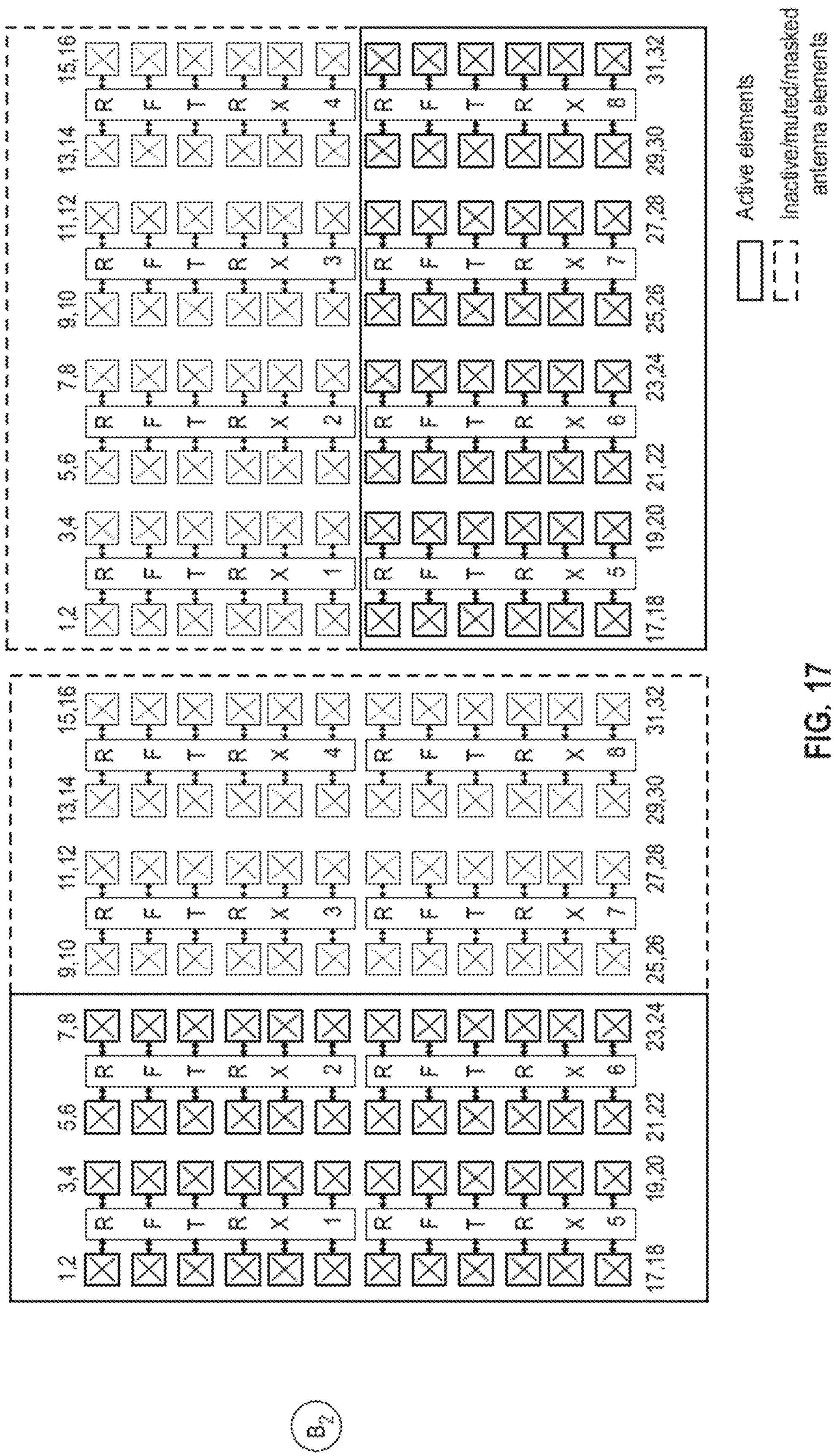
FIG. 17 illustrates an antenna array selection based on a bit masking method according to an embodiment.

FIG. 17 illustrates an antenna array selection based on a bitmasking method according to another embodiment. Referring to FIG. 17, at least one bitmask parameter is used to supplement the configuration and roll back configuration of an antenna array by the total number of antenna elements according to the respective antenna array configurations together with the number of elements in rows and columns of the respective antenna array according to FIG. 16.

In FIG. 17, two patterns are shown in a continued manner whereas the first pattern refers to a continuation B1 and the second pattern refers to continuation B2.

FIG. 18 illustrates an antenna array selection based on a bitmask ing method according to another embodiment.

In FIG. 18, two patterns are shown in a continued manner whereas the first pattern refers to a continuation C and second pattern refer to continuation C.

Referring to FIG. 18, a first pattern with 4 active TRx(s) divides the 32T32R antenna array horizontally into the 4 active TRx(s) and 4 non-active TRx(s) in a so-called lower half active configuration.

Moreover, a second pattern comprises 8 TRx configured in vertical half-load configuration, wherein the 8 TRxs form a horizontally striped pattern of active antenna elements and non-active antenna elements within the 32T32R antenna array in a so-called bottom row active configuration.

FIG. 19 illustrates 64T64R antenna array models to be selected by utilizing the offset method according to yet another embodiment. Referring to FIG. 19, the antenna configuration capability information of the O-RU comprise an antenna array baseline model comprising 192 antenna elements (i.e., a X2W baseline configuration with 12 antenna elements in row, 8 antenna elements in column, an inter-element spacing dx in row and an inter-element spacing dy in column), wherein the first offset value and the second offset value (horizontal offset value offset x and vertical offset value offset y) are predefined to define a plurality antenna array models that enable the O-RU to activate the at least one antenna array model on top of a baseline antenna array configuration that comprises at least one of a 64T64R model (64 Transmitter chains; 64 Receiver chains) with 192 elements, comprising 96 dual polarized elements.

For example, 96 dual polarized elements may be arranged to a first 32T32R antenna model (#1) (32 Transmitter chains; 32 Receiver chains) in a X2/2W configuration with 12 antenna elements in row, 4 antenna elements in column, an inter-element spacing dx in row and an inter-element spacing dy in column. The first 32T32R antenna model (#1) in the X2/2W configuration comprises 48 dual polarized elements.

In another example, 96 dual polarized elements may be arranged to a second 32T32R antenna model (32 Transmitter chains; 32 Receiver chains) (#2) in a X2/2W configuration with 6 elements in row, 4 elements in column, an inter-element spacing 2*dx in row and an inter-element spacing dy (1*dy) in column. The second 32T32R antenna model (#2) in the X2/2W configuration comprises 48 dual polarized elements.

In another example, 96 dual polarized elements may be arranged to a third 32T32R antenna model (32 Transmitter chains; 32 Receiver chains) (#3) in a X2/2W configuration with 6 elements in row, 4 elements in column, an inter-element spacing 2*dx in row and an inter-element spacing dy (1*dy) in column. The third 32T32R antenna model (#3) in the X2/2W configuration comprises 48 dual polarized elements, wherein the third antenna model (#3) may include 12 elements in a row are single polarized and 8 elements in a column are single polarized.

In another example, the antenna array model on top of a baseline antenna array configuration may comprises 72 elements in a fourth 48T48R antenna model (48 Transmitter chains; 48 Receiver chains) in a 3X2/4W configuration. The fourth antenna model comprises 144 dual polarized elements.

In another example, 96 dual polarized elements may be arranged to a fifth 32T32R antenna model (32 Transmitter chains; 32 Receiver chains) (#5) in a X2/2W with an inter-element spacing dx in row and an inter-element spacing dy in column. The fifth 32T32R antenna model (#5) in the X2/2W configuration comprises 48 dual polarized elements.

FIG. 20 illustrates 32T32R antenna array models to be selected by utilizing the offset method according to yet another embodiment. Referring to FIG. 20, the antenna configuration capability information of the O-RU comprise an antenna array baseline model comprising a 32T32R (32 Transmitter chains; 32 Receiver chains) baseline configuration with 192 antenna elements, wherein the first offset value offset_x and the second offset value offset_y are predefined to define a plurality antenna array models that enable the O-RU to activate the at least one antenna array model on top of a baseline antenna array configuration.

For example, based on the 32T32R baseline configuration, the antenna models may comprise at least one of a 16T16R antenna array baseline model with 96 dual antenna elements, a 16T16R antenna array baseline model with 96 single antenna elements, and an 8T8R antenna array baseline model with 48 dual antenna elements.

In an example embodiment, 192 elements may be arranged to a first 32T32R antenna model (32 Transmitter chains; 32 Receiver chains) in a X1/W configuration with 12 elements in row, 8 elements in column, an inter-element spacing dx (1*dx) in row and an inter-element spacing dy (1*dy) in column. The second 32T32R antenna model in the X1/W configuration comprises 96 dual polarized elements.

In an example embodiment, 96 dual polarized elements may be arranged to a first 32T32R antenna model (32 Transmitter chains; 32 Receiver chains) (#1) in a X1/2W configuration with 12 elements in row, 8 elements in column, an inter-element spacing 2*dx in row and an inter-element spacing dy (1*dy) in column. The first 32T32R antenna model (#1) in the X1/2W configuration comprises 48 dual polarized elements.

In an example embodiment, 48 dual polarized elements may be arranged to a second 8T8R antenna model (8 Transmitter chains; 8 Receiver chains) (#2) in a X2/4W configuration with 6 elements in row, 4 elements in column, an inter-element spacing dx (1*dx) in row and an inter-element spacing dy (1*dy) in column. The second 8T8R antenna model (#2) in the X2/4W configuration comprises 24 dual polarized elements.

In an example embodiment, 96 elements may be arranged to a third 16T16R antenna model (16 Transmitter chains; 16 Receiver chains) (#3) in a X1/2W configuration with 12 single elements in row, 8 single elements in column, an inter-element spacing 2*dx in row and an inter-element spacing dy (1*dy) in column. The second 16T16R antenna model (#3) in the X1/2W configuration comprises 96 single polarized elements.

Figure 1:
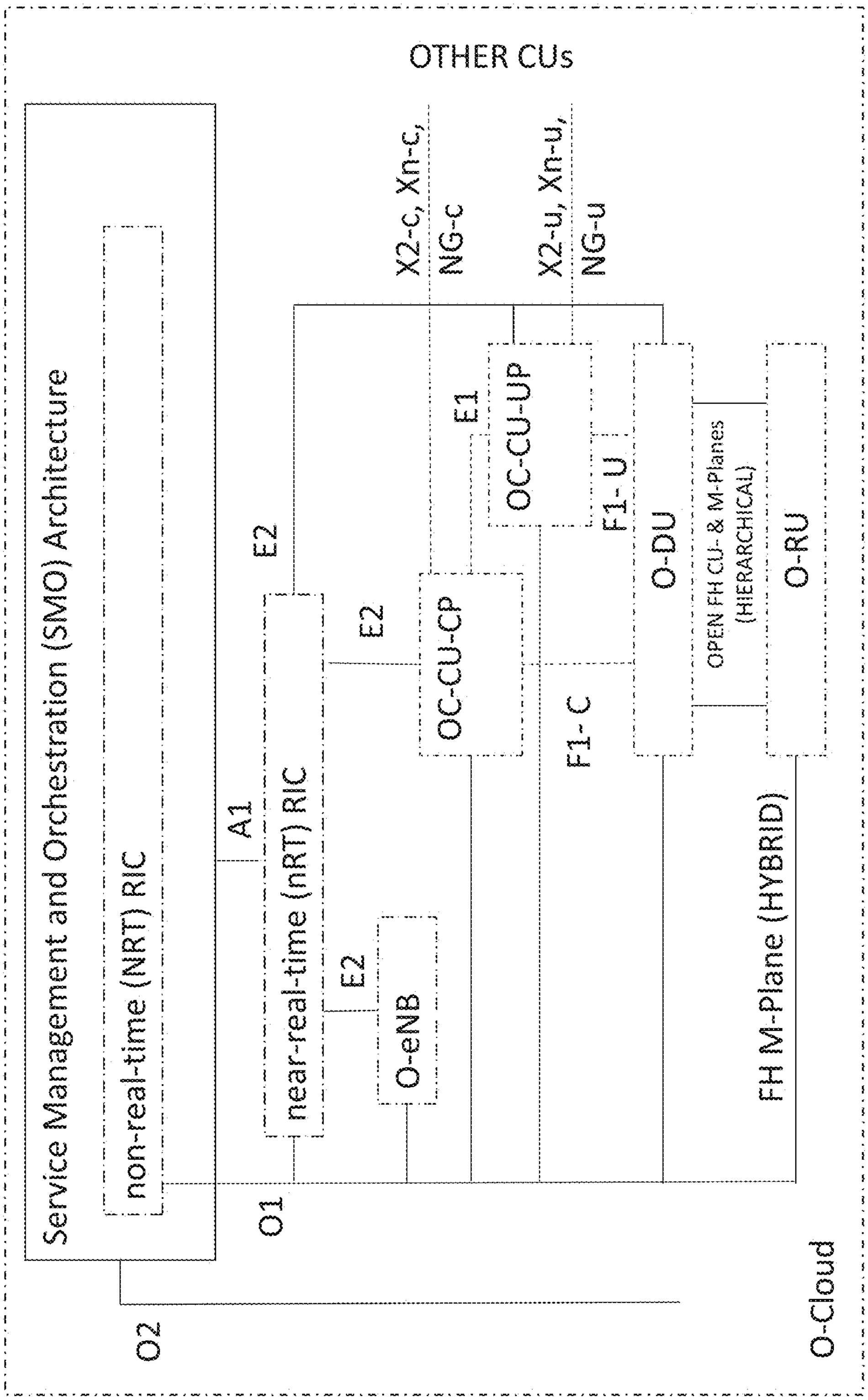
FIG. 1 illustrates an O-RAN architecture in the related art.
Figure 21:
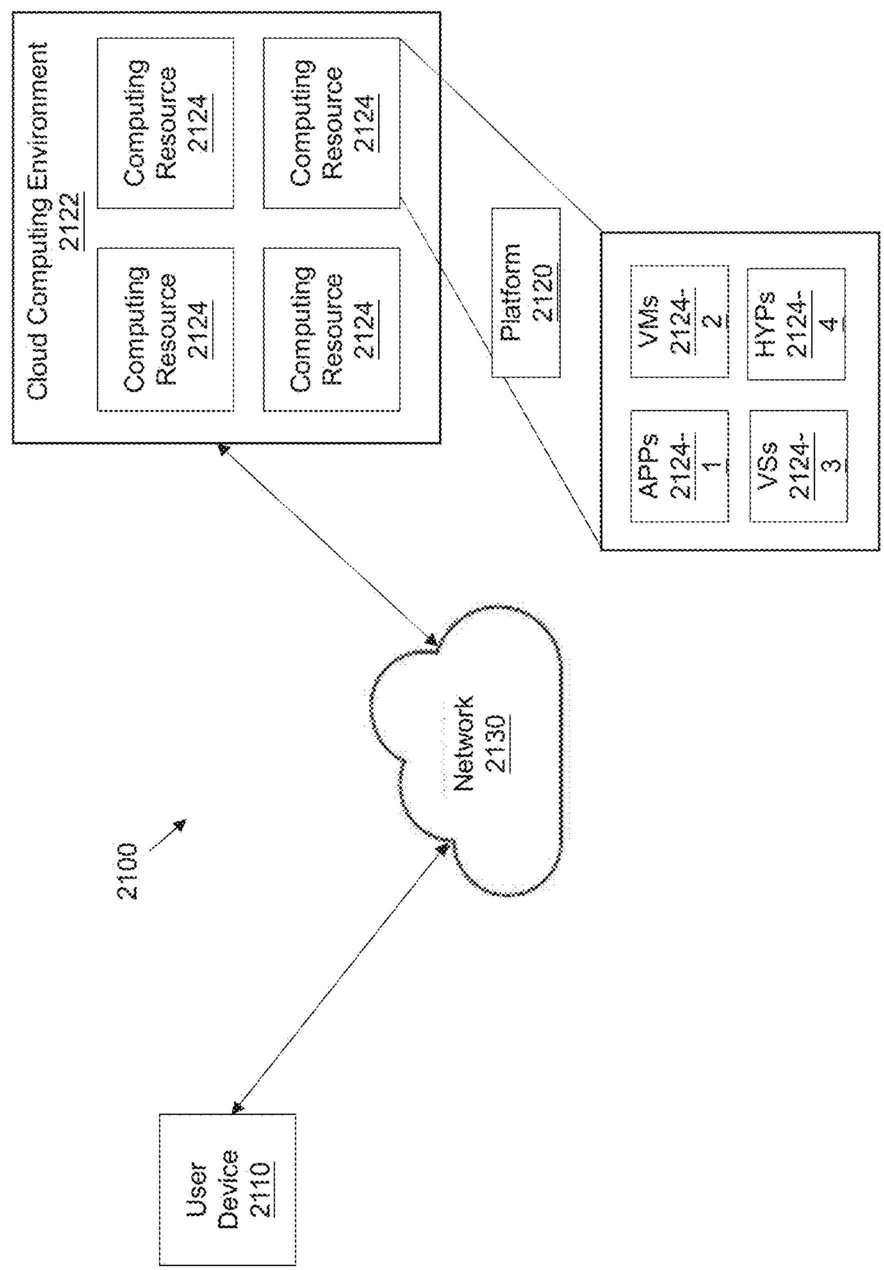
FIG. 21 is a diagram of an example environment in which systems and/or methods, described herein, may be implemented.

FIG. 21 is a diagram of an example environment 2100 in which systems and/or methods, described herein, may be implemented. As shown in FIG. 21, environment 2100 may include a user device 2210, a platform 2220, and a network 2130. Devices of environment 2100 may interconnect via wired connections, wireless connections, or a combination of wired and wireless connections. In embodiments, any of the functions and operations described with reference to FIG. 1 above may be performed by any combination of elements illustrated in FIG. 21.

User device 2210 includes one or more devices capable of receiving, generating, storing, processing, and/or providing information associated with platform 2220. For example, user device 2210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 2210 may receive information from and/or transmit information to platform 2220.

Platform 2220 includes one or more devices capable of receiving, generating, storing, processing, and/or providing information. In some implementations, platform 2220 may include a cloud server or a group of cloud servers. In some implementations, platform 2220 may be designed to be modular such that certain software components may be swapped in or out depending on a particular need. As such, platform 2220 may be easily and/or quickly reconfigured for different uses.

In some implementations, as shown, platform 2220 may be hosted in cloud computing environment 2122. Notably, while implementations described herein describe platform 2220 as being hosted in cloud computing environment 2122, in some implementations, platform 2220 may not be cloud-based (i.e., may be implemented outside of a cloud computing environment) or may be partially cloud-based.

Cloud computing environment 2122 includes an environment that hosts platform 2220. Cloud computing environment 2122 may provide computation, software, data access, storage, etc., services that do not require end-user (e.g., user device 2210) knowledge of a physical location and configuration of system(s) and/or device(s) that hosts platform 2220, As shown, cloud computing environment 2122 may include a group of computing resources 2124 (referred to collectively as "computing resources 2124" and individually as "computing resource 2124").

Computing resource 2124 includes one or more personal computers, a cluster of computing devices, workstation computers, server devices, or other types of computation and/or communication devices. In some implementations, computing resource 2124 may host platform 2220. The cloud resources may include compute instances executing in computing resource 2124, storage devices provided in computing resource 2124, data transfer devices provided by computing resource 2124, etc. In some implementations, computing resource 2124 may communicate with other computing resources 2124 via wired connections, wireless connections, or a combination of wired and wireless connections.

As further shown in FIG. 21, computing resource 2124 includes a group of cloud resources, such as one or more applications ("APPs") 2124-1, one or more virtual machines ("VMs") 2124-2, virtualized storage ("VSs") 2124-3, one or more hypervisors ("HYPs") 2124-4, or the like. It is understood that one or more example embodiments are not limited to a particular type of cloud computing environment, and may be implemented on one or more servers in the form of virtualized network functions (VNFs), containerized and/or cloud-native functions (CNFs), and the like, Application 2124-1 includes one or more software applications that may be provided to or accessed by user device 2210. Application 2124-1 may eliminate the need to install and execute the software applications on user device 2210. For example, application 2124-1 may include software associated with platform 2220 and/or any other software capable of being provided via cloud computing environment 2122. In some implementations, one application 2124-1 may send/receive information to/from one or more other applications 2124-1, via virtual machine 2124-2.

Virtual machine 2124-2 includes a software implementation of a machine (e.g., a computer) that executes programs like a physical machine. Virtual machine 2124-2 may be either a system virtual machine or a process virtual machine, depending upon use and degree of correspondence to any real machine by virtual machine 2124-2. A system virtual machine may provide a complete system platform that supports execution of a complete operating system ("OS"). A process virtual machine may execute a single program, and may support a single process. In some implementations, virtual machine 2124-2 may execute on behalf of a user (e.g., user device 2210), and may manage infrastructure of cloud computing environment 2122, such as data management, synchronization, or long-duration data transfers.

Virtualized storage 2124-3 includes one or more storage systems and/or one or more devices that use virtualization techniques within the storage systems or devices of computing resource 2124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 2124-4 may provide hardware virtualization techniques that allow multiple operating systems (e.g., "guest operating systems") to execute concurrently on a host computer, such as computing resource 2124. Hypervisor 2124-4 may present a virtual operating platform to the guest operating systems, and may manage the execution of the guest operating systems. Multiple instances of a variety of operating systems may share virtualized hardware resources.

Network 2130 includes one or more wired and/or wireless networks. For example, network 2130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 21 are provided as an example. In practice, there may be additional devices and/or networks, fewer devices and/or networks, different devices and/or networks, or differently arranged devices and/or networks than those shown in FIG. 21. Furthermore, two or more devices shown in FIG. 21 may be implemented within a single device, or a single device shown in FIG. 21 may be implemented as multiple, distributed devices. Additionally, or alternatively, a set of devices (e.g., one or more devices) of environment 2100 may perform one or more functions described as being performed by another set of devices of environment 2100.

Figure 22:
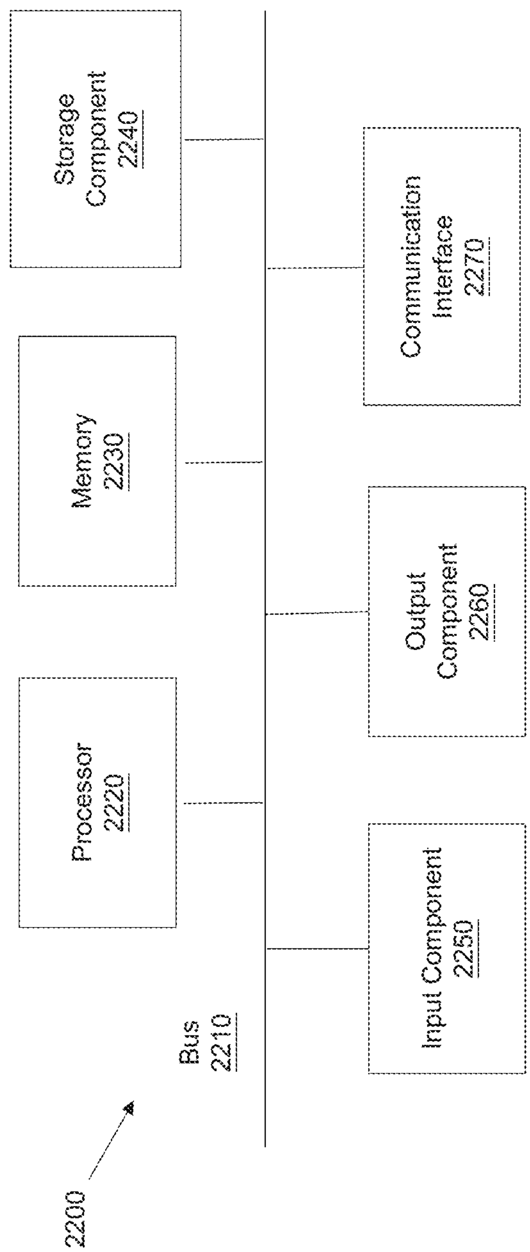
FIG. 22 is a diagram of example components of a device according to an embodiment.

According to embodiments, the [X] (or one or more operations associated therewith) described herein may be implemented or be deployed in the server platform described above, in the form of virtualized network function (VNF). In this regard, it is contemplated that the terms "virtual", "virtualized", or the like, described hereinabove are merely intended to specify the nature of the machine (and the elements and resources associated therewith) being provided in virtual or software form. In this regard, the "virtual machine", "virtualized storage", and the like, described hereinabove should not be limited to any specific type of virtual machine or virtual element. Accordingly, it can be understood that the (or operations associated therewith) may be defined or presented in the form of a containerized network function, of which the functions may be provided in the form of containers, FIG. 22 is a diagram of example components of device 2200. Device 2200 may correspond to user device 2210 and/or platform 2220. As shown in FIG. 22, device 2200 may include a bus 2110, a processor 2120, a memory 2230, a storage component 2240, an input component 2250, an output component 2260, and a communication interface 2270.

Bus 2110 includes a component that permits communication among the components of device 2200. Processor 2120 may be implemented in hardware, firmware, or a combination of hardware and software. Processor 2120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 2120 includes one or more processors capable of being programmed to perform a function, Memory 2230 includes a random-access memory (RAM), a read only memory (ROM), and/or another type of dynamic or static storage device (e.g., a flash memory, a magnetic memory, and/or an optical memory) that stores information and/or instructions for use by processor 2120.

Storage component 2240 stores information and/or software related to the operation and use of device 2200. For example, storage component 2240 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive, Input component 2250 includes a component that permits device 2200 to receive information, such as via user input (e.g., a touch screen display, a keyboard, a keypad, a mouse, a button, a switch, and/or a microphone). Additionally, or alternatively, input component 2250 may include a sensor for sensing information (e.g., a global positioning system (GPS) component, an accelerometer, a gyroscape, and/or an actuator). Output component 2260 includes a component that provides output information from device 2200 (e.g., a display, a speaker, and/or one or more light-emitting diodes (LEDs)).

Communication interface 2270 includes a transceiver-like component (e.g., a transceiver and/or a separate receiver and transmitter) that enables device 2200 to communicate with other devices, such as via a wired connection, a wireless connection, or a combination of wired and wireless connections. Communication interface 2270 may permit device 2200 to receive information from another device and/or provide information to another device. For example, communication interface 2270 may include an Ethernet interface, an optical interface, a coaxial interface, an infrared interface, a radio frequency (RF) interface, a universal serial bus (USB) interface, a Wi-Fi interface, a cellular network interface, or the like.

Device 2200 may perform one or more processes described herein. Device 2200 may perform these processes in response to processor 2120 executing software instructions stored by a non-transitory computer-readable medium, such as memory 2230 and/or storage component 2240. A computer-readable medium is defined herein as a non-transitory memory device. A memory device includes memory space within a single physical storage device or memory space spread across multiple physical storage devices.

Software instructions may be read into memory 2230 and/or storage component 2240 from another computer-readable medium or from another device via communication interface 2270. When executed, software instructions stored in memory 2230 and/or storage component 2240 may cause processor 2120 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 22 are provided as an example. In practice, device 2200 may include additional components, fewer components, different components, or differently arranged components than those shown in FIG. 22. Additionally, or alternatively, a set of components (e.g., one or more components) of device 2200 may perform one or more functions described as being performed by another set of components of device 2200.

In embodiments, any one of the operations or processes of FIGS. 2 to 10 may be implemented by or using any one of the elements illustrated in FIGS. 21 and 22. It is understood that other embodiments are not limited thereto, and may be implemented in a variety of different architectures (e.g., bare metal architecture, any cloud-based architecture or deployment architecture such as Kubernetes, Docker, OpenStack, etc.).

According to embodiments, the O-RU, O-DU, etc. (or one or more operations associated therewith) may be implemented in the form of a containerized network function, according to one or more embodiments. Below, an example configuration for implementing the containerized functions is provided.

The foregoing disclosure provides illustration and description, but is not intended to be exhaustive or to limit the implementations to the precise form disclosed. Modifications and variations are possible in light of the above disclosure or may be acquired from practice of the implementations, Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise capper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that apparatuses and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various further respective aspects and features of embodiments of the present disclosure may be defined by the following items:

Item [1] An apparatus includes: a radio unit (O-RU), the O-RU configured to: send, to a distribution unit (O-DU), antenna configuration capability information comprising at least one antenna array model parameter via management plane (M-Plane) messaging; receive, from the O-DU, an antenna array configuration comprising at least one antenna array model parameter supported by the O-RU via control plane (C-Plane) messaging or M-Plane messaging, wherein the supported antenna array configuration is based on the antenna configuration capability information comprising at least one antenna array model parameter of the O-RU and a request to reconfigure the antenna array from a higher-layer network function; and based on the antenna array configuration comprising at least one antenna array model parameter supported by the O-RU, change an antenna array model on top of a baseline antenna array configuration of the O-RU.

Item [2] The apparatus according to Item [1], wherein the apparatus configured to change the antenna array model on top of the baseline antenna array configuration may be further configured to: configure at least one beam weight and/or at least one antenna calibration data set based on the at least one antenna model parameter received from the O-DU; and response to an antenna configuration change during a transition from one antenna array model to another antenna array model considering the transition time of the antenna configuration change.

Item [3] The apparatus according to Items [1 or 2], wherein the antenna configuration capability information may include at least one antenna array model parameter to define at least one antenna array model among a plurality of predefined antenna array models that the O-RU is capable of activating, and wherein the apparatus may be further configured to; receive, from the O-DU, a bitmask to activate the least one antenna array model based on the selected at least one antenna array model parameter; and based on the bitmask, activate at least one antenna array model on top of a baseline antenna array configuration of the O-RU.

Item [4] An apparatus includes: a distribution unit (O-DU) configured to: receive, from a radio unit (O-RU), antenna configuration capability information comprising at least one antenna array model parameter via management plane (M-Plane) messaging; receive, from a higher-layer network function, a request to reconfigure an antenna array; based on the antenna configuration capability information comprising at least one antenna array model parameter from the O-RU and based on the request to reconfigure the antenna array from the higher-layer network function, determine an antenna array configuration comprising at least one antenna array model parameter supported by the O-RU; and apply the supported antenna array configuration comprising at least one antenna array model parameter via C-Plane messaging or M-Plane messaging.

Item [5] The apparatus according to Item [4], wherein the apparatus configured to determine an antenna array configuration comprising at least one antenna array model parameter supported by the O-RU may be further configured to: select at least one antenna array model parameter that is operable by the O-RU on top of a baseline antenna array configuration of the O-RU; based on the selected at least one antenna array model parameter, bitmask, at least one antenna array model that is operable by the O-RU on top of a baseline antenna array configuration of the O-RU; and send the bitmask to activate the at least one antenna array model at the O-RU.

Item [6] The apparatus according to any of Items [1 to 5], wherein the antenna configuration capability information may include an antenna array baseline model configuration, wherein the bitmasking defines a plurality of antenna array models that enable the O-RU to activate the at least one antenna array model on top of the baseline antenna array configuration, wherein the at least one antenna array model comprising at least one of a 64T64R model with 192 elements, comprising 96 dual-polarized elements, a 48T48R model with 72 elements, comprising 144 dual-polarized elements, a 32T32R comprising 96 elements comprising 48 dual-polarized elements, with 12 dual-polarized elements in a row and 4 dual-polarized elements in a column, a 32T32R comprising 96 elements comprising 48 dual-polarized elements, with 12 dual-polarized elements in a row and 4 dual-polarized elements in a column, a 32T32R comprising 96 elements comprising with 12 single polarized elements in a row and 8 single polarized elements in a column, and a 32T32R comprising 96 elements comprising 48 dual-polarized elements within two submatrices of 24 dual-polarized elements that are symmetrical to each other.

Item [7] The apparatus according to any of Items [1 to 5], wherein the antenna configuration capability information may include an antenna array baseline model configuration, wherein the bitmasking defines a plurality of antenna array models that enable the O-RU to activate the at least one antenna array model parameter on top of the baseline antenna array configuration, wherein the at least one antenna array model comprising at least one of a 16T16R antenna array baseline model with 96 dual-polarized elements, a 16T16R antenna array baseline model with 96 single polarized elements, and an 8T8R antenna array baseline model with 48 dual-polarized elements, Item [8] A method includes: sending, by a radio unit (O-RU) to a distribution unit (O-DU), antenna configuration capability information comprising at least one antenna array model parameter via management plane (M-Plane) messaging; receiving, from the O-DU, an antenna array configuration comprising at least one antenna array model parameter supported by the O-RU via control plane (C-Plane) messaging or M-Plane messaging, wherein the supported antenna array configuration is based on the antenna configuration capability information comprising at least one antenna array model parameter of the O-RU and a request to reconfigure the antenna array from a higher-layer network function; and based on the antenna array configuration comprising at least one antenna array model parameter supported by the O-RU, changing, by the O-RU, an antenna array model on top of a baseline antenna array configuration of the O-RU.

Item [9] The method according to Item [8], wherein the method may further include: configuring, by the O-RU, at least one beam weight and/or at least one antenna calibration data set based on the at least one antenna model parameter received from the O-DU; and responding, by the O-RU, to an antenna configuration change during a transition from one antenna array model to another antenna array model considering the transition time of the antenna configuration change.

Item [10] The method according to Item [9], wherein the method may further include: receiving, from the O-DU, a bitmask to activate the least one antenna array model based on at least one selected antenna array model parameter; and based on the bitmask, activating, by the O-RU, at least one antenna array model on top of a baseline antenna array configuration of the O-RU.

Item [11] A method includes: receiving, by a distribution unit (O-DU) from a radio unit (O-RU), antenna configuration capability information comprising at least one antenna array model parameter via management plane (M-Plane) messaging; receiving, from a higher-layer network function, a request to reconfigure an antenna array; based on the antenna configuration capability information comprising at least one antenna array model parameter from the O-RU and based on the request to reconfigure the antenna array from the higher-layer network function, determine, by the O-DU, an antenna array configuration comprising at least one antenna array model parameter supported by the O-RU; and applying, by the O-DU, the supported antenna array configuration comprising at least one antenna array model parameter via C-Plane messaging or M-Plane messaging.

Item [12] The method according to Item [11], wherein the method may further include: selecting, by the O-DU at least one antenna array model parameter that is operable by the O-RU on top of a baseline antenna array configuration of the O-RU; based on the selecting, bitmasking, by the O-DU, at least one antenna array model that is operable by the O-RU on top of a baseline antenna array configuration of the O-RU; and sending, by the O-DU, the bitmask to activate the at least one antenna array model at the O-RU.

Item [13] The method according to any of Items [8 to 12], wherein the antenna configuration capability information may include an antenna array baseline model configuration, wherein the bitmasking defines a plurality of antenna array models that enable the O-RU to activate the at least one antenna array model on top of the baseline antenna array configuration, wherein the at least one antenna array model comprising at least one of a 64T64R model with 192 elements, comprising 96 dual-polarized elements, a 48T48R model with 72 elements, comprising 144 dual-polarized elements, a 32T32R comprising 96 elements comprising 48 dual-polarized elements, with 12 dual-polarized elements in a row and 4 dual-polarized elements in a column, a 32T32R comprising 96 elements comprising 48 dual-polarized elements, with 12 dual-polarized elements in a row and 4 dual-polarized elements in a column, a 32T32R comprising 96 elements with 12 single polarized elements in a row and 8 single polarized elements in a column, and a 32T32R comprising 96 elements comprising 48 dual-polarized elements within two sub-matrices of 24 dual-polarized elements that are symmetrical to each other.

Item [14] The method according to any of Items [8 to 12], wherein the antenna configuration capability information may include an antenna array baseline model configuration, wherein the bitmasking defines a plurality of antenna array models that enable the O-RU to activate the at least one antenna array model parameter on top of the baseline antenna array configuration, wherein the at least one antenna array model comprising at least one of a 16T16R antenna array baseline model with 96 dual-polarized elements, a 16T16R antenna array baseline model with 96 single polarized elements, and an 8T8R antenna array baseline model with 48 dual-polarized elements.

What is claimed is:

1. An apparatus comprising:

a radio unit (O-RU), the O-RU configured to:

send, to a distribution unit (O-DU), antenna configuration capability information comprising at least one antenna array model parameter via management plane (M-Plane) messaging;

receive, from the O-DU, an antenna array configuration comprising at least one antenna array model parameter supported by the O-RU via control plane (C-Plane) messaging or M-Plane messaging, wherein the supported antenna array configuration is based on the antenna configuration capability information comprising at least one antenna array model parameter of the O-RU and a request to reconfigure the antenna array from a higher-layer network function; and based on the antenna array configuration comprising at least one antenna array model parameter supported by the O-RU, change an antenna array model on top of a baseline antenna array configuration of the O-RU.

2. The apparatus as claimed in claim 1, wherein the apparatus configured to change the antenna array model on top of the baseline antenna array configuration is further configured to:

configure at least one beam weight and/or at least one antenna calibration data set based on the at least one antenna model parameter received from the O-DU; and response to an antenna configuration change during a transition from one antenna array model to another antenna array model considering the transition time of the antenna configuration change.

3. The apparatus as claimed in claim 1, wherein the antenna configuration capability information comprises at least one antenna array model parameter to define at least one antenna array model among a plurality of predefined antenna array models that the O-RU is capable of activating, and wherein the apparatus is further configured to:

receive, from the O-DU, a bitmask to activate the least one antenna array model based on at least one selected antenna array model parameter; and based on the bitmask, activate at least one antenna array model on top of a baseline antenna array configuration of the O-RU.

4. An apparatus comprising:

a distribution unit (O-DU) configured to:

receive, from a radio unit (O-RU), antenna configuration capability information comprising at least one antenna array model parameter via management plane (M-Plane) messaging;

receive, from a higher-layer network function, a request to reconfigure an antenna array;

based on the antenna configuration capability information comprising at least one antenna array model parameter from the O-RU and based on the request to reconfigure the antenna array from the higher-layer network function, determine an antenna array configuration comprising at least one antenna array model parameter supported by the O-RU; and apply the supported antenna array configuration comprising at least one antenna array model parameter via C-Plane messaging or M-Plane messaging.

5. The apparatus as claimed in claim 4, wherein the apparatus configured to determine an antenna array configuration comprising at least one antenna array model parameter supported by the O-RU is further configured to:

select at least one antenna array model parameter that is operable by the O-RU on top of a baseline antenna array configuration of the O-RU;

based on the selected at least one antenna array model parameter, bitmask, at least one antenna array model that is operable by the O-RU on top of a baseline antenna array configuration of the O-RU; and send the bitmask to activate the at least one antenna array model at the O-RU.

6. The apparatus as claimed in claim 4, wherein the antenna configuration capability information comprises an antenna array baseline model configuration, wherein the bitmasking defines a plurality of antenna array models that enable the O-RU to activate the at least one antenna array model on top of the baseline antenna array configuration, wherein the at least one antenna array model comprising at least one of a 64T64R model with 192 elements, comprising 96 dual-polarized elements, a 48T48R model with 72 elements, comprising 144 dual-polarized elements, a 32T32R comprising 96 elements comprising 48 dual-polarized elements, a 32T32R comprising 96 elements comprising 48 dual-polarized elements, with 12 dual-polarized elements in a row and 4 dual-polarized elements in a column, a 32T32R comprising 96 elements with 12 single polarized elements in a row and 8 single polarized elements in a column, and a 32T32R comprising 96 elements comprising 48 dual-polarized elements within two submatrices of 24 dual-polarized elements that are symmetrical to each other.

7. The apparatus as claimed in claim 4, wherein the antenna configuration capability information comprises an antenna array baseline model configuration, wherein the bitmasking defines a plurality of antenna array models that enable the O-RU to activate the at least one antenna array model parameter on top of the baseline antenna array configuration, wherein the at least one antenna array model comprising at least one of a 16T16R comprising 48 dual-polarized elements, a 16T16R comprising 96 single polarized elements, and an 8T8R comprising 24 dual-polarized elements.

8. A method comprising:

sending, by a radio unit (O-RU) to a distribution unit (O-DU), antenna configuration capability information comprising at least one antenna array model parameter via management plane (M-Plane) messaging;

receiving, from the O-DU, an antenna array configuration comprising at least one antenna array model parameter supported by the O-RU via control plane (C-Plane) messaging or M-Plane messaging, wherein the supported antenna array configuration is based on the antenna configuration capability information comprising at least one antenna array model parameter of the O-RU and a request to reconfigure the antenna array from a higher-layer network function; and based on the antenna array configuration comprising at least one antenna array model parameter supported by the O-RU, changing, by the O-RU, an antenna array model on top of a baseline antenna array configuration of the O-RU.

9. The method as claimed in claim 8, wherein the method further comprises:

configuring, by the O-RU, at least one beam weight and/or at least one antenna calibration data set based on the at least one antenna model parameter received from the O-DU; and responding, by the O-RU, to an antenna configuration change during a transition from one antenna array model to another antenna array model considering the transition time of the antenna configuration change.

10. The method as claimed in claim 8, wherein the method further comprises:

receiving, from the O-DU, a bitmask to activate the least one antenna array model based on at least one selected antenna array model parameter; and based on the bitmask, activating, by the O-RU, at least one antenna array model parameter on top of a baseline antenna array configuration of the O-RU.

* * * * *